United States Patent [19]

Murayama et al.

[11] Patent Number: 5,298,608

[45] Date of Patent: Mar. 29, 1994

[54] METAL CHELATE OF A MONOAZO COMPOUND AND OPTICAL RECORDING MEDIUM USING IT

[75] Inventors: Tetsuo Murayama, Machida; Shuichi Maeda, Hidaka; Chiyoko Fukabori; Takumi Nagao, both of Yokohama, all of Japan

[73] Assignee: Mitsubishi Kasei Corporation, Tokyo, Japan

[21] Appl. No.: 809,509

[22] PCT Filed: May 17, 1991

[86] PCT No.: PCT/JP91/00652

§ 371 Date: Jan. 16, 1992

§ 102(e) Date: Jan. 16, 1992

[87] PCT Pub. No.: WO91/18057

PCT Pub. Date: Nov. 28, 1991

[30] Foreign Application Priority Data

May 17, 1990 [JP] Japan .................................. 2-127178
Sep. 11, 1990 [JP] Japan .................................. 2-240917
Sep. 11, 1990 [JP] Japan .................................. 2-240918
Nov. 28, 1990 [JP] Japan .................................. 2-328425

[51] Int. Cl.⁵ .................. C09B 29/042; C09B 29/045; C09B 29/09; B41M 5/26
[52] U.S. Cl. .................................. 534/693; 534/703; 534/705; 534/706; 534/707; 534/752; 534/768; 534/770; 534/781; 534/782; 534/785; 534/602; 430/270; 430/495; 430/945
[58] Field of Search ............... 534/693, 703, 705, 706, 534/707, 768, 770, 781, 782, 785; 430/270, 495, 945

[56] References Cited

U.S. PATENT DOCUMENTS 4,686,143 8/1987 Yoshikawa et al. ............. 428/411.1

FOREIGN PATENT DOCUMENTS 54-141820 11/1979 Japan ............................ 534/703
62-30090 2/1987 Japan .

OTHER PUBLICATIONS

Armeanu et al I, Chemical Abstracts, 76:54064m (1972).
Armeanu et al II, Current Abstracts of Chemistry, 43, 185152 (1971).
Kalonchenko et al., Chemical Abstracts, 83:71008h (1975).
Pachadzhanov et al, Chemical Abstracts, 76:67703u (1972).
Savvin et al I, Chemical Abstracts, 73:10338n (1970).
Savvin et al II, Current Abstracts of Chemistry, 37, 144365 (1970).
Oshita et al, *Analytica Chimica Acta,* 140(1982) 291–300.
Shibata et al, *Analytica Chimica Acta,* 81 (1976) 131–141.

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

A metal chelate compound comprising a monoazo compound of the following formula (I):

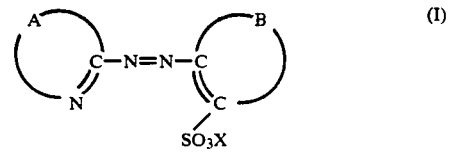

(wherein A is a residue forming a hetero ring together with the carbon atom and the nitrogen atom to which it is bonded, B is a residue forming an aromatic group together with the two carbon atoms to which it is bonded, and X is a hydrogen atom or a cation), and a metal, and an optical recording medium comprising a substrate and a recording layer formed thereon for information to be written in and/or read out by laser, wherein said recording layer contains the metal chelate compound comprising a monoazo compound of the above formula (I) and a metal.

20 Claims, 13 Drawing Sheets

METAL CHELATE OF A MONOAZO COMPOUND AND OPTICAL RECORDING MEDIUM USING IT

TECHNICAL FIELD

The present invention relates to a novel metal chelate compound comprising a monoazo compound and a metal, and an optical recording medium using it.

BACKGROUND ART

Optical recording employing laser makes storage and reproduction of high density information records possible, and its developments have been remarkable recent years.

As an example of optical recording, an optical disc may be mentioned. An optical disc is usually designed to irradiate a focused laser beam of about 1 μm, to a thin recording layer formed on a substrate of disc shape to conduct high density information recording. The recording is carried out in such a manner that upon absorption of the laser beam energy, the irradiated portion of the recording layer will undergo a thermal deformation such as decomposition, vaporization or melting. Reproduction of the recorded information is carried out by reading the difference in the reflectance between the portion having a deformation formed by the laser beam and the portion having no such deformation.

Accordingly, the recording layer is required to efficiently absorb the energy of the laser beam, and a laser-absorbing dye is employed for this purpose.

Various structures are known for optical recording media of this type. For example, Japanese Unexamined Patent Publication No. 97033/1980 discloses the one having a single layer of a phthalocyanine type dye formed on a substrate. However, the phthalocyanine type dye is poor in the sensitivity and further has a problem such that the decomposition point is high and it is hardly vaporized. Further, its solubility in an organic solvent is very low, and thus it has a problem that it can not be used for coating by a coating method.

Further, Japanese Unexamined Patent Publications No. 11279/1983, No. 114989/1983, No. 85791/1984 and No. 83236/1985 disclose the one having a cyanine type dye as a recording layer. Such a dye has a merit that the solubility is high, and it is thereby possible to conduct coating by a coating method. However, it has a problem that it is inferior in the light fastness. Therefore, Japanese Unexamined Patent Publication No. 55795/1984 proposes to improve the light fastness by adding a quencher to this cyanine type dye, but the improvement has not yet been sufficient.

In connection with these problems, Japanese Unexamined Patent Publication No. 30090/1987 discloses complexes of certain specific monoazo compounds and metals, as media having the solubility in an organic solvent and the light resistance improved. However, these compounds have short photosensitive wavelengths and thus are poor in the sensitivity, and they are also poor in the storage stability under a high temperature high humidity condition. Thus, they have problems in their use for optical recording media.

DESCRIPTION OF THE INVENTION

The present invention relates to a metal chelate compound comprising a monoazo compound of the following formula (I):

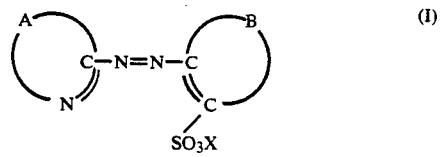

(wherein A is a residue forming a hetero ring together with the carbon atom and the nitrogen atom to which it is bonded, B is a residue forming an aromatic group together with the two carbon atoms to which it is bonded, and X is a hydrogen atom or a cation), and a metal, and an optical recording medium employing it.

Now, the present invention will be described in detail.

In the above formula (I), A is a residue forming a hetero ring together with the carbon atom and the nitrogen atom to which it is bonded, and as

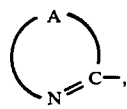

the following may, for example, be mentioned:

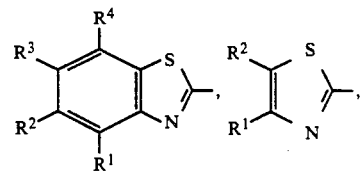

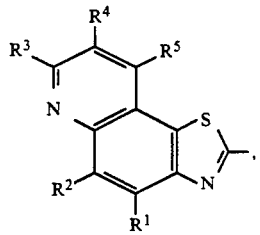

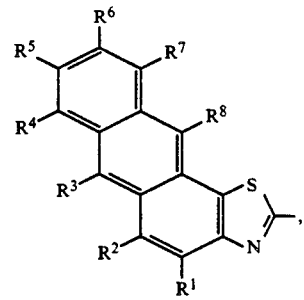

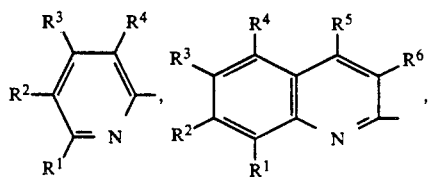

-continued

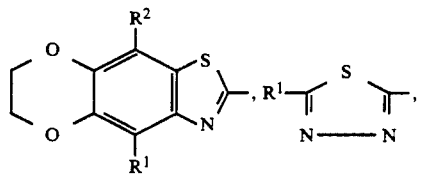

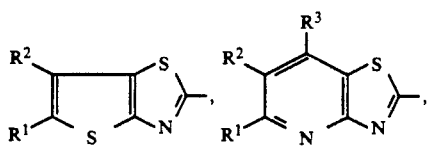

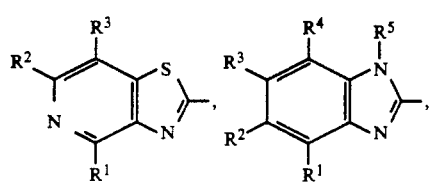

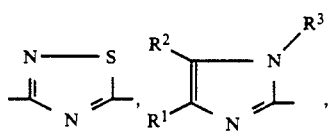

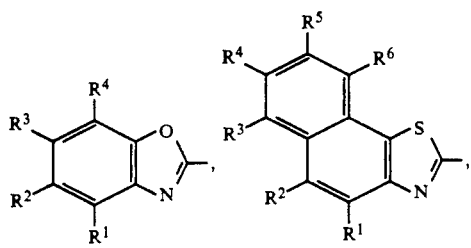

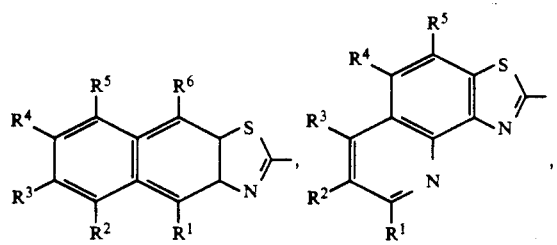

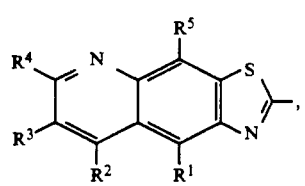

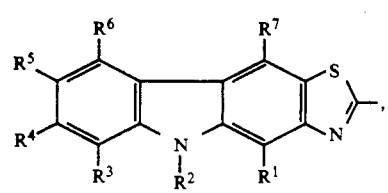

-continued

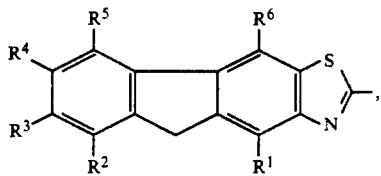

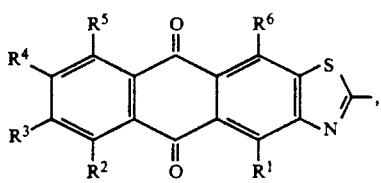

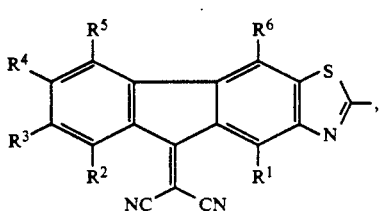

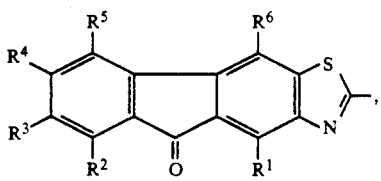

(wherein each of $R^1$ to $R^8$ which are independent from one another, is a hydrogen atom; a $C_{1-6}$ alkyl group such as a methyl group, an ethyl group, a n-propyl group, and isopropyl group, a n-butyl group, a tert-butyl group, a sec-butyl group, a n-pentyl group or a n-hexyl group; a $C_{1-6}$ alkoxy group such as a methoxy group, an ethoxy group, a n-propoxy group, an isopropoxy group, a n-butoxy group, a tert-butoxy group, a sec-butoxy group, a n-pentyloxy group, a n-hexyloxy group; a $C_{1-6}$ alkylsulfonyl group such as a methylsulfonyl group, an ethylsulfonyl group, a n-propylsulfonyl group, an isopropylsulfonyl group, a n-butylsulfonyl group, a tert-butylsulfonyl group, a sec-butylsulfonyl group, a n-pentylsulfonyl group or a n-hexylsulfonyl group; a $C_{2-7}$ alkylcarbonyl (acetyl) group such as an acetyl group, a propionyl group, butyryl group, an isobutyryl group, a valeryl group, an isovaleryl group, a pivaloyl group, a hexanoyl group or a heptanoyl; a halogen atom such as a fluorine atom, a chlorine atom or a bromine atom; a formyl group;

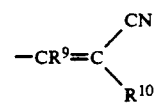

(wherein $R^9$ is a hydrogen atom or the same $C_{1-6}$ alkyl group as defined above for $R^1$ to $R^8$, and $R^{10}$ is a cyano group, or a $C_{2-7}$ alkoxycarbonyl group such as a methoxycarbonyl group, an ethoxycarbonyl group, a n-propoxycarbonyl group, an isopropoxycarbonyl group a n-butoxycarbonyl group, a tert-butoxycarbonyl group, a sec-butoxycarbonyl group, a n-pentyloxycarbonyl group or a n-hexylcarbonyl group); a nitro group;

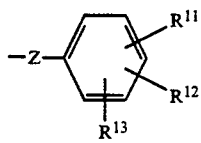

(wherein each of $R^{11}$ to $R^{13}$ which are independent from one another, is a hydrogen atom or a nitro group, and Z is a single bond, —SCH$_2$—, —SO$_2$— or —SO$_2$CH$_2$—); a trifluoromethyl group; a trifluoromethoxy group; a cyano group; the same $C_{2-7}$ alkoxycarbonyl group as defined above for $R_{10}$; a $C_{3-7}$ alkoxycarbonylalkyl group such as a methoxycarbonylmethyl group, a methoxycarbonylethyl group, an ethoxycarbonylmethyl group, an ethoxycarbonylethyl group, a n-propoxycarbonylmethyl group, a n-propoxycarbonylethyl group, a n-propoxycarbonylpropyl group, an isopropoxycarbonylmethyl group or an isopropoxycarbonylethyl group; or a $C_{1-6}$ alkylthio group such as a methylthio group, an ethylthio group, a n-propylthio group, an isopropylthio group, a n-butylthio group, a tert-butylthio group, a sec-butylthio group, a n-pentylthio group or a n-hexylthio group).

In the above formula (I), B is a residue forming, together with the two carbon atoms to which it is bonded, an aromatic ring such as a benzene ring or a naphthalene ring, preferably a benzene ring, or an aromatic ring residue containing a hetero atom such as

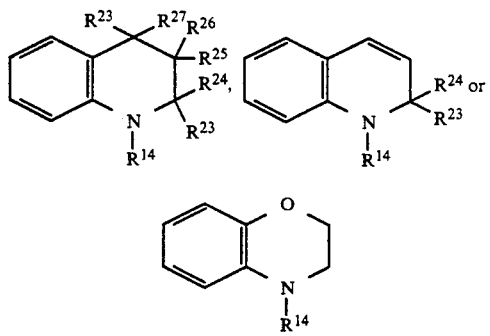

(wherein $R^{14}$ is as defined above, each of $R^{23}$ to $R^{28}$ which are independent from one another, is a hydrogen atom; or the same $C_{1-6}$ alkyl group as defined above for $R^1$ to $R^8$). Further, X may have at least one substituent selected from —NR$^{14}$R$^{15}$ (wherein each of $R^{14}$ and $R^{15}$ which are independent from each other, is a hydrogen atom; a $C_{1-20}$ alkyl group such as a methyl group, an ethyl group, a n-propyl group, an isopropyl group, a n-butyl group, a tert-butyl group, a sec-butyl group, a n-pentyl group, a n-hexyl group, a n-heptyl group, a n-octyl group, a n-decyl group, a n-dodecyl group or a n-octadecyl group, preferably a $C_{1-10}$ alkyl group, more preferably a $C_{1-6}$ alkyl group; a $C_{6-12}$ aryl group such as a phenyl group, a tolyl group, a xylyl group or a naphthyl group; a $C_{2-10}$ alkenyl group such as a vinyl group, a 1-propenyl group, an allyl group, an isopropenyl group, a 2-butenyl group, a 1,3-butadienyl group or a 2-pentenyl group; or a $C_{3-10}$ cycloalkyl group such as a cyclopropyl group, a cyclobutyl group, a cyclopentyl group, a cyclohexyl group, a cycloheptyl group or a cyclobutyl group; such a $C_{1-20}$ alkyl group, a $C_{6-12}$ aryl group, a $C_{2-10}$ alkenyl group and a $C_{3-10}$ cycloalkyl group may be substituted by a $C_{1-10}$ alkoxy group such as a methoxy group, an ethoxy group, a n-propoxy group, an isopropoxy group, a n-butoxy group, a tert-butoxy group, a sec-butoxy group, a n-pentyloxy group, a n-hexyloxy group, a n-heptyloxy group, a n-octyloxy group or a n-decyloxy group; a $C_{2-12}$ alkoxyalkoxy group such as a methoxymethoxy group, an ethoxymethoxy group, a propoxymethoxy group, a methoxyethoxy group, an ethoxyethoxy group, a propoxyethoxy group, a methoxypropoxy group, an ethoxypropoxy group, a methoxybutoxy group or an ethoxybutoxy group; a $C_{3-15}$ alkoxyalkoxyalkoxy group such as a methoxymethoxymethoxy group, a methoxymethoxyethoxy group, a methoxyethoxymethoxy group a methoxyethoxyethoxy group, an ethoxymethoxymethoxy group, an ethoxymethoxyethoxy group or an ethoxyethoxyethoxy group; an allyloxy group; a $C_{6-12}$ aryl group such as a phenyl group, a tolyl group, a xylyl group or a naphthyl group; a $C_{6-12}$ aryloxy group such as a phenoxy group, a tolyloxy group, a xylyloxy group or a naphthyloxy group; a cyano group; a nitro group; a hydroxyl group; a tetrahydrofuryl group; a $C_{1-6}$ alkylsulfonylamino group such as a methylsulfonylamino group, an ethylsulfonylamino group, a n-propylsulfonylamino group, an isopropylsulfonylamino group, a n-butylsulfonylamino group, a tert-butylsulfonyl amino group, a sec-butylsulfonylamino group, a n-pentylsulfonylamino group or a n-hexylsulfonylamino group; a halogen atom such as a fluorine atom, a chlorine atom or a bromine atom; a $C_{2-7}$ alkoxycarbonyl group such as a methoxycarbonyl group, an ethoxycarbonyl group, a n-propoxycarbonyl group, an isopropoxycarbonyl group, a n-butoxycarbonyl group, a tert-butoxycarbonyl group, a sec-butoxycarbonyl group, a n-pentyloxycarbonyl group or a n-hexyloxycarbonyl group; a $C_{2-7}$ alkylcarbonyloxy group such as a methylcarbonyloxy group, an ethylcarbonyloxy group, a n-propylcarbonyloxy group, an isopropylcarbonyloxy group, a n-butylcarbonyloxy group, a tert-butylcarbonyloxy group, a sec-butylcarbonyloxy group, a n-pentylcarbonyloxy group or a n-hexylcarbonyloxy group; or a $C_{2-7}$ alkoxycarbonyloxy group such as a methoxycarbonyloxy group, an ethoxycarbonyloxy group, a n-propoxycarbonyloxy group, an isopropoxycarbonyloxy group, a n-butoxycarbonyloxy group, a tert-butoxycarbonyloxy group, a sec-butoxycarbonyloxy group, a n-pentyloxycarbonyloxy group or a n-hexyloxycarbonyloxy group; further, the above $C_{6-12}$ aryl group and the above $C_{3-10}$ cycloalkyl group for $R^{14}$ and $R^{15}$, may be substituted by a $C_{1-6}$ alkyl group such as a methyl group, an ethyl group, a n-propyl group, an isopropyl group, a n-butyl group, a tert-butyl group, a sec-butyl group, a n-pentyl group or a n-hexyl group, or a vinyl group), a $C_{1-6}$ alkyl group such as a methyl group an ethyl group, a n-propyl group, an isopropyl group, a n-butyl group, a tert-butyl group, a sec-butyl group, a n-pentyl group or a n-hexyl group; a $C_{1-6}$ alkoxy group such as a methoxy group, an ethoxy group, a n-propoxy group, an isopropoxy group, n-butoxy group, a tert-butoxy group, a sec-butoxy group, a n-pentyloxy group or a n-hexyloxy group; a halogen atom such as a fluorine atom, a chlorine atom or a bromine atom; a $C_{1-6}$ alkylsulfonyl group such as a methylsulfonyl group, an ethylsulfonyl group, a n-propylsulfonyl group, an isopropylsulfonyl group, a n-butylsulfonyl group, a tert-butylsulfonyl group, a sec-butylsulfonyl group, a n-pentylsulfonyl group or a n-hexylsulfonyl group; $C_{2-7}$ alkoxycarbonyl group such as a methoxycarbonyl group, an ethoxycarbonyl group, a n- propoxycarbonyl group, an isopropoxycarbonyl group, a n-butoxycarbonyl group, a tert-butoxycarbonyl group, a sec-butoxycarbonyl group, a n-pentyloxy carbonyl group or a n-hexyloxycarbonyl group; and a thiocyanate group.

In the above formula (I), X is a hydrogen atom or a cation including an inorganic cation such as $Na^+$, $Li^+$ or $K^+$ or an organic cation such as

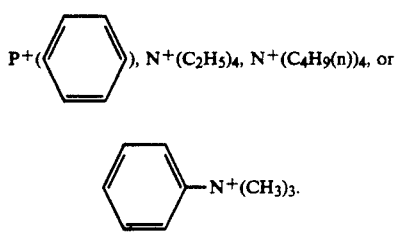

In the present invention, one type of preferred compounds are metal chelate compounds which comprise a monoazo compound of the following formula (II):

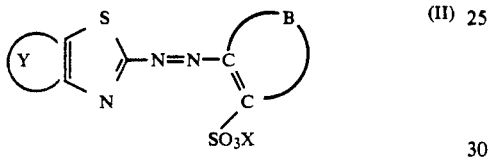

(wherein ring Y is a residue forming a $C_{6-12}$ aromatic ring such as a benzene ring, a naphthalene ring, an anthracene ring or a phenanthrene ring, or a hetero ring having at least one hetero atom such as a quinoline ring, a pyridine ring, an acrydine ring or a carbazole ring, which may have the same substituent as defined above for $R^1$ to $R^8$, and ring B and X are as defined above) and a metal.

Among the compounds of the above formula (II), preferred are metal chelate compounds which comprise a monoazo compound of the following formula (III):

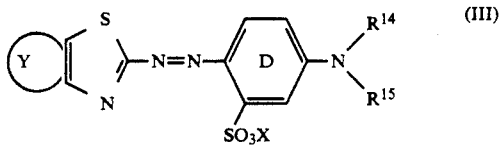

(wherein ring D may have at least one substituent selected from a $C_{1-6}$ alkyl group, a $C_{1-6}$ alkoxy group, a halogen atom, a nitro group, a cyano group, a $C_{1-6}$ alkylsulfonyl group, a $C_{2-7}$ alkoxycarbonyl group and a thiocyanate group as defined above for the residue B, and $R^{14}$, $R^{15}$, X and Y are as defined above) and a metal.

Among the compounds of the formula (III), particularly preferred are metal chelate compounds which comprise a monoazo compound of the following formula (IV):

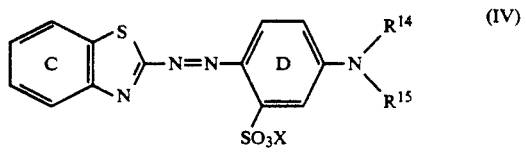

(wherein ring C may have the same substituent as defined above for $R^1$ to $R^8$, and ring D, $R^{14}$, $R^{15}$ and X are as defined above) and a metal.

Among the compounds of the above formula (IV), more preferred are metal chelate compounds which comprise a monoazo compound of the following formula (V).

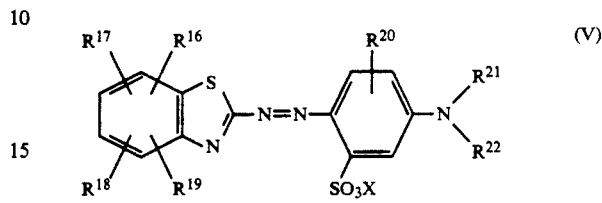

(wherein each of $R^{16}$ to $R^{19}$ which are independent from one another, is a hydrogen atom, a $C_{1-6}$ alkyl group, a $C_{1-6}$ alkoxy group, a $C_{1-6}$ alkylsulfonyl group, a $C_{2-7}$ alkylcarbonyl (acetyl) group, a halogen atom, a formyl group,

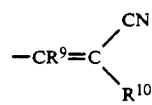

(wherein $R^9$ and $R^{10}$ are as defined above), a nitro group,

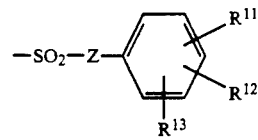

(wherein $R^{11}$ to $R^{13}$ are as defined above), a trifluoromethyl group, a trifluoromethoxy group or a cyano group, as defined above for $R^1$ to $R^8$, $R^{20}$ is a hydrogen atom, a $C_{1-6}$ alkyl group, a $C_{1-6}$ alkoxy group, a halogen atom or a nitro group, as defined above for the residue B, each of $R^{21}$ and $R^{22}$ which are independent from each other, is a $C_{1-6}$ alkyl group or a $C_{2-6}$ alkoxyalyl group, and X is as defined above) and a metal. Particularly preferred are metal chelate compounds which comprise a monoazo compound of the following formula (VI):

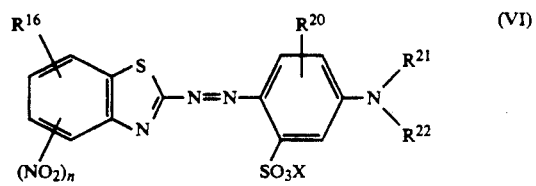

(wherein each of $R^{16}$ and $R^{20}$ which are independent from each other, is a hydrogen atom, a $C_{1-6}$ alkyl group or a halogen atom, n is an integer of from 1 to 3, and $R^{21}$, $R^{22}$ and X are as defined above) and a metal; metal chelate compounds which comprise a monoazo compound of the following formula (VII):

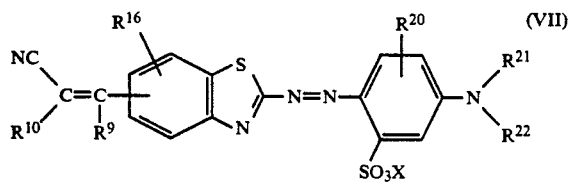

(wherein each of R¹⁶ and R²⁰ which are independent from one another, is a hydrogen atom, a $C_{1-6}$ alkyl group, a $C_{1-6}$ alkoxy group or a halogen atom, and $R^9$, $R^{10}$, $R^{21}$, $R^{22}$ and X are as defined above) and a metal; metal chelate compounds which comprise a monoazo compound wherein each of R¹⁶ and R¹⁷ is a hydrogen atom, each of R¹⁸ and R¹⁹ which are independent from each other, is a hydrogen atom, a $C_{1-6}$ alkyl group,

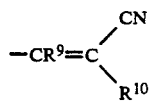

(wherein $R^9$ and $R^{10}$ are as defined above), a trifluoromethyl group or a cyano group, $R^{20}$ is a hydrogen atom or a $C_{1-6}$ alkoxy group, each of $R^{21}$ and $R^{22}$ which are independent from each other, is a $C_{1-6}$ alkyl group, and X is as defined above, and a metal; or metal chelate compounds which comprise a monoazo compound wherein each of R¹⁶ and R¹⁷ is a hydrogen atom, and each of R¹⁸ to R²⁰ which are independent from one another, is a hydrogen atom, a $C_{1-6}$ alkyl group or a halogen atom, and a metal.

Further, in the present invention, another type of preferred compounds are metal chelate compounds which comprise a monoazo compound of the following formula (XI):

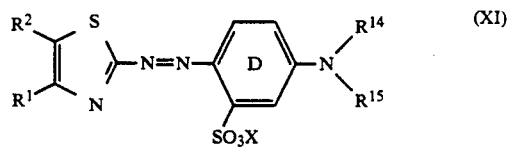

(wherein $R^1$, $R^2$, $R^{14}$, $R^{15}$, D and X are as defined above) and a metal.

Among the compounds of the above formula (VI), more preferred are metal chelate compounds which comprise a monoazo compound of the following formula (XII):

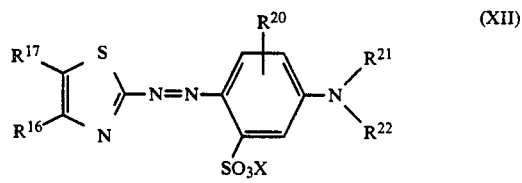

(wherein $R^{16}$, $R^{17}$, $R^{20}$ to $R^{22}$ and X are as defined above) and a metal.

In the present invention, specific examples of the azo compound forming a complex with a metal, include, for example, the following:

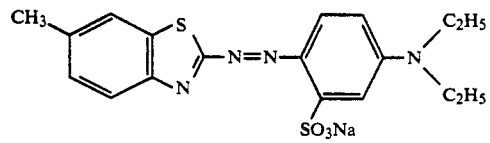
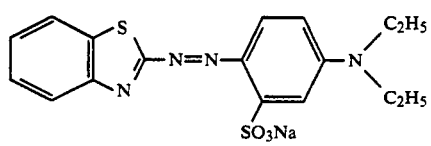
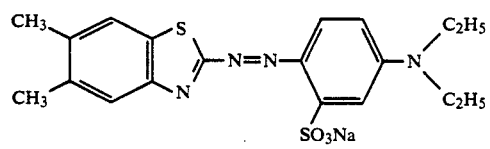
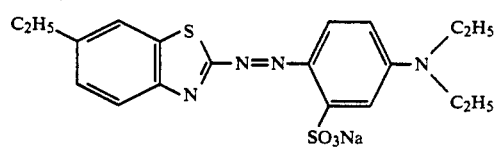
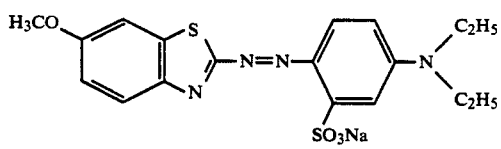
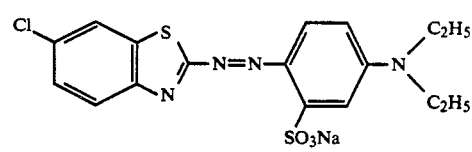
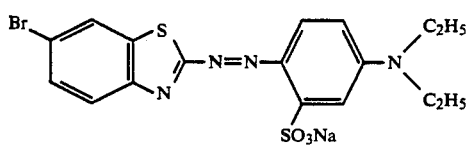
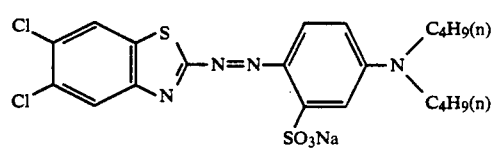
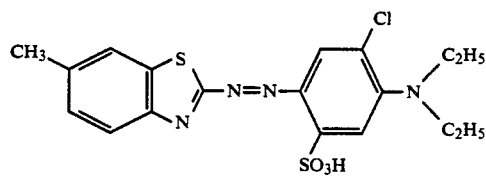
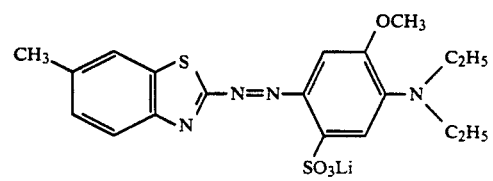

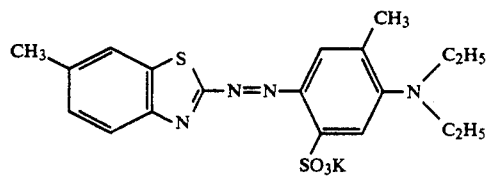
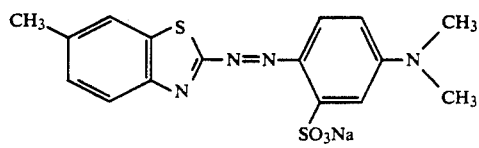
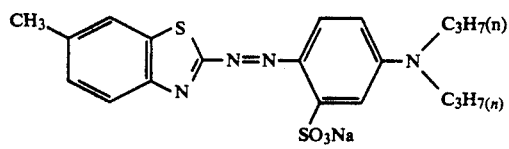
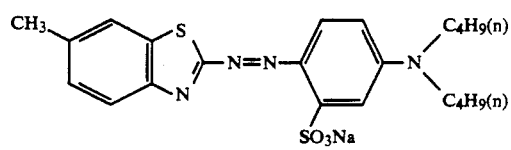
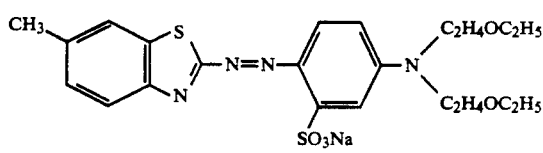
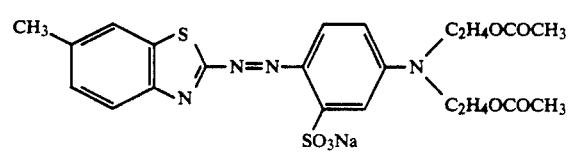
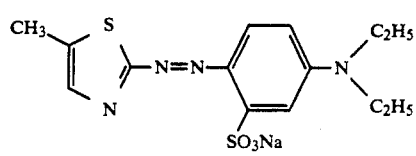
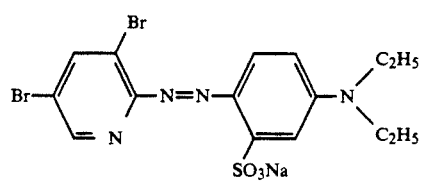
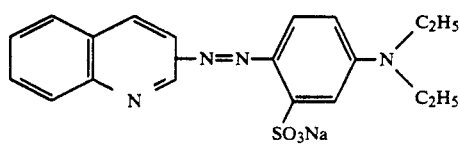
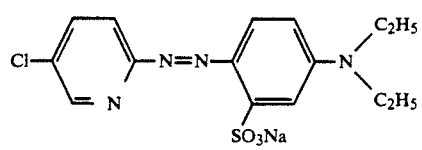
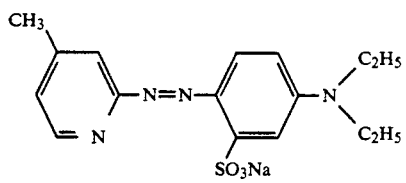
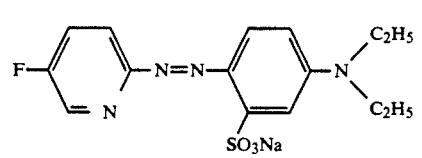
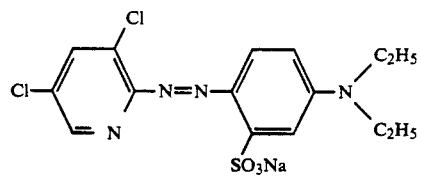
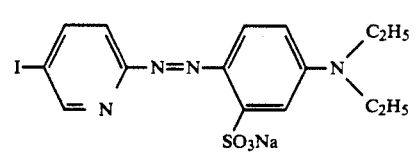
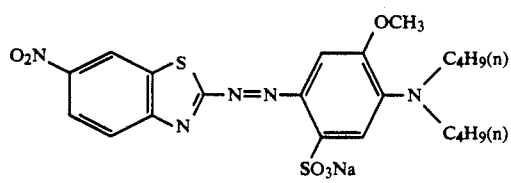
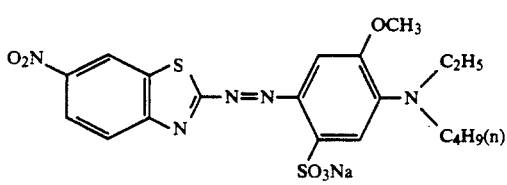
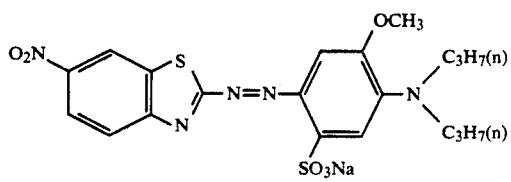
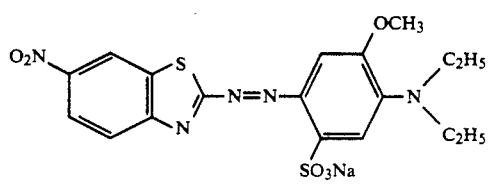

-continued
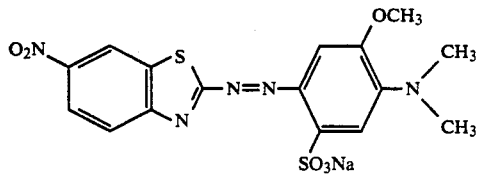
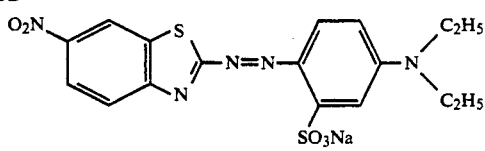
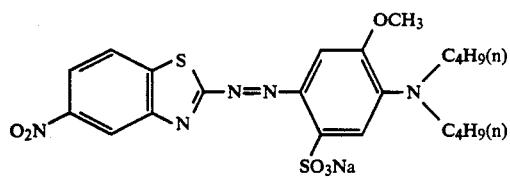
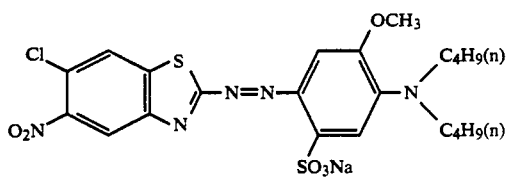
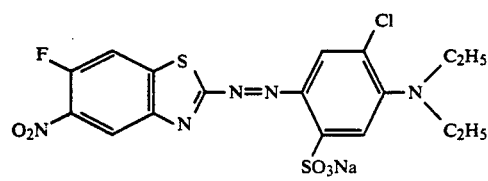
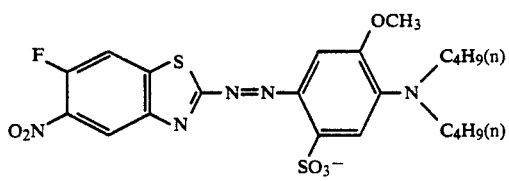
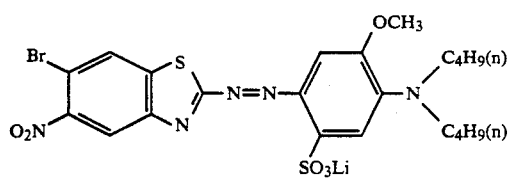
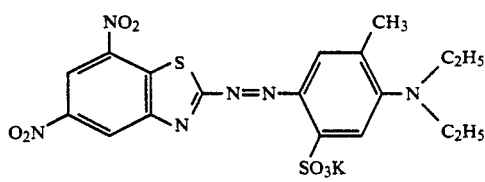
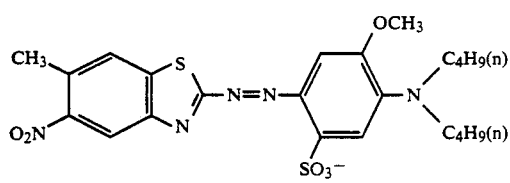
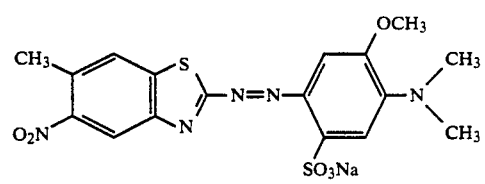
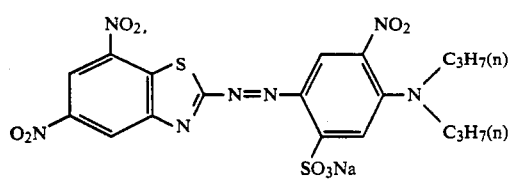
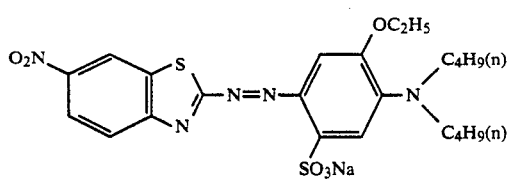
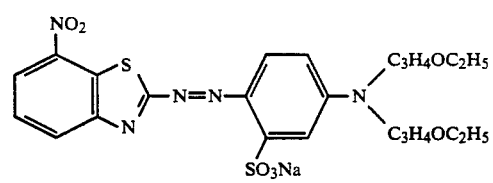
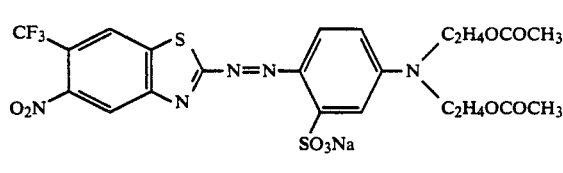
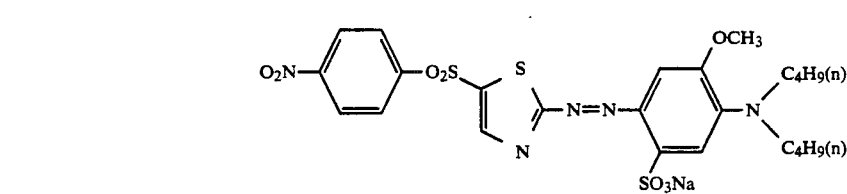
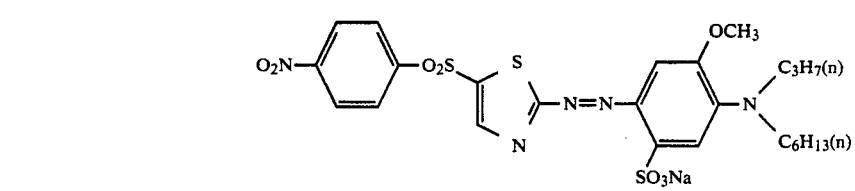

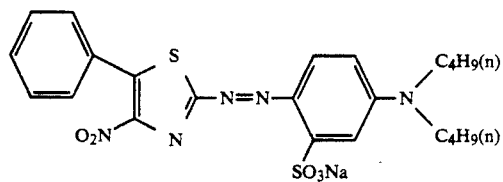
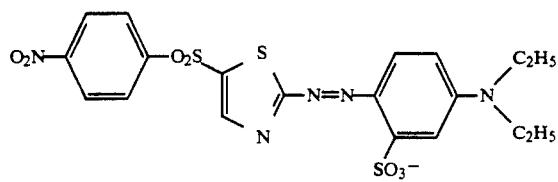
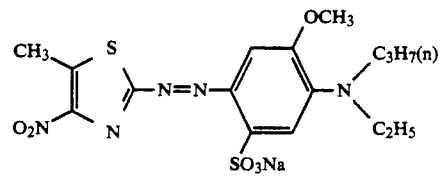
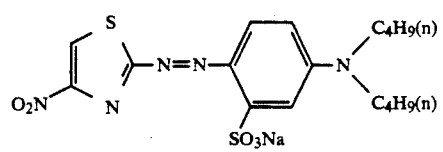
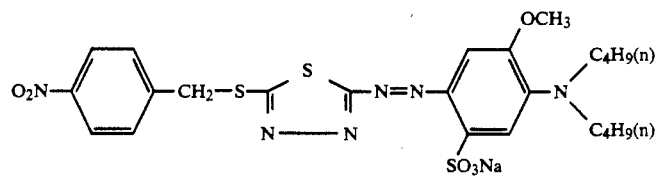
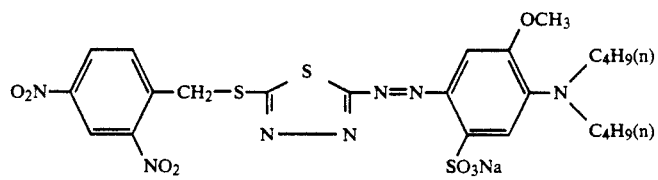
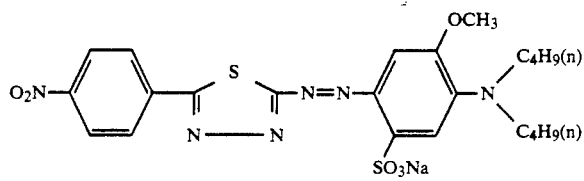
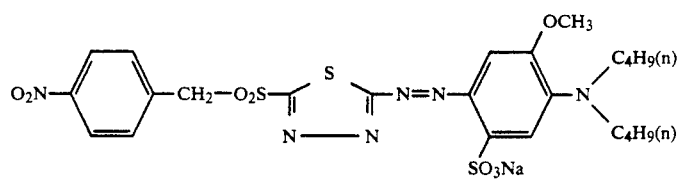
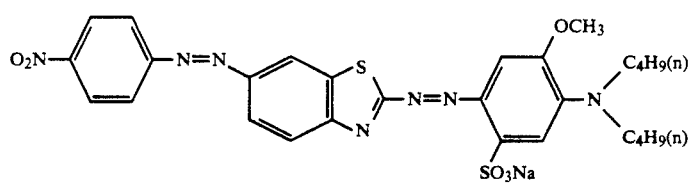
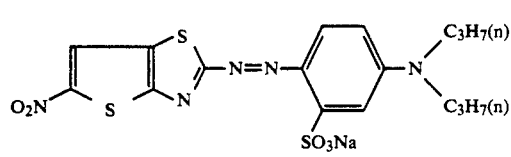
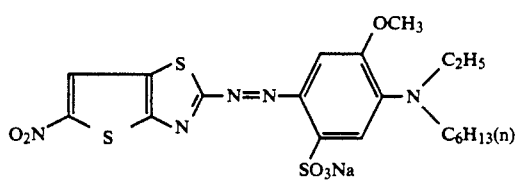
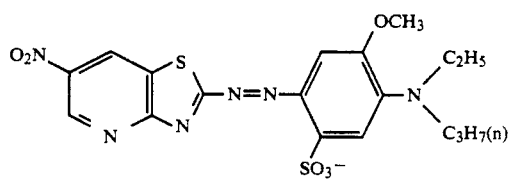

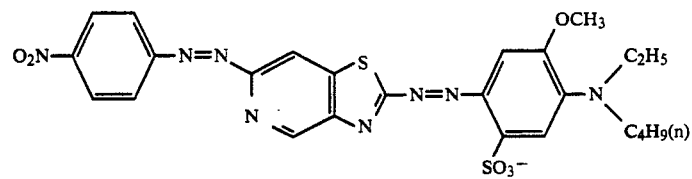
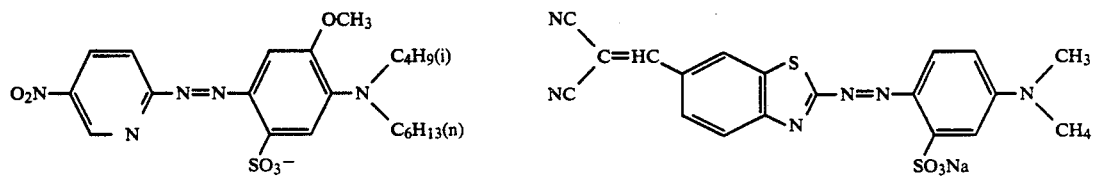
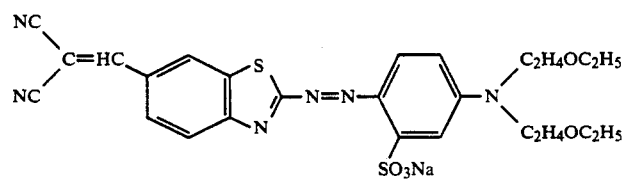
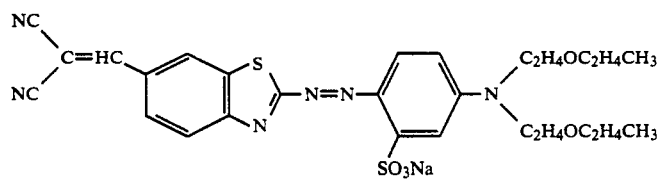
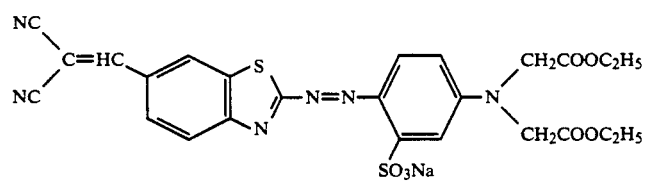
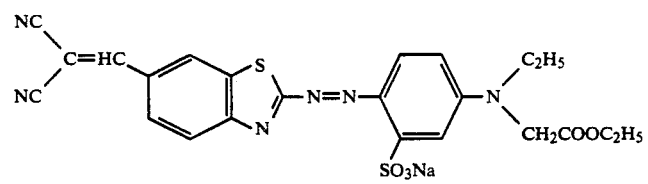
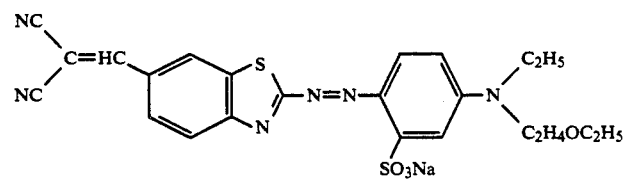
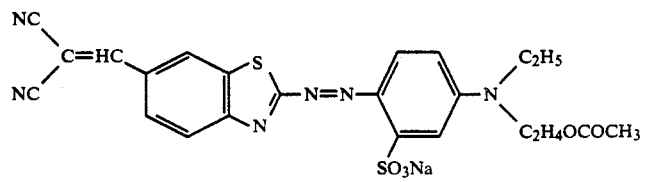

-continued
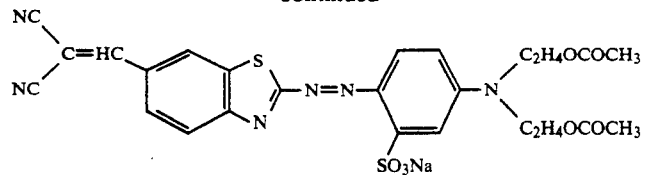
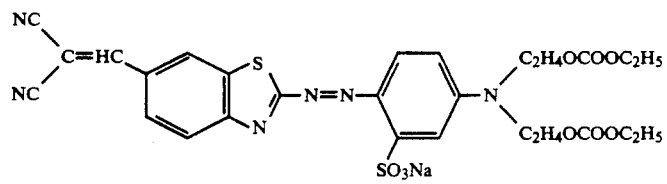
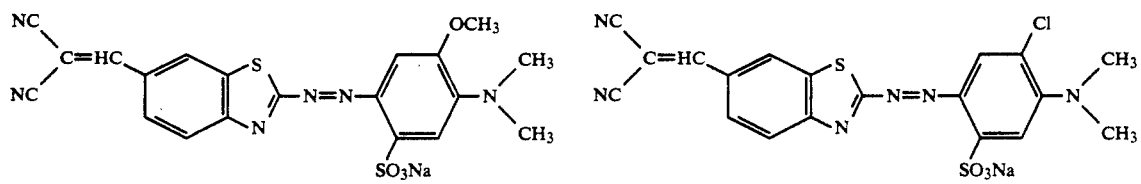
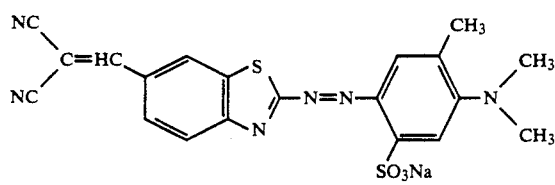
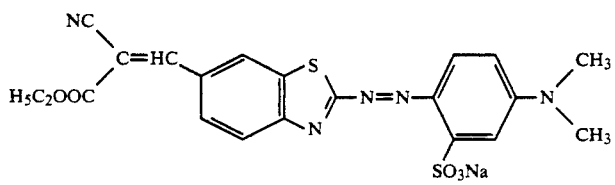
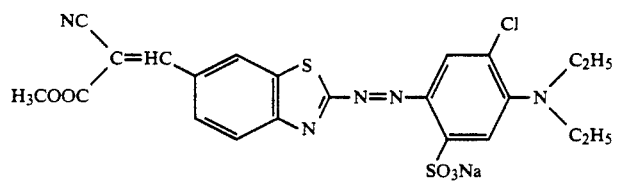
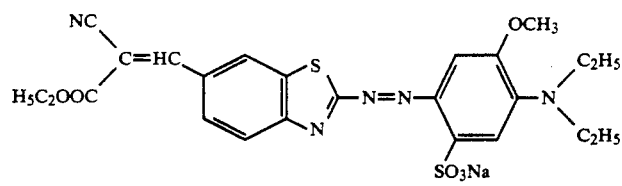
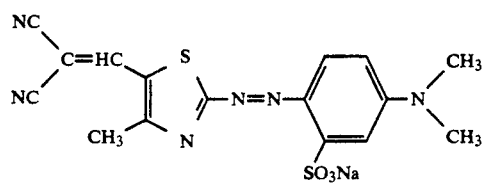
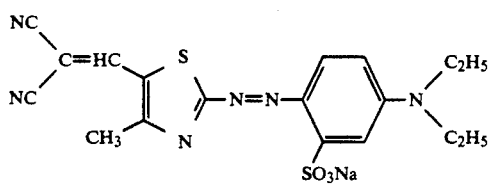
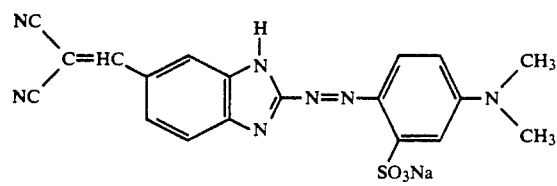
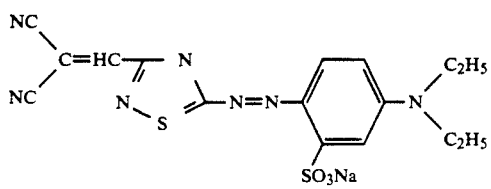

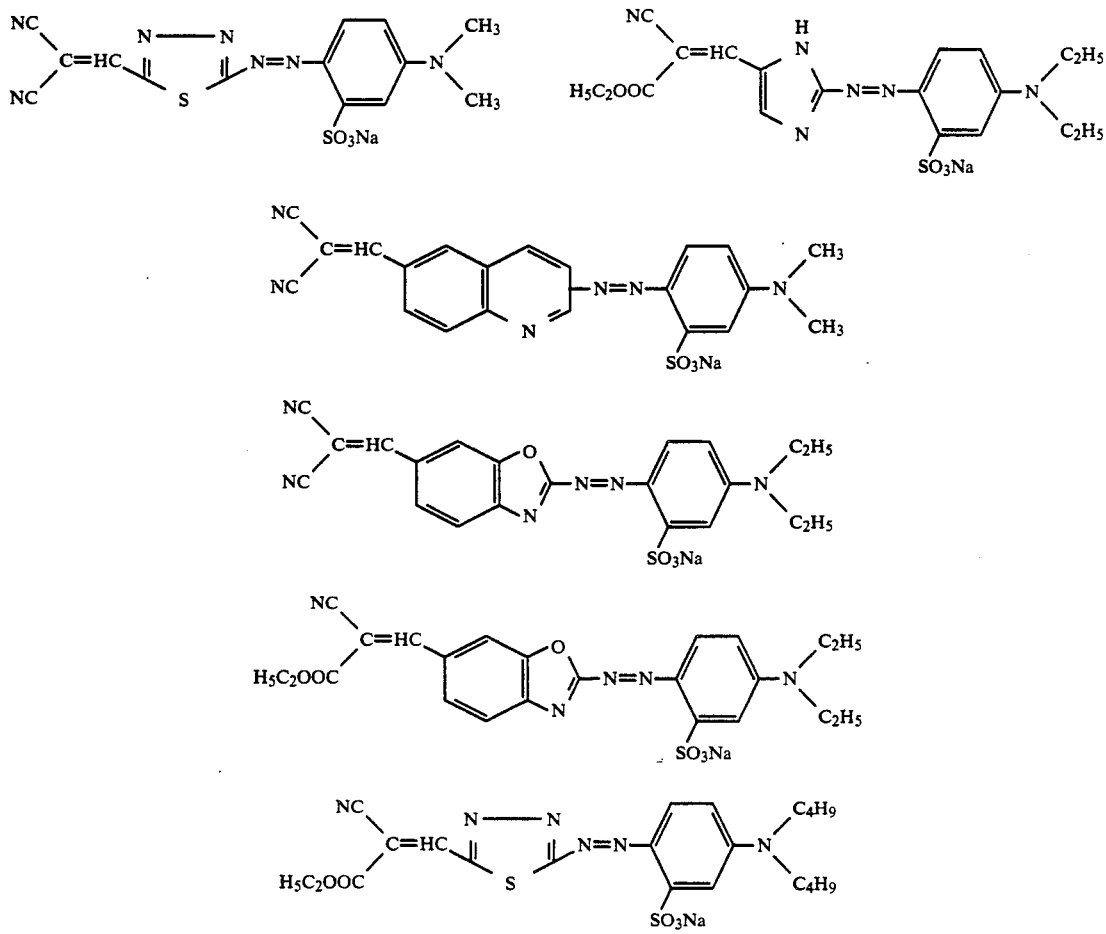

In the present invention, the metal forming a chelate with a monoazo compound is not particularly restricted so long as it is a metal capable of forming a complex with the monoazo compound. However, a transition element such as Ni, Co, Fe, Ru, Rh, Pd, Os, Ir or Pt, is preferred. Particularly preferred is Ni or Co.

Now, a method for preparing a metal chelate compound of a monoazo compound of the present invention will be described.

The metal chelate compound of a monoazo compound of the present invention can be prepared, for example, in accordance with the description in Analytica Chimica Acta 140 (1982) 281–289 by Furukawa. Namely, an amino compound of the formula (XIII) or (XIV):

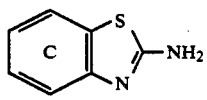
(XIII)

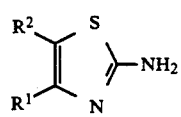
(XIV)

(wherein $R^1$, $R^2$ and ring C are as defined above) is diazotized in accordance with a conventional method and subjected to coupling with a substituted aniline derivative of the following formula (XV):

(XV)

[structure with ring D, $N(R^{14})(R^{15})$, $SO_3X$]

(wherein $R^{14}$, $R^{15}$, X and ring D are as defined above) to obtain a monoazo compound of the above formula (IV) or (XI). Then, the monoazo compound and a metal salt are reacted in water and/or an organic solvent such as dioxane, tetrahydrofuran, acetone or ethanol to obtain a metal chelate compound of the present invention.

The anion of the metal salt to be used for the preparation of such a metal chelate compound, is preferably a monovalent or bivalent anion such as $SCN^-$, $SbF_6^-$, $Cl^-$, $Br^-$, $ClO_4^-$, $PF_6^-$, $CH_3COO^-$, $TiF_6^{2-}$, $SiF_6^{2-}$,

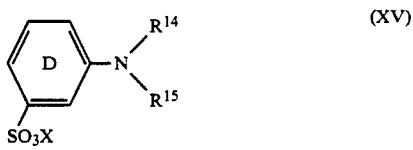

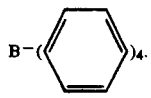

Particularly preferred is $BF_4^-$, $PF_6^-$ or $CH_3COO^-$.

Now, an optical recording medium of the present invention will be described.

The optical recording medium of the present invention is composed basically of a substrate and a recording layer containing the above metal chelate compound of a monoazo compound. Further, if necessary, a primer coating layer may be provided on the substrate. Further, in a preferred layer structure, a metal reflecting layer of e.g. gold or aluminum and a protecting layer are provided on the recording layer to obtain a medium having a high reflectance, which is useful as a writable CD medium.

In the present invention, the substrate may be transparent or opaque to the laser beam to be employed. With respect to the material for the substrate, a support commonly used for recording material, such as glass, plastic, paper or metal in the form of a plate or foil, may be mentioned. From various aspects, plastic material is preferably used. As such plastic material, acryl resin, methacryl resin, vinyl acetate resin, vinyl chloride resin, nitrocellulose, polyethylene resin, polypropylene resin, polycarbonate resin, polyimide resin, epoxy resin or polysulfone resin, may, for example, be mentioned. However, an injection molded polycarbonate resin substrate is particularly preferably employed from the viewpoint of the high productivity, low costs and moisture resistance.

In the optical recording medium of the present invention, the recording layer containing the chelate compound of a monoazo compound with a metal, preferably has a layer thickness of from 100Å to 5 μm, more preferably from 1000Å to 3 μm.

With respect to the layer-forming method, the layer may be formed by a commonly employed thin film-forming method such as a vacuum vapor deposition method, a sputtering method, a doctor blade method, a casting method, a spinner method or a dipping method. However, the spinner method is preferred from the viewpoint of the productivity and costs.

Further, a binder may be used as the case requires. As such a binder, a known binder such as polyvinyl alcohol, polyvinyl pyrrolidone, ketone resin, nitrocellulose, cellulose acetate, polyvinyl butyral or polycarbonate, may be employed. In the case of layer forming by a spinner method, the rotational speed is preferably from 500 to 5,000 rpm, and after spin coating, treatment such as heating or exposing to a solvent vapor, can be applied, as the case requires.

Further, for the improvement in the stability or light resistance of the recording layer, a transition metal chelate compound (such as acetylacetonate chelate, bisphenyldithiol, salicylaldehyde oxime or bisdithio-α-diketone) may be incorporated as a single state oxygen quencher and furthermore, a dye of the same type, or a dye of another type such as a triarylmethane type dye, an azo dye, a cyanine type dye, a squalirium type dye, a metal chelate compound of a monoazo compound or a nickel-indoaniline type dye, may be used in combination.

When a recording layer is formed by a coating method such as a doctor blade method, a casting method, a spinner method, or a dipping method, particularly a spinner method, as the coating solvent, the one having a boiling point of from 120° to 160° C., such as tetrafluoropropanol, octafluoropentanol, tetrachloroethane, bromoform, dibromoethane, diacetone alcohol, ethylcellosolve, xylene, 3-hydroxy-3-methyl-3-butanone, chlorobenzene, cyclohexanone or methyl lactate, is preferably employed.

Among them, for the injection molded polycarbonate resin substrate excellent in the high productivity, low costs and moisture resistance, as a solvent suitably useful without damaging the substrate, a ketone alcohol type solvent such as diacetone alcohol or 3-hydroxy-3-methyl-2-butanol; a cellosolve type solvent such as methylcelsollove or ethylcellosolve; a perfluoroalkyl alcohol type solvent such as tetrafluoropropanol or octafluoropentanol; or a hydroxyester type solvent such as methyl lactate or methyl isobutyrate, may be mentioned.

The recording layer of the optical recording medium of the present invention may be formed on both sides of the substrate or on one side thereof.

Recording on a recording medium thus obtained, is conducted by irradiating a laser beam, preferably a semiconductor laser beam, focused to about 1 μm to the recording layer provided on one side or each side of the substrate. At the portion irradiated with the laser beam, a thermal deformation of the recording layer, such as decomposition, vaporization or melting, will be formed due to absorption of the laser energy. Accordingly, reproduction of the recorded information can be conducted by reading the difference in the reflectance between the portion having such a thermal deformation formed by a laser beam and the portion having no such a thermal deformation.

As the laser beam to be used for the recording and reproduction of the optical recording medium of the present invention, $N_2$, He-Cd, Ar, He-Ne, ruby, a semiconductor or a dye laser, may be mentioned. However, a semiconductor laser is used particularly preferably from the viewpoint of light weight, convenience in handing and compactness.

BEST MODE FOR CARRYING OUT THE INVENTION

Figure 1:
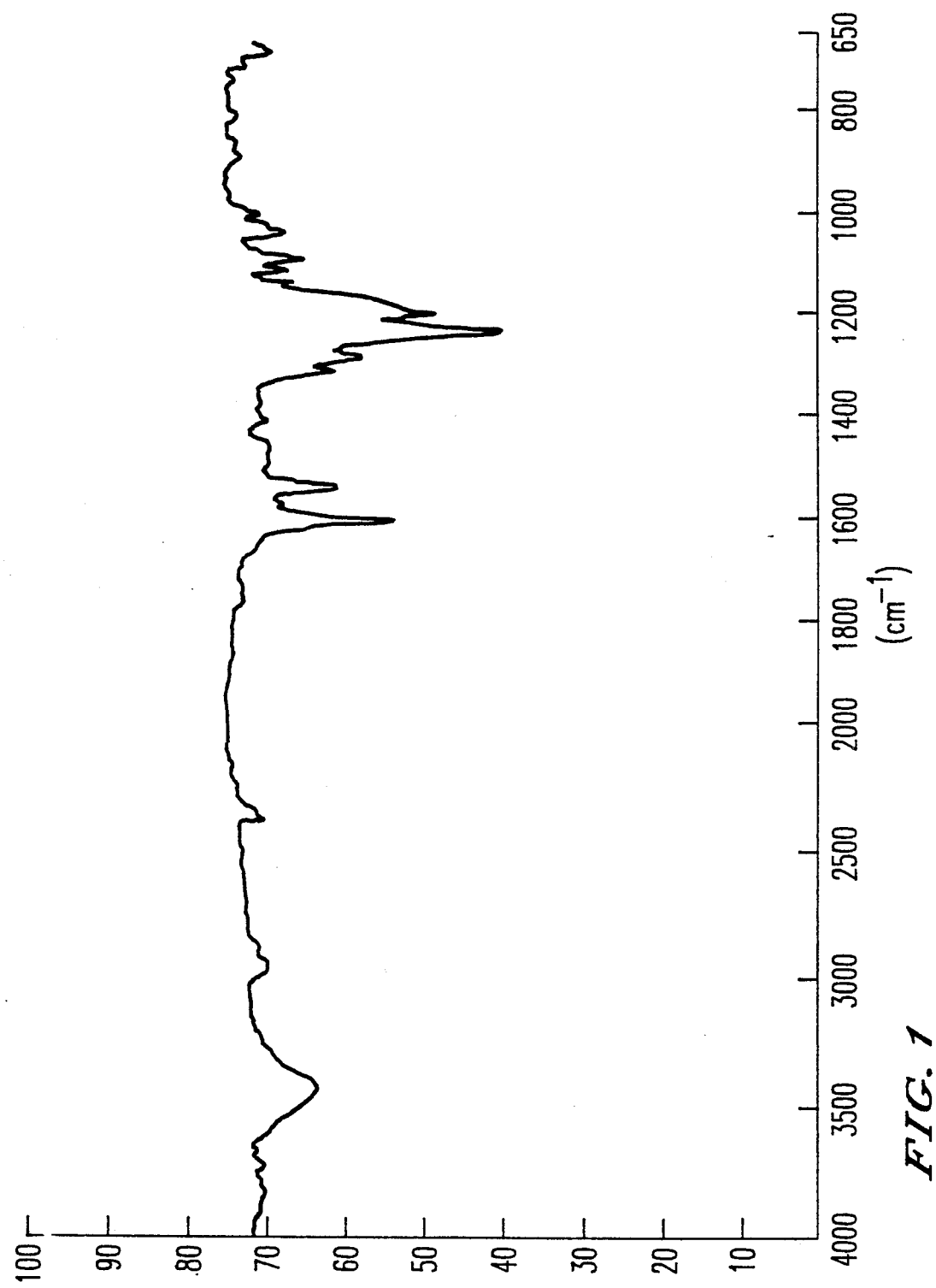
FIG. 1 is a graph showing the infrared absorption spectrum of the metal chelate compound in Example 3.

Now, the present invention will be described in detail with reference to Examples. However, the present invention is by no means restricted to such Examples unless it exceeds its gist.

EXAMPLE 1

(a) Preparation of a compound 3.12 g (0.02 mol) of 2-amino-6-methylbenzothiazole of the following structural formula:

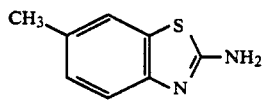

was dispersed in 10 ml of 98% sulfuric acid, followed by stirring at 5° to 10° C., then 10 ml of glacial acetic acid was added, followed by cooling to a temperature of at most 5° C., then nitrosylsulfuric acid prepared from 1.68 g of sodium sulfite and 9.5 ml of 98% sulfuric acid, was added, followed by stirring for 30 minutes. Then, 25 ml of water was gradually dropwise added at a temperature of at most 5° C., followed by stirring at 0° to 5° C. for one hour. The reaction solution was dropwise added under stirring to a solution having 70 ml of concentrated ammonium (28%) and 5.02 g (0.02 mol) of an aniline sulfonate derivative of the following structural formula:

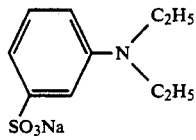

dispersed in 200 ml of methanol, at 0° to 5° C. After stirring further at a temperature of at most 5° C. for 3 hours, the reaction solution was filtered to obtain 7.06 g of red crystals of the following structural formula:

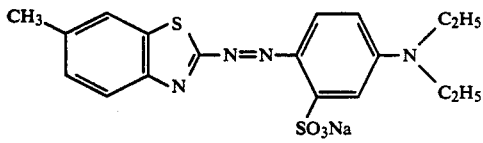

Then, 0.4 g of the azo compound thus obtained, was dissolved in 100 ml of methanol at room temperature, and 0.36 g of a 40% Ni(BF₄)₂ aqueous solution was added. Then, 50 ml of a pH buffer solution (phosphate type) of pH7 was added to adjust the solution to pH7. After stirring for about one hour, filtration and washing with water were conducted. The obtained powder was stirred in 100 ml of methanol at room temperature for about 30 minutes, followed by filtration, washing with methanol, washing with water and drying to obtain 0.37 g of a nickel chelate compound as black crystals of the following structural formula:

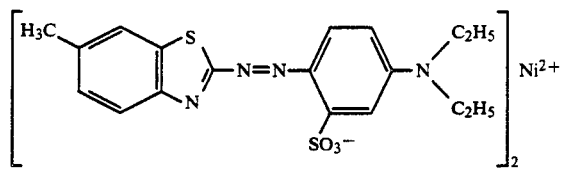

The absorption spectrum of this compound in a chloroform solution was $\lambda_{max}$ 646 nm, 598 nm (molecular absorptivity coefficient: $\epsilon = 10.6 \times 10^4$, $10.0 \times 10^4$).

Further, the results of the elemental analysis were as follows:

|  | C | H | N | S | Ni |
| --- | --- | --- | --- | --- | --- |
| Calculated (%) | 49.95 | 4.42 | 12.94 | 14.81 | 6.78 |
| Found (%) | 48.26 | 4.28 | 12.54 | 13.25 | 6.50 |

(b) Preparation of an optical recording medium 0.15 g of the chelate compound of the monoazo compound with nickel obtained in the above preparation step (a) was dissolved in 7.5 g of octafluoropentanol and then filtered through a filter of 0.22 μm to obtain a solution. 5 ml of this solution was dropped on an injection molded polycarbonate resin substrate having a diameter of 5 inches and a groove with a depth of 700Å and the width of 0.7 μm and coated by a spinner method at a rotational speed of 500 rpm. The coating was followed by drying at 60° C. for 10 minutes. The maximum absorption wavelength of the coated amount was 677 nm.

Then, on the coated layer, a gold layer having a layer thickness of 2,000Å was formed by a sputtering method to form a reflecting layer. Further, on this reflecting layer, an ultraviolet curable resin was spin-coated, followed by irradiation with ultraviolet rays for curing to form a protecting layer having a thickness of 10 μm, to obtain an optical recording medium.

(c) Optical recording

While rotating the above recording medium at a rotational speed of 1.2 m/s, a semiconductor laser beam having a central wavelength of 780 nm was irradiated with a recording power of 7.0 mW to record EFM signals. Then, this recorded portion was reproduced by a CD player having a semiconductor laser with a central wavelength of 780 nm, whereby excellent reproduction signals were obtained.

Further, tests for light fastness (xenon fade meter accelerated test: 60 hours) and for storage stability (70° C., 85 RH: 500 hours) were conducted, whereby no deterioration in the sensitivity and the reproduced signals was observed as compared with the initial values, thus indicating that the medium was excellent as an optical recording medium.

EXAMPLE 2

(a) Preparation of a compound

Preparation was conducted in the same manner as in Example 1 except that 0.48 g of a 40% Co(BF₄)₃ aqueous solution was employed instead of 0.36 g of a 40%

Ni(BF$_4$)$_2$ aqueous solution employed in Example 1 to obtain 0.32 g of a cobalt chelate compound as black powder.

The absorption spectrum of this compound in a chloroform solution was $\lambda_{max}$ 648 nm ($\epsilon = 10.5 \times 10^4$).

(b) Preparation of an optical recording medium

A coated layer was formed in the same manner as in Example 1 except that 0.15 g of the chelate compound of a monoazo compound with nickel obtained in the above preparation step (a) was employed. The maximum absorption wavelength of the coated amount was 681 nm.

Then, on the coated layer, a reflecting layer and a protecting layer were formed in the same manner as in Example 1 to obtain an optical recording medium.

(c) Optical recording

EFM signals were recorded on the above recording medium in the same manner as in Example 1 and then reproduced, whereby excellent reproduction signals were obtained.

Further, tests for light fastness and for storage stability were conducted in the same manner as in Example 1, whereby no deterioration in the sensitivity and the reproduced signals was observed as compared with the initial values, thus indicating that the medium was excellent as an optical recording medium.

EXAMPLE 3

(a) Preparation of a compound 3.60 g of 2-amino-6-methoxybenzothiazole of the following structural formula:

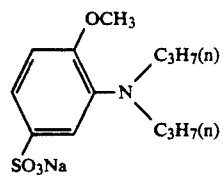

was dissolved in 18.4 ml of 1.5% sulfuric acid at 30° to 35° C. The obtained solution was added to 59.5 ml of 40% sulfuric acid cooled at −5° to 0° C., and was gradually added with 6.78 g of 45% nitrosylsulfuric acid, followed by stirring at the same temperature for 2 hours to conduct diazotization. The diazotized solution was added to a solution, at 0° to 5° C., of 1 g of sulfamic acid, 75 g of ice and 115 ml of water, followed by stirring at the same temperature for 15 minutes. To the reacted solution, a solution of 6.18 g of a substituted aniline sulfonate acid derivative of the following structural formula:

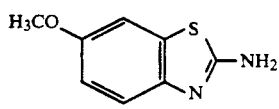

dissolved in 50 ml of ice water, was added, followed by stirring at the same temperature for 30 minutes. The obtained solution was neutralized with aqueous ammonia and stirred to conduct coupling. The precipitated crystals were filtered and dried to obtain 2.73 g of an azo compound as crystals of the following formula:

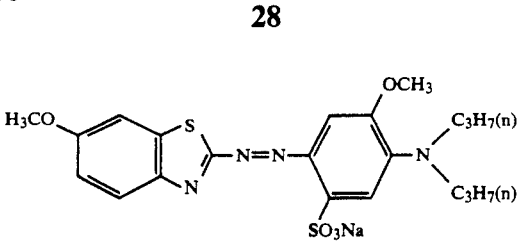

0.45 g of the azo compound was dissolved in 40 ml of methanol, and a solution of 0.15 g of nickel acetate Ni(CH$_3$COO)$_2$.4H$_2$O dissolved in 6 ml of methanol was dropwise added at room temperature, followed by stirring at the same temperature for 2 hours to obtain 0.12 g of a nickel chelate compound as black crystals of the following formula:.

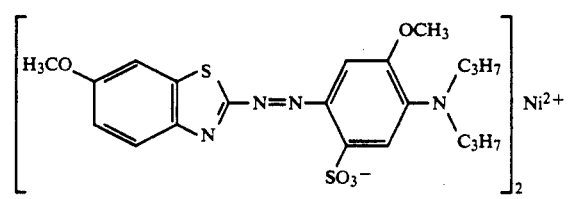

The physical properties of this compound are shown below. The infrared absorption (IR) spectrum is shown in FIG. 1.

Physical properties Melting point: not less than 250° C. $\lambda_{max}$(chloroform): 696, 639 nm $\epsilon$ (molecular absorptivity coefficient): $11.4 \times 10^4$, $9.3 \times 10^4$ IR spectrum (KBr): 1600, 1530, 1300, 1280, 1220, 1190 cm$^{-1}$

EXAMPLE 4

The preparation was conducted in the same manner as in Example 3 except that 5.07 g of a substituted aniline sulfonate acid derivative of the following formula

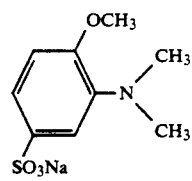

was employed instead of 6.18 g of a substituted aniline sulfonate acid derivative used in Example 2 to obtain 2.20 g of an azo compound as crystals of the following formula:

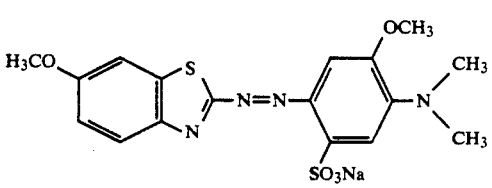

Preparation was conducted in the same manner as in Example 3 except that 0.30 g of the azo compound and 0.10 g of a nickel acetate were employed to obtain 0.10 g of a nickel chelate compound as black crystals of the following formula:

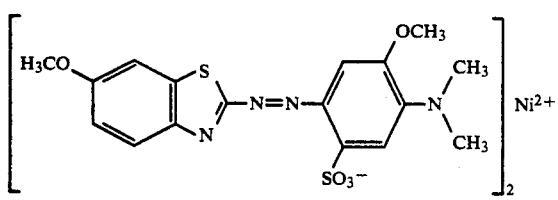

The absorption spectrum of this compound in a chloroform solution was $\lambda_{max}$ 685 nm, 633 nm, and the molecular absorptivity coefficient was $\epsilon = 9.0 \times 10^4$, $7.7 \times 10^4$.

EXAMPLE 5

Preparation was conducted in the same manner as in Example 3 except that 3.88 g of 2-amino-6-ethoxybenzothiazole of the following formula:

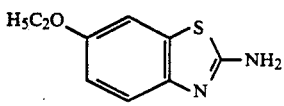

was employed instead of 2-amino-6-methoxybenzothiazole employed in Example 3 and 5.07 g of a compound of the following formula:

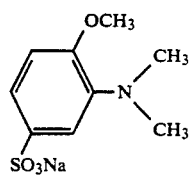

was employed as a substituted aniline sulfonate acid derivative to obtain 3.20 g of an azo compound as crystals of the following formula:

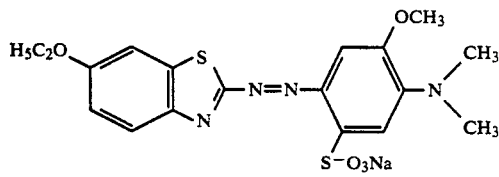

Preparation was conducted in the same manner as in Example 3 except that 0.90 g of the azo compound and 0.30 g of a nickel acetate were employed to obtain 0.10 g of a nickel chelate compound as black crystals of the following formula:

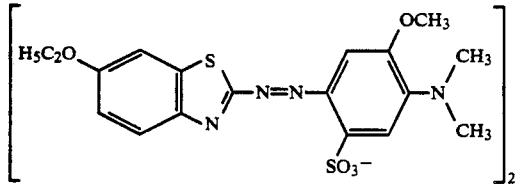

The absorption spectrum of this compound in a chloroform solution was $\lambda_{max}$ 687 nm, 635 nm, and the molecular absorptivity coefficient was $\epsilon = 10.1 \times 10^4$, $8.5 \times 10^4$.

EXAMPLE 6

To a solution of 5 ml of acetic acid and 10 ml of sulfuric acid, was dissolved 3.02 g of an aminothiazole derivative of the following formula:

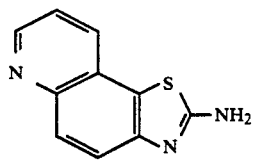

5.08 g of 45% nitrosylsulfuric acid was added at room temperature to this solution, and the solution was cooled to 0° to −5° C., and 25 ml of water was dropwise added, followed by stirring at the same temperature for 1.5 hours to conduct diazotization.

On the other hand, to a solution of 4.64 g of a substituted aniline sulfonate acid derivative of the following formula:

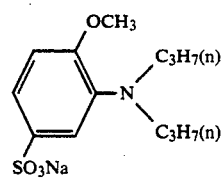

dissolved in 100 ml of methanol, the above diazo solution was dropwise added at 0° to 5° C. while controlling the pH value to 5 to 6 with aqueous-ammonia to conduct coupling. The precipitated crystals were filtered and dried to obtain 2.51 g of an azo compound as crystals of the following formula:

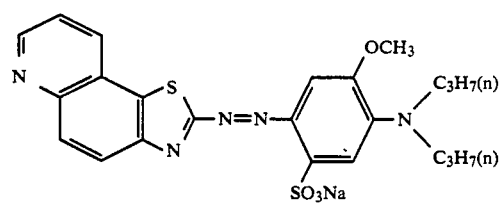

0.47 g of the azo compound was dissolved in 40 ml of methanol, and a solution of 0.15 g of nickel acetate Ni(CH$_3$COO)$_2$.4H$_2$O dissolved in 6 ml of methanol, was dropwise added at room temperature thereto, followed by stirring at the same temperature for 2 hours to obtain 0.26 g of a nickel chelate compound as black crystals of the following formula:

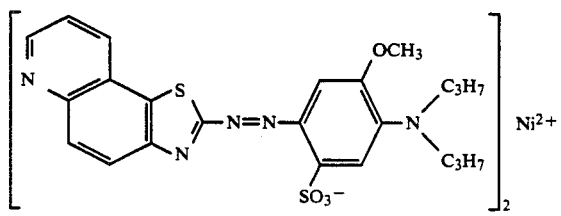

The physical properties of this compound are shown below.

Figure 2:
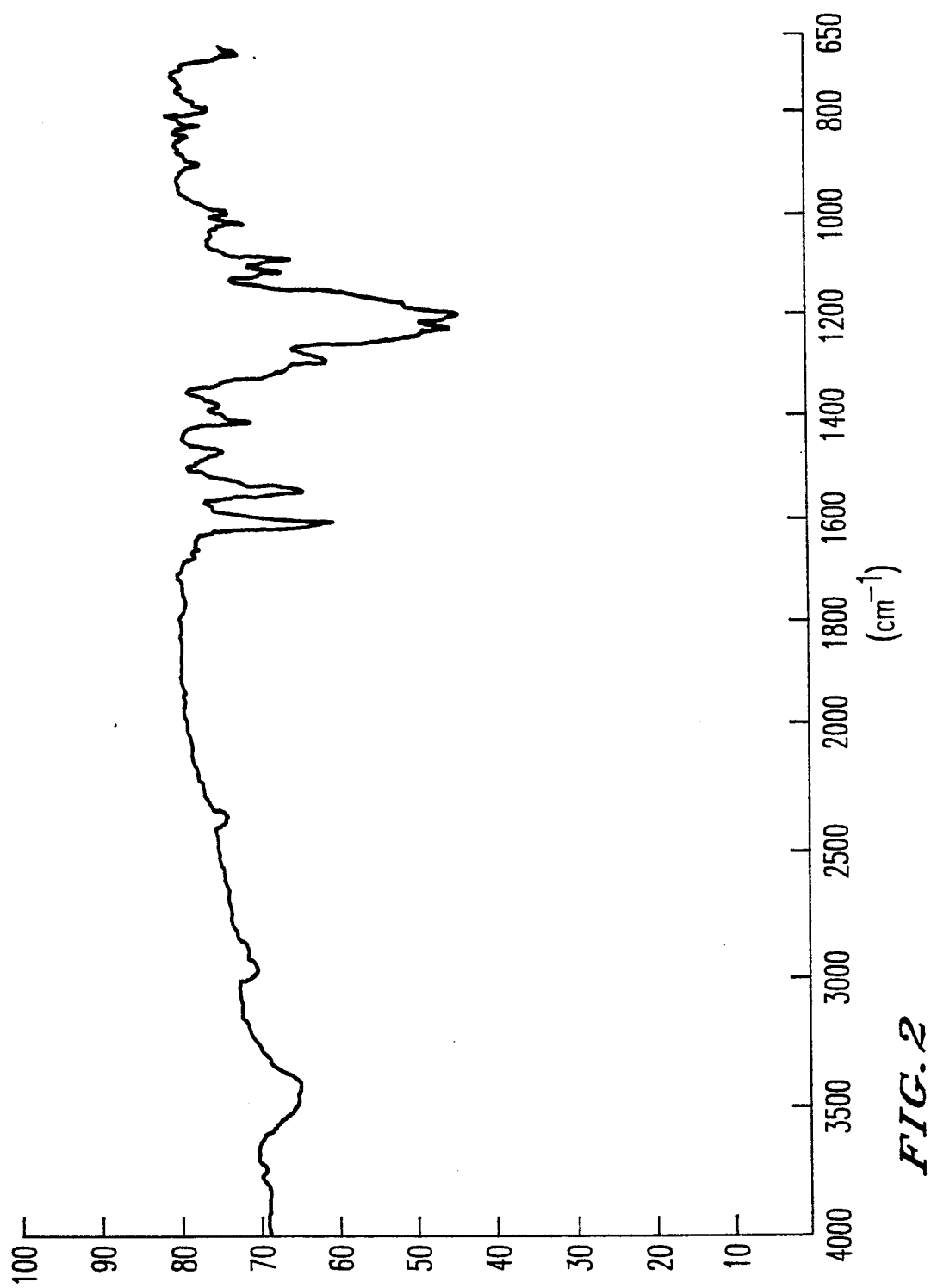
FIG. 2 is a graph showing the infrared absorption spectrum of the metal chelate compound in Example 6.

The IR spectrum is shown in FIG. 2.

Physical properties Melting point: not less than 250° C. $\lambda_{max}$ (chloroform): 696, 639 nm $\epsilon$ (molecular absorptivity coefficient): $14.6 \times 10^4$, $11.5 \times 10^4$ IR spectrum (KBr): 1590, 1530, 1390, 1280, 1210, 1180, 1100, 1080 cm$^{-1}$.

EXAMPLE 7

Preparation was conducted in the same manner as in Example 4 except that 3.80 g of a substituted aniline sulfonate acid derivative of the following formula:

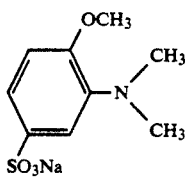

was employed instead of 4.64 g of the substituted aniline sulfonate acid derivative employed in Example 6 to obtain 2.15 g of an azo compound as crystals of the following formula:

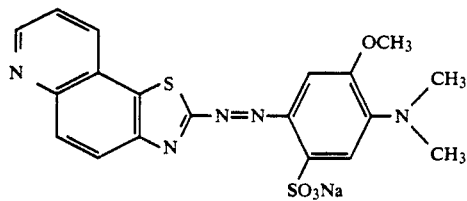

Preparation was conducted in the same manner as in Example 6 except that 0.3 g of the azo compound and 0.1 g of a nickel acetate were employed to obtain 0.18 g of a nickel chelate compound as black crystals of the following formula:

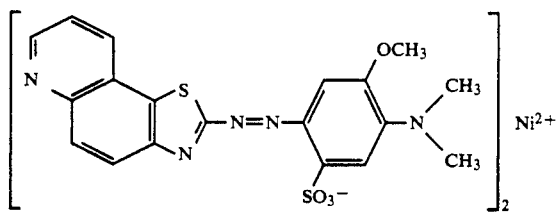

The physical properties of this compound are shown below.

Figure 3:
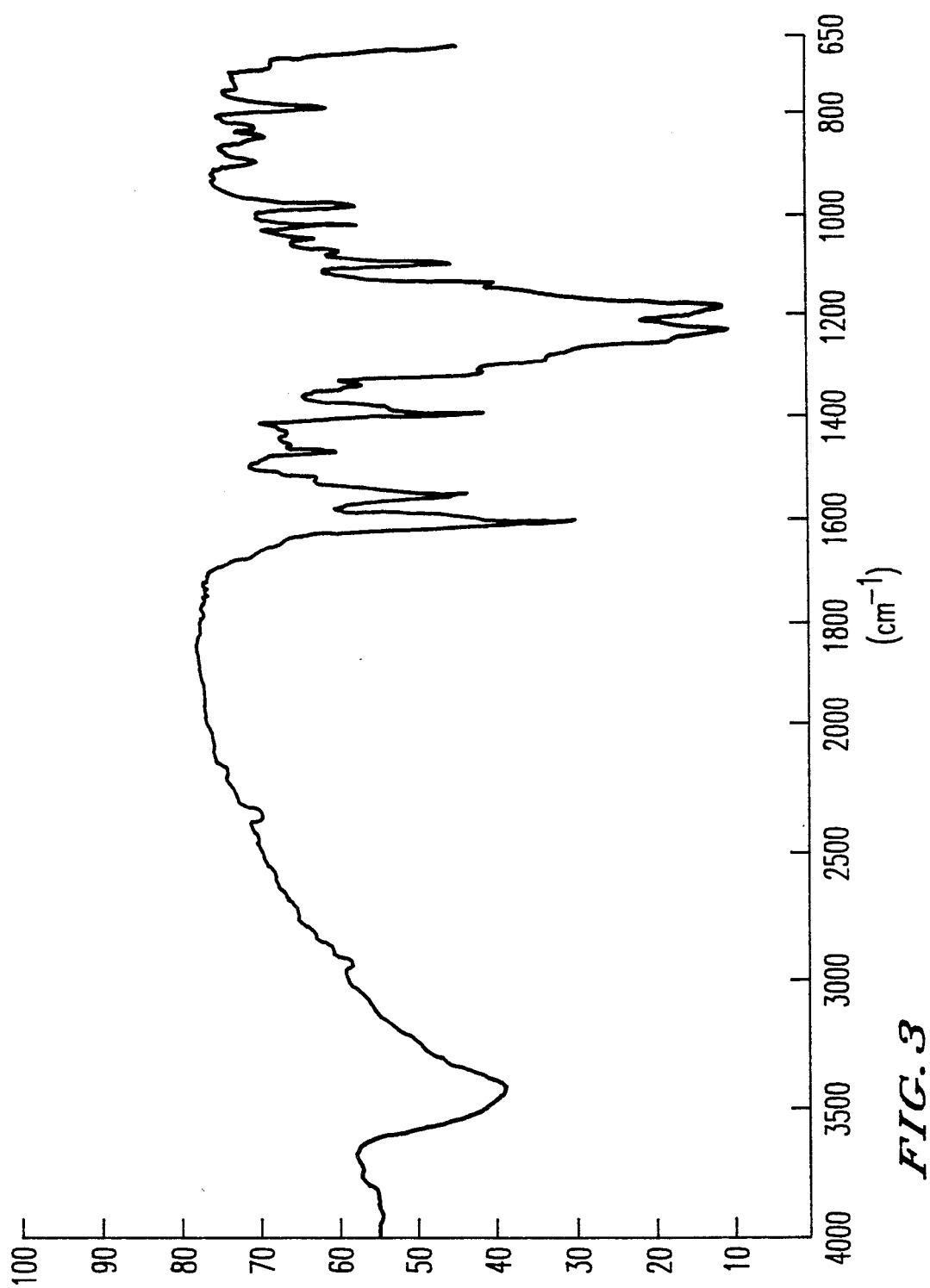
FIG. 3 is a graph showing the infrared absorption spectrum of the metal chelate compound in Example 7.

The IR spectrum is shown in FIG. 3.

Physical properties Melting point: not less than 250° C. $\lambda_{max}$ (chloroform): 686, 630 nm $\epsilon$ (molecular absorptivity coefficient): $12.2 \times 10^4$, $9.7 \times 10^4$ IR spectrum (KBr): 1590, 1540, 1380, 1220, 1170, 1080, 1000 cm$^{-1}$

EXAMPLE 8

Preparation was conducted in the same manner as in Example 7 except that 0.10 g of a cobalt acetate instead of the nickel acetate employed in Example 7 to obtain 0.18 g of a cobalt chelate compound as black crystals of the following formula:

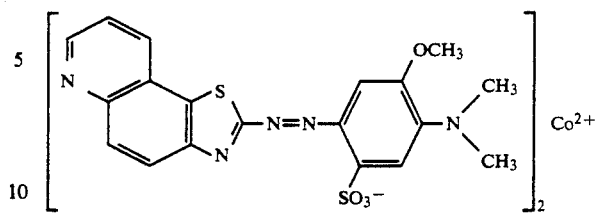

The physical properties of this compound are shown below.

Figure 4:
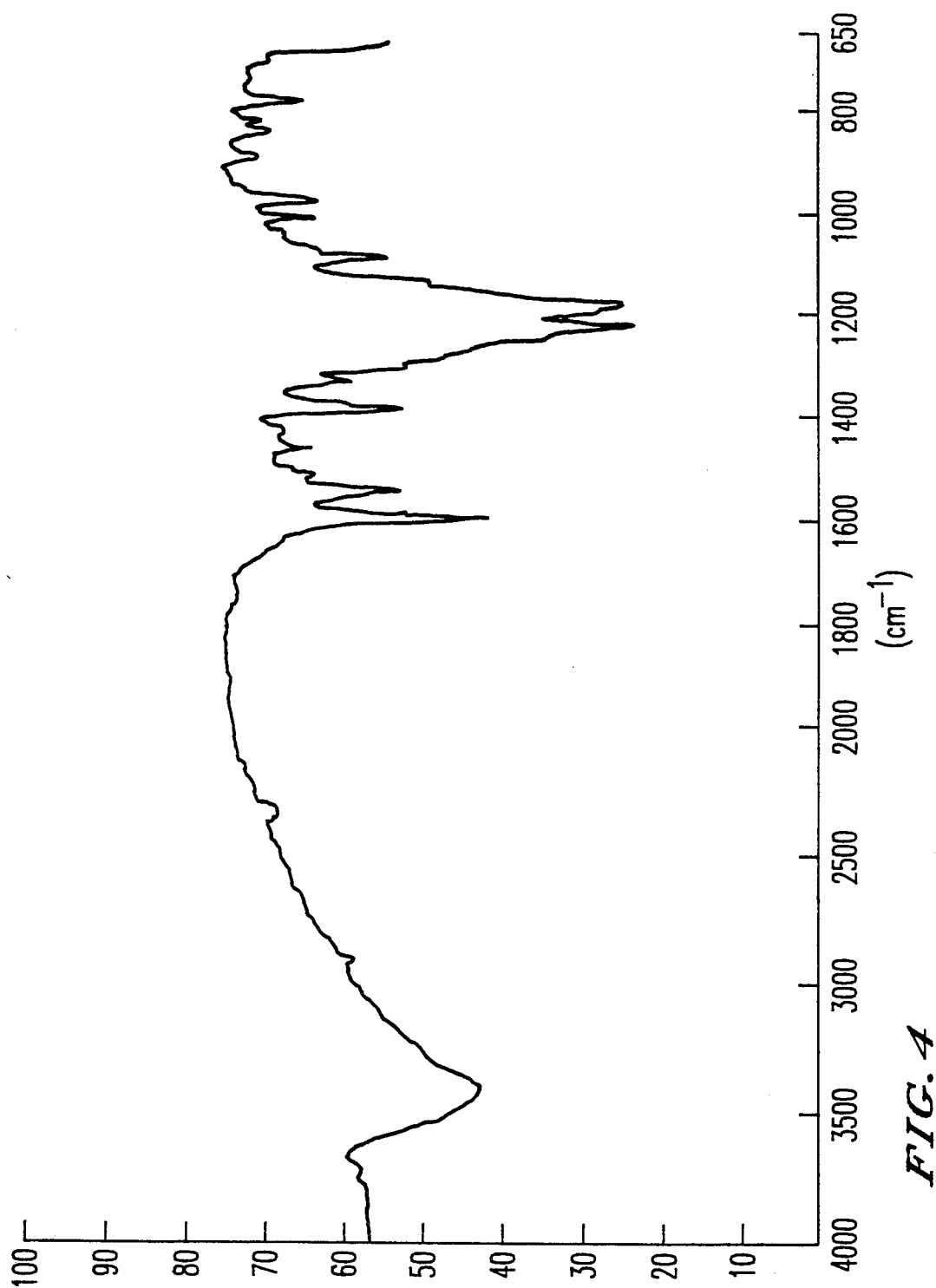
FIG. 4 is a graph showing the infrared absorption spectrum of the metal chelate compound in Example 8.

The IR spectrum is shown in FIG. 4.

Physical properties Melting point: not less than 250° C. $\lambda_{max}$ (chloroform): 686, 627 nm $\epsilon$ (molecular absorptivity coefficient): $9.8 \times 10^4$, $8.7 \times 10^4$ IR spectrum (KBr): 1590, 1540, 1380, 1220, 1170, 1080, 1000 cm$^{-1}$

EXAMPLE 9

2.50 g of a benzothiazole derivative of the following formula:

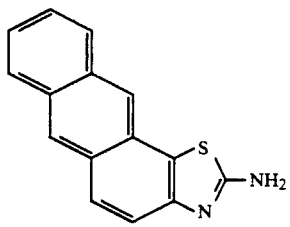

was dissolved in 25 ml of phosphoric acid, 25 ml of acetic acid and 8 ml of propionic acid, and cooled to 0° to 3° C., and then dropwise added with 3.38 g of 45% nitrosylsulfuric acid, followed by stirring at the same temperature for 2 hours to conduct diazotization.

On the other hand, to a solution having 2.81 g of a substituted aniline sulfonate acid derivative of the following formula:

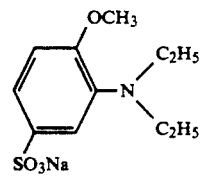

and 0.25 g of uric acid were dissolved in 100 ml of methanol, the above diazo solution was dropwise added while controlling the pH value to 5 to 6 with aqueous ammonia at 0° to 5° C. to conduct coupling. The precipitated crystals were filtered and dried to obtain 0.91 g of an azo compound as crystals of the following formula:

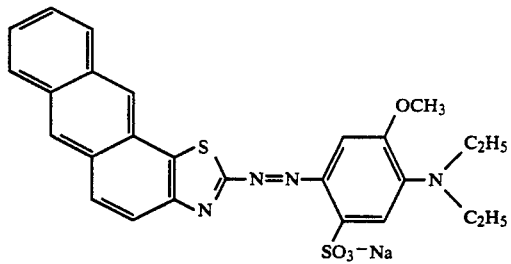

0.40 g of the azo compound was dissolved in 40 ml of methanol, and a solution of 0.11 g of nickel acetate Ni(CH$_3$COO)$_2$.4H$_2$O dissolved in 5 ml of methanol was dropwise added at room temperature, followed by stirring and the same temperature for 2 hours to obtain 0.25 g of a nickel chelate compound as black crystals of the following formula:

The absorption spectrum of this compound in a chloroform solution was $\lambda_{max}$ 713 nm, 665 nm, and the molecular absorptivity coefficient was $\epsilon = 5.8 \times 10^4$, $5.2 \times 10^4$.

EXAMPLE 10

Metal chelate compounds as shown in Table 1 were prepared in accordance with the methods of Examples 1 to 9, and their absorption spectra ($\lambda_{max}$) in a chloroform solution and molecular absorptivity coefficients ($\epsilon$) were measured.

TABLE I

| No. | Metal chelate compound | $\lambda_{max}$ | $\epsilon$ |
|---|---|---|---|
| 10-1 | (Pd$^{2+}$ complex) | 734 / 689 | $4.9 \times 10^4$ / $4.5 \times 10^4$ |
| 10-2 | (Ni$^+$ complex) | 657 / 612 | $8.7 \times 10^4$ / $8.4 \times 10^4$ |
| 10-3 | (Zn$^{2+}$ complex) | 633 / 601 | $7.1 \times 10^4$ / $7.4 \times 10^4$ |
| 10-4 | (Co$^{2+}$ complex) | 649 / 604 | $7.8 \times 10^4$ / $7.8 \times 10^4$ |
| 10-5 | (Ni$^{2+}$ complex) | 657 / 612 | $8.7 \times 10^4$ / $8.4 \times 10^4$ |

TABLE I-continued

| No. | Metal chelate compound | $\lambda_{max}$ | $\epsilon$ |
|---|---|---|---|
| 10-6 | [H3CO-benzothiazole-N=N-(OCH3, N(C2H5)2, SO3−)phenyl]2 Ni$^{2+}$ | 694<br>636 | $10.5 \times 10^4$<br>$8.5 \times 10^4$ |
| 10-7 | [H5C2O-benzothiazole-N=N-(OCH3, N(C2H5)2, SO3−)phenyl]2 Ni$^{2+}$ | 695<br>636 | $12.0 \times 10^4$<br>$9.8 \times 10^4$ |
| 10-8 | [H3CO-benzothiazole-N=N-(OCH3, N(C4H9)2, SO3−)phenyl]2 Ni$^{2+}$ | 699<br>639 | $12.7 \times 10^4$<br>$10.2 \times 10^4$ |
| 10-9 | [H5C2O-benzothiazole-N=N-(OCH3, N(C4H9)2, SO3−)phenyl]2 Ni$^{2+}$ | 700<br>641 | $12.4 \times 10^4$<br>$10.0 \times 10^4$ |
| 10-10 | [H5C2O-benzothiazole-N=N-(OCH3, N(C4H9)2, SO3−)phenyl]2 Co$^{2+}$ | 693<br>636 | $11.1 \times 10^4$<br>$10.1 \times 10^4$ |
| 10-11 | [H5C2O-benzothiazole-N=N-(OCH3, N(C3H7)2, SO3−)phenyl]2 Ni$^{+}$ | 697<br>640 | $12.0 \times 10^4$<br>$9.3 \times 10^4$ |
| 10-12 | [H3CO-benzothiazole-N=N-(OCH3, N(C3H7)2, SO3−)phenyl]2 Co$^{2+}$ | 691<br>633 | $10.3 \times 10^4$<br>$9.3 \times 10^4$ |

TABLE I-continued

| No. | Metal chelate compound | $\lambda_{max}$ | $\epsilon$ |
|---|---|---|---|
| 10-13 | [H3CO-benzothiazole-N=N-(OCH3, SO3−, N(C2H5)2)phenyl]2 Co2+ | 687<br>631 | $10.0 \times 10^4$<br>$9.0 \times 10^4$ |
| 10-14 | [H5C2O-benzothiazole-N=N-(OCH3, SO3−, N(C2H5)2)phenyl]2 Co2+ | 687<br>631 | $11.0 \times 10^4$<br>$9.9 \times 10^4$ |
| 10-15 | [H3CO2S-benzothiazole-N=N-(SO3−, N(C2H5)2)phenyl]2 Ni2+ | 648<br>600 | $6.4 \times 10^4$<br>$5.7 \times 10^4$ |
| 10-16 | [H3CO2S-benzothiazole-N=N-(OCH3, SO3−, N(C4H9)2)phenyl]2 Ni2+ | 666<br>624 | $11.5 \times 10^4$<br>$9.6 \times 10^4$ |
| 10-17 | [H3COC-benzothiazole-N=N-(OCH3, SO3−, N(C2H5)2)phenyl]2 Ni2+ | 683<br>628 | $4.9 \times 10^4$<br>$3.9 \times 10^4$ |
| 10-18 | [dioxino-benzothiazole-N=N-(OCH3, SO3−, N(C2H5)2)phenyl]2 Ni+ | 697<br>644 | $8.4 \times 10^4$<br>$6.5 \times 10^4$ |
| 10-19 | [quinoline-benzothiazole-N=N-(SO3−, N(C2H5)2)phenyl]2 Ni2+ | 659 | $12.1 \times 10^4$ |

TABLE I-continued
| No. | Metal chelate compound | $\lambda_{max}$ | $\epsilon$ |
|---|---|---|---|
| 10-20 | 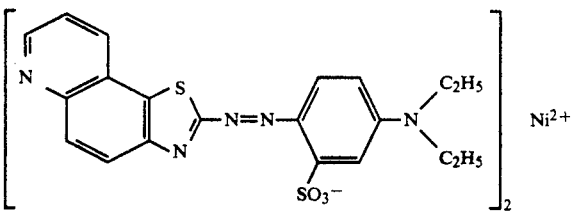 | 651<br>603 | $10.9 \times 10^4$<br>$10.6 \times 10^4$ |
| 10-21 | 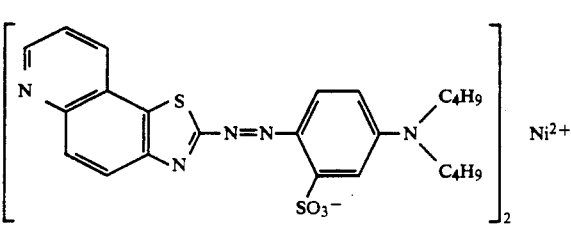 | 664<br>611 | $11.2 \times 10^4$<br>$10.1 \times 10^4$ |
| 10-22 | 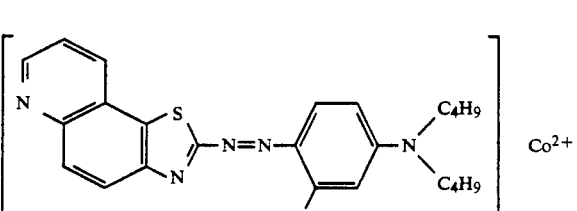 | 657<br>607 | $10.4 \times 10^4$<br>$10.0 \times 10^4$ |
| 10-23 | 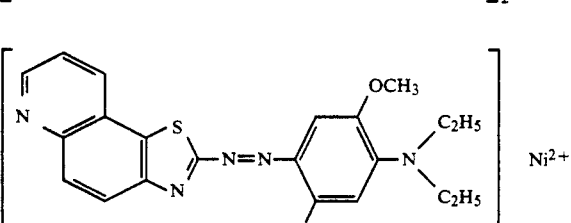 | 691<br>633 | $13.7 \times 10^4$<br>$10.5 \times 10^4$ |
| 10-24 | 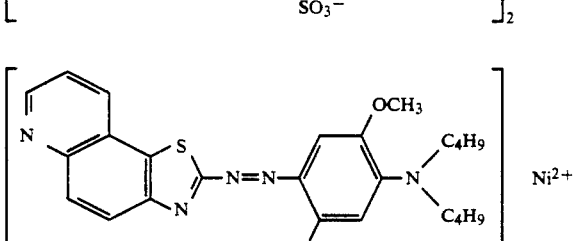 | 697<br>637 | $16.0 \times 10^4$<br>$12.6 \times 10^4$ |
| 10-25 | 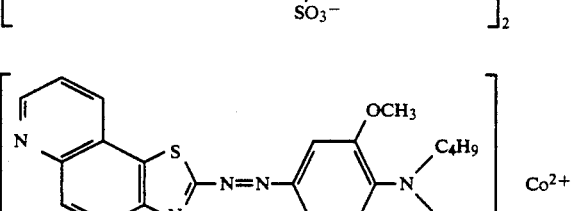 | 692<br>634 | $12.2 \times 10^4$<br>$11.4 \times 10^4$ |
| 10-26 | 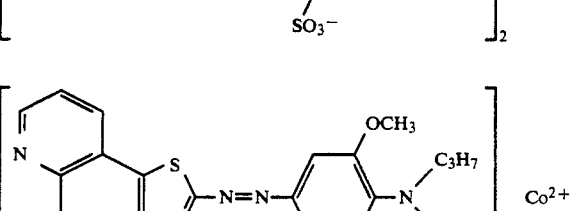 | 691<br>633 | $12.3 \times 10^4$<br>$10.8 \times 10^4$ |

TABLE I-continued

| No. | Metal chelate compound | $\lambda_{max}$ | $\epsilon$ |
|---|---|---|---|
| 10-27 | [Co chelate with quinoline-thiazole azo-phenyl(OCH₃, N(C₂H₅)₂, SO₃⁻)]₂ Co²⁺ | 689<br>632 | $6.7 \times 10^4$<br>$5.8 \times 10^4$ |
| 10-28 | [Ni chelate with quinoline-thiazole azo-phenyl(OCH₃, N(C₂H₅)(C₄H₉), SO₃⁻)]₂ Ni²⁺ | 692<br>635 | $14.6 \times 10^4$<br>$11.3 \times 10^4$ |
| 10-29 | [Ni chelate with Cl, OHC-substituted thiazole azo-phenyl(N(C₂H₅)₂, SO₃⁻)]₂ Ni²⁺ | 657<br>608 | $12.1 \times 10^4$<br>$10.6 \times 10^4$ |
| 10-30 | [Ni chelate with Cl, (NC)₂C=CH-substituted thiazole azo-phenyl(N(C₂H₅)₂, SO₃⁻)]₂ Ni²⁺ | 694 | $9.6 \times 10^4$ |

EXAMPLE 11

Solutions obtained by employing complexes of azo compounds and metals as shown in Table 2 instead of the chelate compound of the azo compound and metal employed in Example 1, were coated on substrates to obtain optical recording media having maximum absorption wavelength of their coated layers as shown in Table 2. On the recording media thus obtained, signals were recorded with a semiconductor laser as a light source, and it was found that the sensitivity was good and the light fastness and storage stability were excellent.

TABLE 2

| No. | Azo compound | Metal compound | Maximum absorption wavelength of coated layer (nm) |
|---|---|---|---|
| 11-1 | Benzothiazole-2-yl–N=N–phenyl(N(C₂H₅)₂, SO₃Na) | Ni(BF₄)₂ | 674 |
| 11-2 | 5,6-dimethyl-benzothiazole-2-yl–N=N–phenyl(N(C₂H₅)₂, SO₃Na) | Ni(BF₄)₂ | 677 |
| 11-3 | 6-ethyl-benzothiazole-2-yl–N=N–phenyl(N(C₂H₅)₂, SO₃Na) | Ni(BF₄)₂ | 677 |

TABLE 2-continued

| No. | Azo compound | Metal compound | Maximum absorption wavelength of coated layer (nm) |
|---|---|---|---|
| 11-4 | H₃CO-benzothiazole-N=N-phenyl(N(C₂H₅)₂)(SO₃Na) | Ni(BF₄)₂ | 675 |
| 11-5 | H₅C₂O-benzothiazole-N=N-phenyl(N(C₂H₅)₂)(SO₃Na) | NiCl₂ | 675 |
| 11-6 | Cl-benzothiazole-N=N-phenyl(N(C₂H₅)₂)(SO₃Na) | NiCl₂ | 684 |
| 11-7 | Cl,Cl-benzothiazole-N=N-phenyl(N(C₄H₉(n))₂)(SO₃Na) | NiCl₂ | 688 |
| 11-8 | Br-benzothiazole-N=N-phenyl(N(C₂H₅)₂)(SO₃Na) | Ni(CH₃COO)₂ | 686 |
| 11-9 | CH₃-benzothiazole-N=N-phenyl(N(C₃H₇(n))₂)(SO₃Na) | Ni(CH₃COO)₂ | 680 |
| 11-10 | CH₃-benzothiazole-N=N-phenyl(N(C₄H₉(n))₂)(SO₃Na) | Ni(CH₃COO)₂ | 682 |
| 11-11 | NC-benzothiazole-N=N-phenyl(OCH₃)(N(C₄H₉)₂)(SO₃H) | Ni(CH₃COO)₂ | 712 |
| 11-12 | CF₃-benzothiazole-N=N-phenyl(OCH₃)(N(C₂H₅)₂)(SO₃H) | Ni(CH₃COO)₂ | 700 |

TABLE 2-continued

| No. | Azo compound | Metal compound | Maximum absorption wavelength of coated layer (nm) |
|---|---|---|---|
| 11-13 | CF$_3$O-benzothiazole-N=N-(OCH$_3$, SO$_3$H)phenyl-N(C$_4$H$_9$)$_2$ | Ni(CH$_3$COO)$_2$ | 705 |
| 11-14 | NC-benzothiazole-N=N-(OCH$_3$, SO$_3$H)phenyl-N(C$_2$H$_5$)$_2$ | Ni(CH$_3$COO)$_2$ | 710 |
| 11-15 | CF$_3$-benzothiazole-N=N-(OCH$_3$, SO$_3$H)phenyl-N(C$_4$H$_9$)$_2$ | Ni(CH$_3$COO)$_2$ | 701 |
| 11-16 | CH$_3$-benzothiazole-N=N-(OCH$_3$, SO$_3$H)phenyl-N(C$_4$H$_9$)$_2$ | Ni(CH$_3$COO)$_2$ | 715 |
| 11-17 | OHC-benzothiazole-N=N-(SO$_3$H)phenyl-N(C$_2$H$_5$)$_2$ | Ni(CH$_3$COO)$_2$ | 693 |
| 11-18 | (CH$_3$)$_2$HC-benzothiazole-N=N-(OCH$_3$, SO$_3$H)phenyl-N(C$_2$H$_5$)$_2$ | Ni(CH$_3$COO)$_2$ | 712 |
| 11-19 | H$_3$C-benzothiazole-N=N-tetramethyltetrahydroquinoline(SO$_3$H, N-C$_4$H$_9$(n)) | Ni(CH$_3$COO)$_2$ | 715 |
| 11-20 | F$_3$C-benzothiazole-N=N-tetramethyltetrahydroquinoline(SO$_3$H, N-C$_4$H$_9$(n)) | Ni(CH$_3$COO)$_2$ | 718 |
| 11-21 | H$_3$C-benzothiazole-N=N-dihydroquinoline(SO$_3$H, N-C$_2$H$_4$OCH$_3$) | Ni(CH$_3$COO)$_2$ | 709 |

TABLE 2-continued

| No. | Azo compound | Metal compound | Maximum absorption wavelength of coated layer (nm) |
|---|---|---|---|
| 11-22 | ![structure] | Ni(CH₃COO)₂ | 713 |
| 11-23 | ![structure] | Ni(CH₃COO)₂ | 715 |
| 11-24 | ![structure] | Ni(CH₃COO)₂ | 713 |
| 11-25 | ![structure] | Ni(CH₃COO)₂ | 715 |

EXAMPLE 12

(a) Preparation of a compound 3.90 g of 2-amino-5-nitrobenzothiazole of the following structural formula:

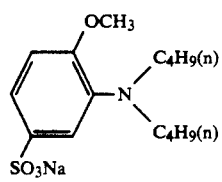

was dissolved in a solution of 17.8 of phosphuric acid and 1.0 g of sulfuric acid at 40° to 50° C., and 6.3 ml of acetic acid was added thereto at the same temperature. After the solution was cooled to 0° to 10° C., 2.43 g of sulfuric acid was added, and 6.78 g of 45% nitrosylsulfuric acid was added at 0° to −5° C., followed by stirring at the same temperature for 2 hours to conduct diazotization.

On the other hand, to a solution of 10.1 g of a substituted aniline sulfonate acid derivative of the following structural formula:

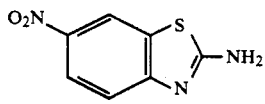

dissolved in 500 ml of methanol, the diazo solution thus obtained was dropwise added at 0° to 5° C., followed by coupling while controlling the pH value to 5 to 6 with aqueous ammonia. The precipitated crystals were filtered and dried to obtain 5.94 g of an azo compound as black crystals of the following structural formula:

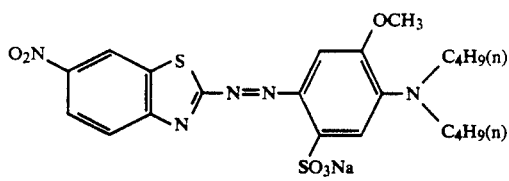

Figure 5:
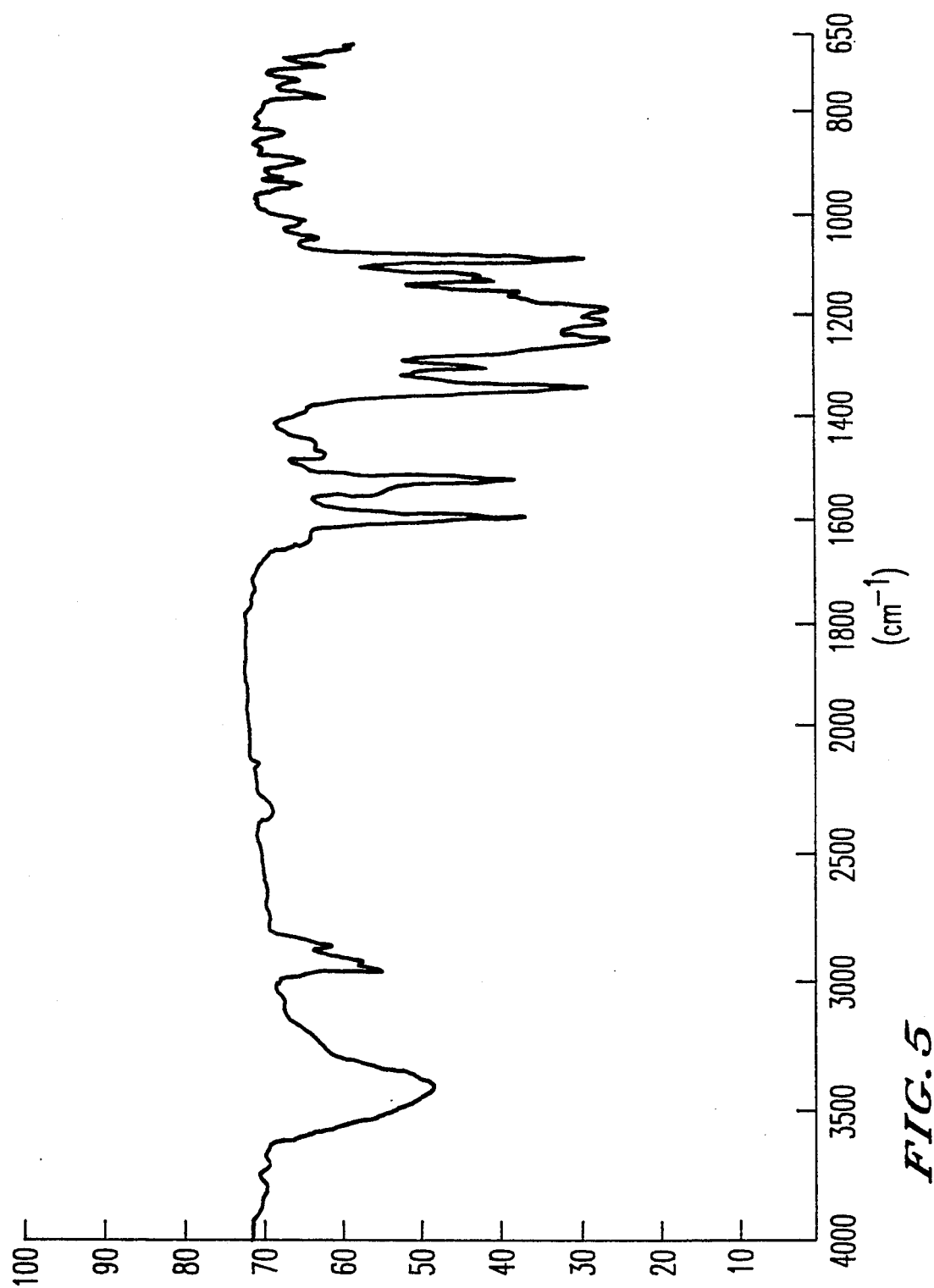
FIG. 5 is a graph showing the infrared absorption spectrum of the azo compound to be used for the syntheses of the metal chelate compound of Example 12.

Physical properties of this compound were as shown below. The IR spectrum thereof is shown in FIG. 5.

Physical properties Melting point: 219° C. (decomposition) λ$_{max}$ (methanol): 578 nm IR spectrum (KBr): 2960, 1590, 1520, 1340, 1300, 1240, 1200, 1180, 1090 cm$^{-1}$ 5.94 g of the azo compound obtained above was dissolved in 2000 ml of methanol, and a solution of 1.63 g of nickel acetate Ni(CH;COO)₂.4H₂O dissolved in 200 ml of methanol was dropwise added at room temperature, followed by stirring at the same temperature for 5 hours. The precipitated crystals were filtered and dried to obtain 5.0 g of a nickel chelate compound of an azo compound as black crystals of the following structural formula:

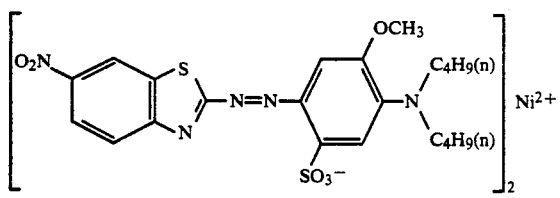

Figure 6:
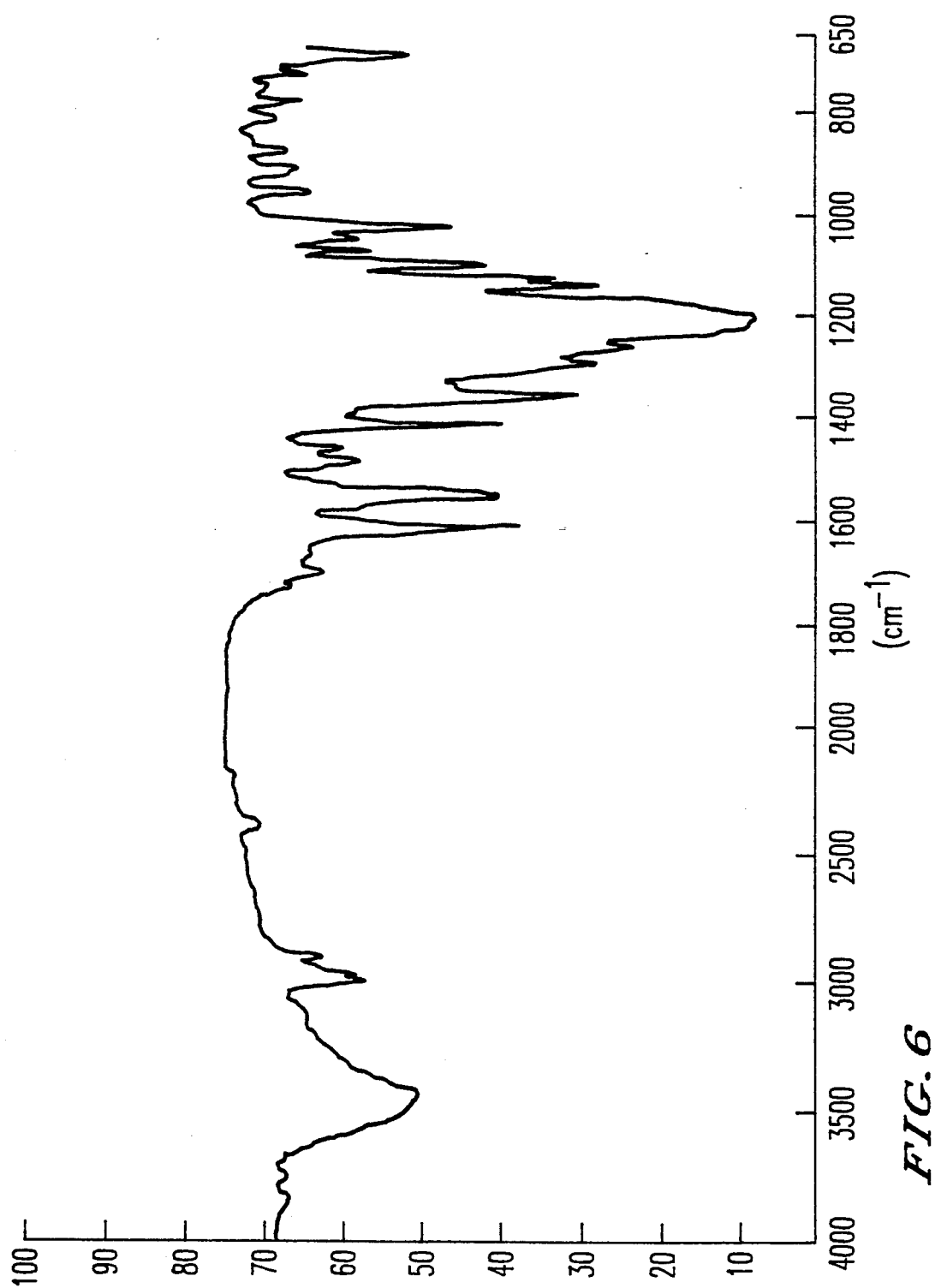
FIG. 6 is graph showing the infrared absorption spectrum of the metal chelate compound in Example 12.
Figure 7:
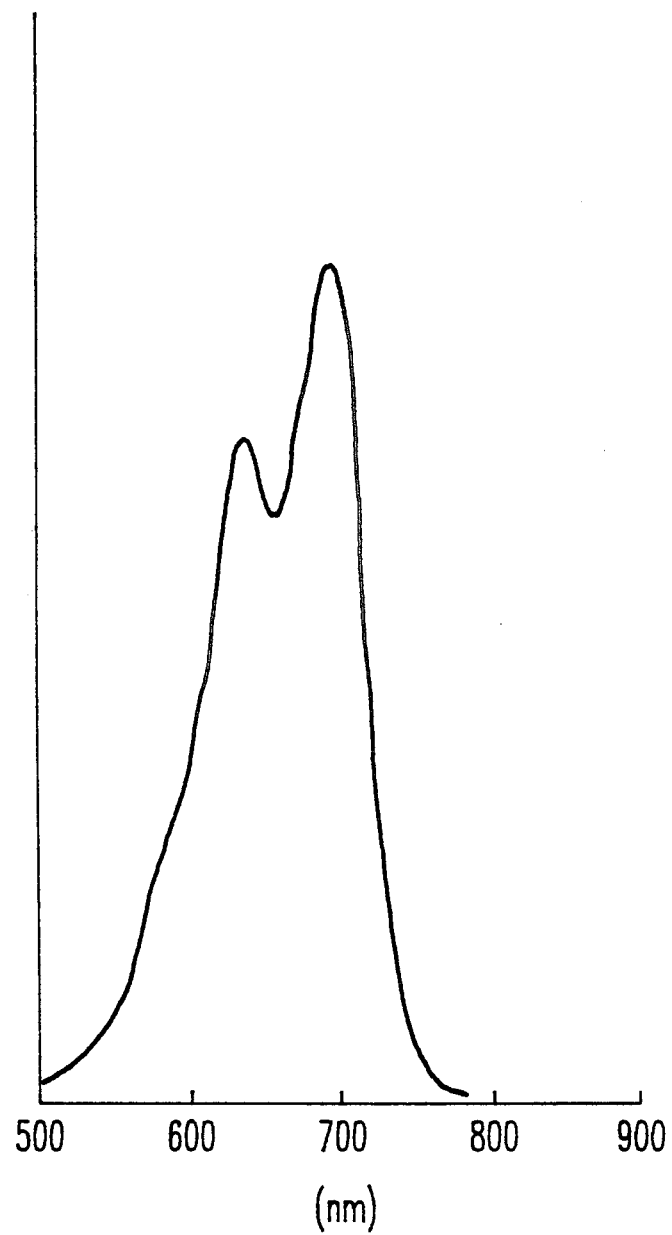
FIGS. 7 and 8 are graphs showing the visible region absorption spectrum of the metal chelate compound of Example 12 in a solution and the visible region absorption spectrum of the coated thin layer, respectively.

Physical properties of this compound are shown below. The IR spectrum of this compound is shown in FIG. 6 and absorption spectrum thereof in a solution (chloroform) is shown in FIG. 7.

Figure 8:
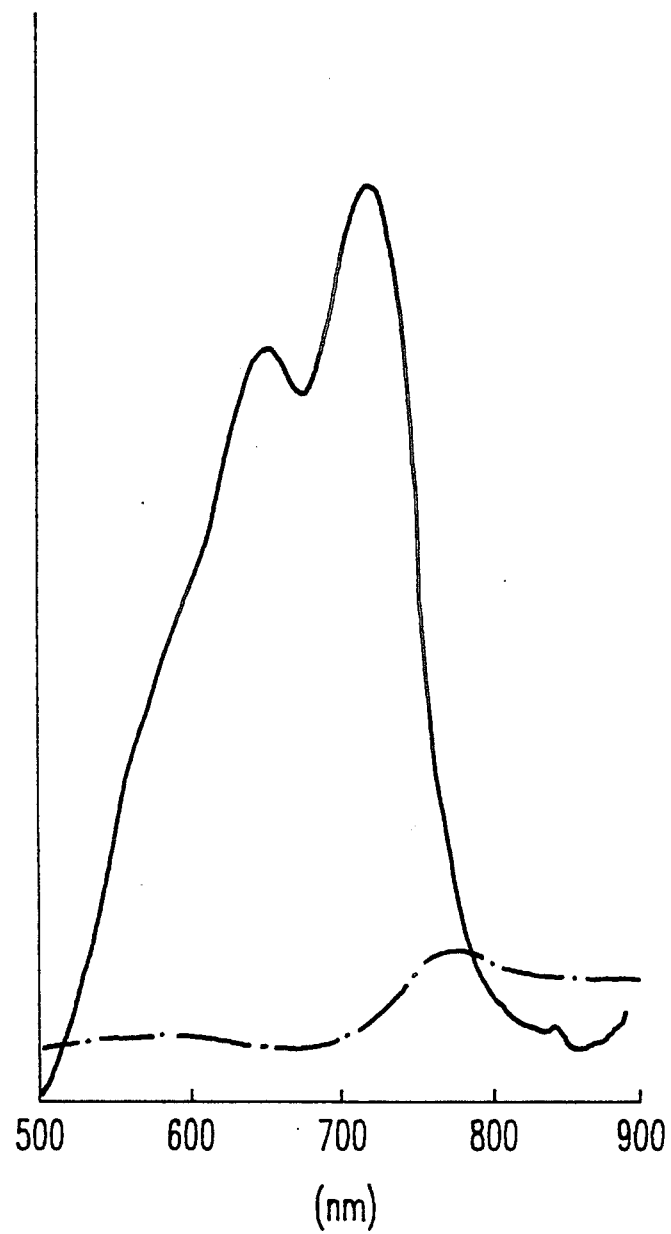

Physical properties Melting point: 216° C. (decomposition) $\lambda_{max}$ (methanol): 632, 692 nm $\epsilon$ (molecular absorptivity coefficient): $12.2\times10^4$, $15.1\times10^4$ IR spectrum (KBr): 2980, 1600, 1540, 1400, 1340, 1200 cm$^{-1}$ (b) Preparation of an optical recording medium The nickel chelate compound of the azo compound obtained in the above preparation step (a) was dissolved in octafluoropentanol to prepare a 1.0% by weight solution, and it was coated on a polycarbonate substrate having a diameter of 120 mm and a thickness of 1.2 mm by a spinner method (rotational speed: 500 rpm). The maximum absorption wavelength of the coated layer was 719 nm as shown in FIG. 8. Then, on the coated layer, gold was deposited to form a reflecting layer. Further, the surface of the reflecting layer was hard coat treated with an ultraviolet curable resin to prepare an optical recording medium.

(c) Evaluation of recording properties

EFM signals were recorded on the prepared optical recording medium with a semiconductor laser beam having a central waveform of 780 nm, and reproduced. The recording sensitivity and the degree of modulation ($I_{11}/I_{toP}$) were measured while setting the optimum output at the position where $$\beta = \frac{(A_1 + A_2)}{A_1 - A_2}$$

is 0 in the reproduced waveform, whereby good initial recording properties of the recording sensitivity: 7.5 mW and the degree of modulation: 70% were obtained.

Further, tests for light fastness (Xenone Fade Meter Accelerated Test: 60 hours) and for storage stability (70° C., 85% RH: 500 hours) were conducted to the prepared optical medium, whereby no deterioration in the sensitivity and the reproduced signals was observed as compared with the initial values, thus indicating that the medium was excellent as an optical recording medium.

EXAMPLE 13

(a) Preparation

Preparation was conducted in the same manner as in Example 12 except that 9.56 g of a substituted aniline sulfonate acid derivative of the following structural formula:

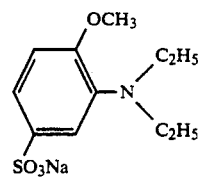

was employed instead of 10.1 g of the substituted aniline sulfonate derivative employed in Example 12 to obtain 4.8 g of a nickel chelate compound as black crystals of the following structure formula:

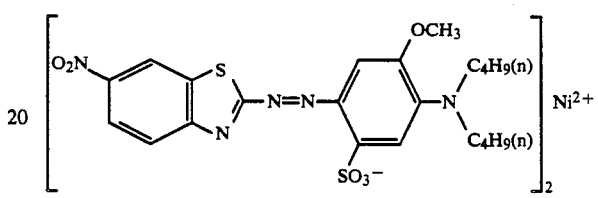

Figure 9:
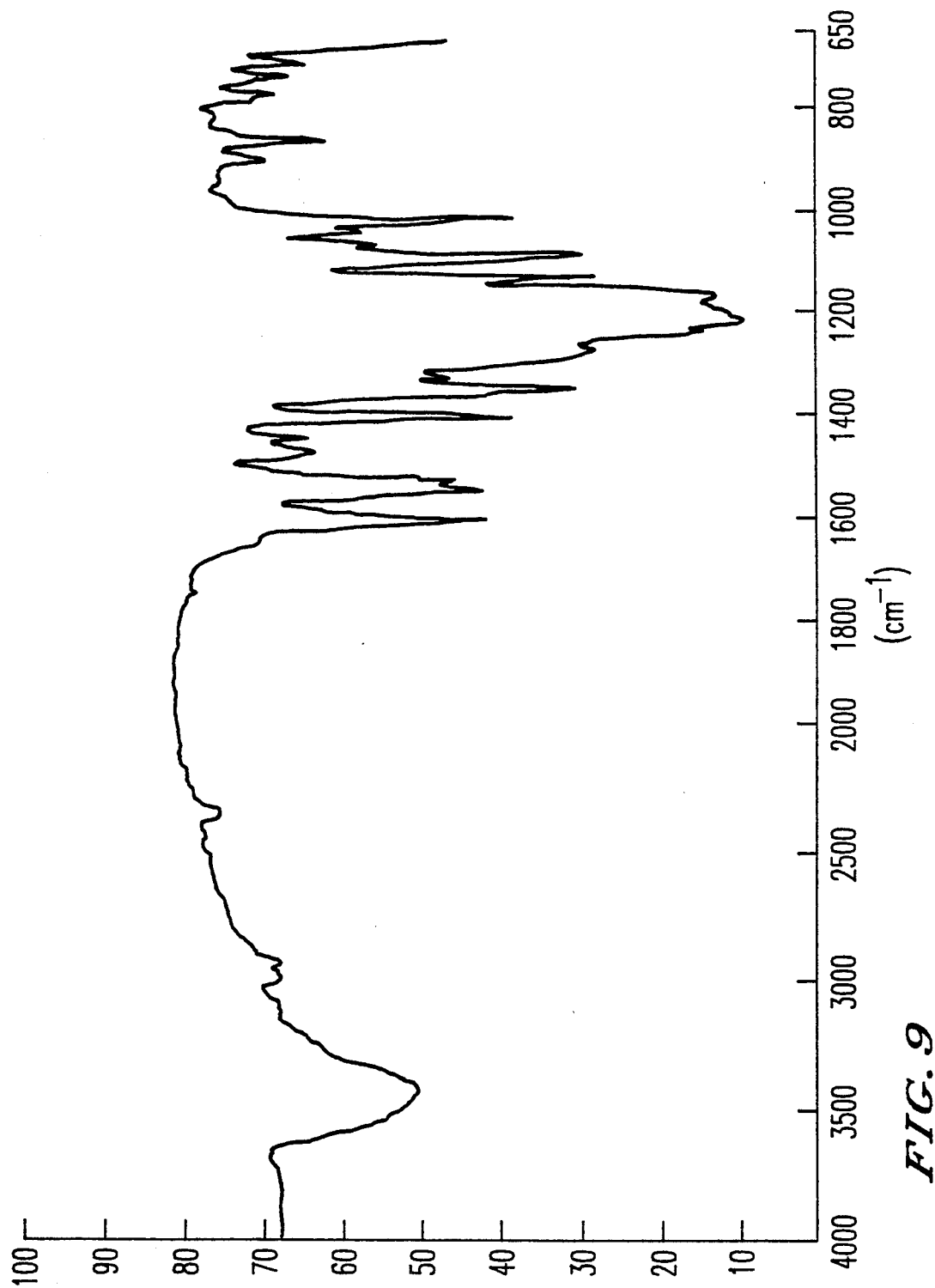
FIG. 9 is a graph showing the infrared absorption spectrum of the metal chelate compound in Example 13.

The physical properties of this compound are shown below. The IR spectrum is shown in FIG. 9.

Physical properties Melting point: not less than 280° C. $\lambda_{max}$ (chloroform): 628, 688 nm $\epsilon$ (molecular absorptivity coefficient): $11.9\times10^4$, $15.0\times10^4$ IR spectrum (KBr): 1600, 1540, 1400, 1340, 1210, 1120, 1080, 1000 cm$^{-1}$ (b) Preparation of an optical recording medium A 3-hydroxy-3-methyl-butanone solution containing 1.0% by weight of the nickel chelate compound of the azo compound obtained in the above preparation step (a) was prepared. The solution was coated on a polycarbonate substrate having a diameter of 120 mm and a thickness of 1.2 mm by a spinner method (rotational speed: 500 rpm). The maximum absorption wavelength of the coated layer was 713 nm. On the coated layer, gold was deposited to form a reflecting layer. Further, on this reflecting layer, hard coat treatment was conducted with an ultraviolet curable resin to prepare an optical recording medium.

(c) Evaluation of recording properties

EFM signals were recorded on the prepared optical recording medium with a semiconductor laser beam having a central waveform of 780 nm. The recording sensitivity and the degree of modulation ($I_{11}/I_{toP}$) of the reproduced waveform was measured in the same manner as in Example 12, whereby good initial recording properties of the recording sensitivity: 7.2 mW and the degree of modulation: 72% were obtained.

Further, tests for light fastness and for storage stability were conducted in the same manner as in Example 12, whereby no deterioration in the sensitivity and the reproduced signals was observed as compared with initial values, thus indicating that the medium was excellent as an optical recording medium.

EXAMPLE 14

4.52 g of a mixture of a nickel chelate compound of the following structural formula:

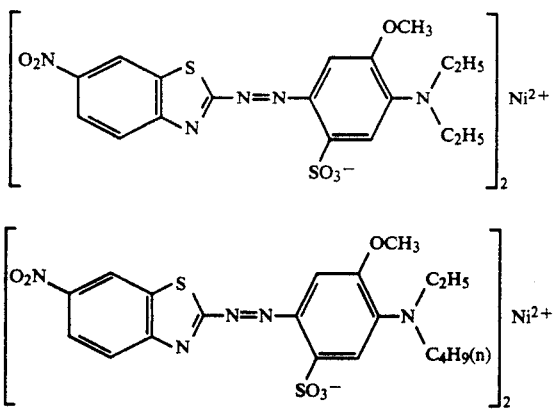

was obtained in the same manner as in Example 12 except that 9.69 g of a mixture of substituted aniline sulfonate derivatives of the following structural formulas:

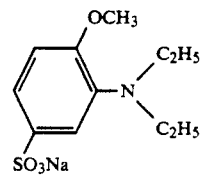

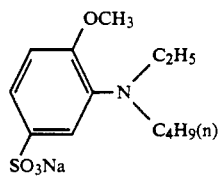

was employed in the ratio of 1:1 instead of 10.1 g of the substituted aniline sulfonate derivative employed in Example 12.

Physical properties Melting point: not less than 280° C. $\lambda_{max}$ (chloroform): 629, 688 nm $\epsilon$ (molecular absorptivity coefficient): $12.0 \times 10^4$, $15.2 \times 10^4$

EXAMPLE 15

4.73 g of a cobalt chelate compound of the following structural formula:

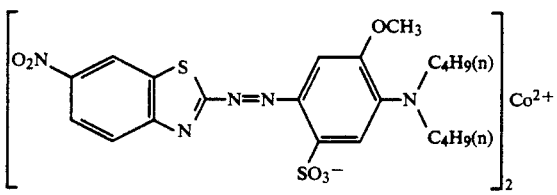

was obtained in the same manner as in Example 12 except that 1.63 g of a cobalt acetate was employed instead of 1.63 g of the nickel acetate employed in Example 12.

Physical properties Melting point: 243° C. (decomposition) $\lambda_{max}$ (chloroform): 632, 692 nm

EXAMPLE 16

4.28 g of an aminothiazole derivative of the following structural formula:

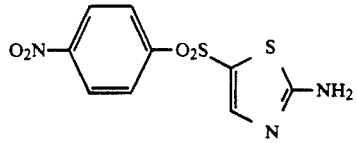

was dissolved in a solution of 7.5 ml of acetic acid and 15 ml of sulfuric acid at 40° to 50° C. The solution was cooled to 0° to 5° C. and added with 5.08 g of 45% nitrosylsulfuric acid, and then 19 ml of water was dropwise added thereto, followed by stirring at the same temperature for 2 hours to conduct diazotization.

On the other hand, the diazo solution obtained above was dropwise added at 0° to 5° C. to a solution of 5.06 g of a substituted aniline sulfonate derivative of the following structural formula:

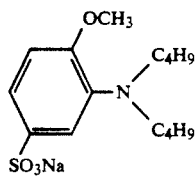

and 0.3 g of uric acid dissolved in 150 ml of methanol, and coupling was conducted while controlling the pH value to 5 to 6 with aqueous ammonia. The precipitated crystals were filtered and dried to obtain 2.01 g of an azo compound as black crystals of the following structural formula:

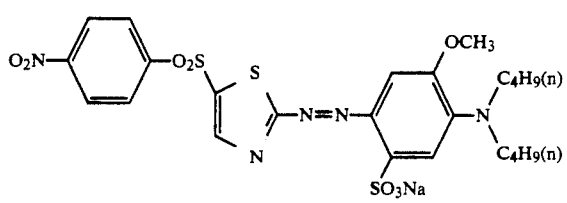

0.4 g of the obtained azo compound was dissolved in 40 ml of methanol, and then a solution of 0.1 g of nickel acetate Ni(CH$_3$COO)$_2$.4H$_2$O dissolved in 4 ml of methanol, was dropwise added at room temperature, followed by stirring at the same temperature for 5 hours. The precipitated crystals were filtered and dried to obtain 0.1 g of a nickel chelate compound as black crystals of the following structural formula:

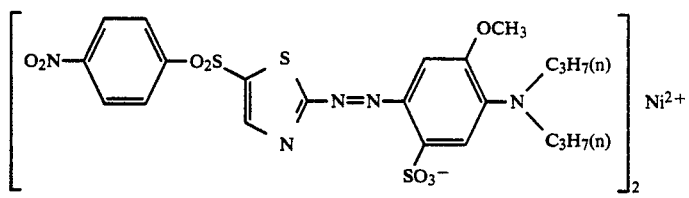

Figure 10:
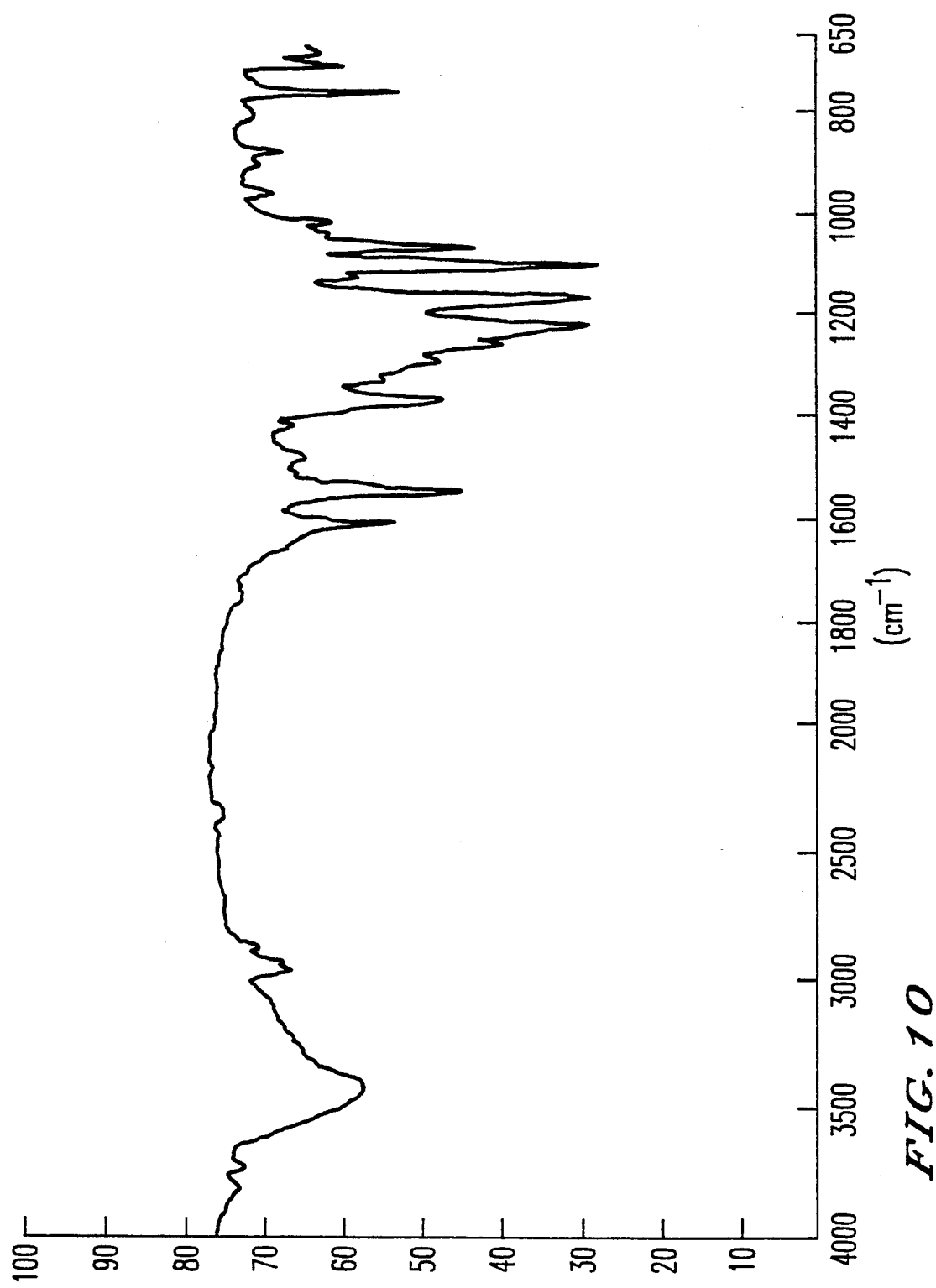
FIG. 10 is a graph showing the infrared absorption spectrum of the metal chelate compound in Example 16.

The IR spectrum is shown in FIG. 10.

Physical properties Melting point: 217° C. (decomposition) $\lambda_{max}$ (chloroform): 628, 676 nm

EXAMPLE 17

Reaction was conducted in accordance with the method of Example 12 except that diazo components as shown in Table 3 were employed instead of 2-amino-5-nitrothiazole employed in Example 12, coupling components as shown in Table 3 were employed instead of the substituted aniline sulfonate derivative employed in Example 12 and metallic salts as shown in Table 3 were employed instead of the nickel acetate employed in Example 12, whereby the metal chelate compounds as shown in Table 4 were obtained.

The maximum absorption ($\lambda_{max}$) of the visible absorption spectrum of the obtained compounds in an chloroform solution and the maximum absorption ($\lambda_{max}$) of the absorption spectrum of the coated layers are as shown in Table 4.

TABLE 3

| Example | Diazo component | Coupling component | Metallic salt |
|---|---|---|---|
| 17-1 | O₂N-benzothiazole-NH₂ | 2-OCH₃, 5-SO₃Na, N(C₃H₇(n))₂ aniline | Ni(CH₃COO)₂·4H₂O |
| 17-2 | O₂N-benzothiazole-NH₂ | 2-OCH₃, 5-SO₃Na, N(CH₃)₂ aniline | Ni(CH₃COO)₂·4H₂O |
| 17-3 | O₂N-benzothiazole-NH₂ | 3-SO₃Na, N(C₂H₅)₂ aniline | Ni(CH₃COO)₂·4H₂O |
| 17-4 | O₂N-benzothiazole-NH₂ | 3-SO₃Na, N(C₂H₅)₂ aniline | Co(CH₃COO)₂·4H₂O |
| 17-5 | O₂N-benzothiazole-NH₂ | 2-OCH₃, 5-SO₃Na, N(C₄H₉(n))₂ aniline | Ni(CH₃COO)₂·4H₂O |
| 17-6 | Cl,O₂N-benzothiazole-NH₂ | 2-OCH₃, 5-SO₃Na, N(C₄H₉(n))₂ aniline | Ni(CH₃COO)₂·4H₂O |

TABLE 3-continued

| | Structure 1 | Structure 2 | Reagent |
|---|---|---|---|
| 17-7 | 6-Br, 5-$O_2N$ benzothiazole-2-$NH_2$ | 2-$OCH_3$, 5-$SO_3Na$, N,N-di-$C_4H_9(n)$ aniline | $Ni(CH_3COO)_2 \cdot 4H_2O$ |
| 17-8 | 6-F, 5-$O_2N$ benzothiazole-2-$NH_2$ | 2-$OCH_3$, 5-$SO_3Na$, N,N-di-$C_4H_9(n)$ aniline | $Ni(CH_3COO)_2 \cdot 4H_2O$ |
| 17-9 | 6-$CH_3$, 5-$O_2N$ benzothiazole-2-$NH_2$ | 2-$OCH_3$, 5-$SO_3Na$, N,N-di-$C_4H_9(n)$ aniline | $Ni(CH_3COO)_2 \cdot 4H_2O$ |
| 17-10 | 4-$O_2N$-phenyl-$SO_2$-thiazole-2-$NH_2$ | 3-$SO_3Na$, N,N-di-$C_2H_5$ aniline | $Ni(CH_3COO)_2 \cdot 4H_2O$ |

| | Metal chelate compound | In the solution $\lambda_{max}$ | Coated layer $\lambda_{max}$ |
|---|---|---|---|
| 17-1 | [6-$O_2N$-benzothiazole-2-N=N-(4-$OCH_3$, 2-$SO_3^-$, N,N-di-$C_3H_7(n)$-phenyl)]$_2$ $Ni^{2+}$ | 632, 690 | 717 |
| 17-2 | [6-$O_2N$-benzothiazole-2-N=N-(4-$OCH_3$, 2-$SO_3^-$, N,N-di-$CH_3$-phenyl)]$_2$ $Ni^{2+}$ | 625, 685 | 712 |
| 17-3 | [6-$O_2N$-benzothiazole-2-N=N-(2-$SO_3^-$, N,N-di-$C_2H_5$-phenyl)]$_2$ $Ni^{2+}$ | 605, 657 | 684 |
| 17-4 | [6-$O_2N$-benzothiazole-2-N=N-(2-$SO_3^-$, N,N-di-$C_2H_5$-phenyl)]$_2$ $Co^{2+}$ | 605, 656 | 682 |

TABLE 3-continued

| | Metal chelate compound | In the solution $\lambda_{max}$ | Coated layer $\lambda_{max}$ |
|---|---|---|---|
| 17-5 | [structure: 6-nitrobenzothiazole-N=N-phenyl with OCH₃, N(C₄H₉(n))₂, SO₃⁻]₂ Ni²⁺ | 632, 690 | 718 |
| 17-6 | [structure: 6-chloro-5-nitrobenzothiazole-N=N-phenyl with OCH₃, N(C₄H₉(n))₂, SO₃⁻]₂ Ni²⁺ | 634, 691 | 718 |
| 17-7 | [structure: 6-bromo-5-nitrobenzothiazole-N=N-phenyl with OCH₃, N(C₄H₉(n))₂, SO₃⁻]₂ Ni²⁺ | 635, 692 | 719 |
| 17-8 | [structure: 6-fluoro-5-nitrobenzothiazole-N=N-phenyl with OCH₃, N(C₄H₉(n))₂, SO₃⁻]₂ Ni²⁺ | 636, 693 | 720 |

TABLE 4

| | Metal chelate compound | In the solution $\lambda_{max}$ | Coated layer $\lambda_{max}$ |
|---|---|---|---|
| 17-9 | [structure: 6-fluoro-5-nitrobenzothiazole-N=N-phenyl with OCH₃, N(C₄H₉(n))₂, SO₃⁻]₂ Ni²⁺ | 632, 691 | 719 |
| 17-10 | [structure: O₂N-C₆H₄-O₂S-thiazole-N=N-phenyl with N(C₂H₅)₂, SO₃⁻]₂ Ni²⁺ | 601, 645 | 672 |

EXAMPLE 18

(a) Preparation

A nickel chelate compound of the following structural formula:

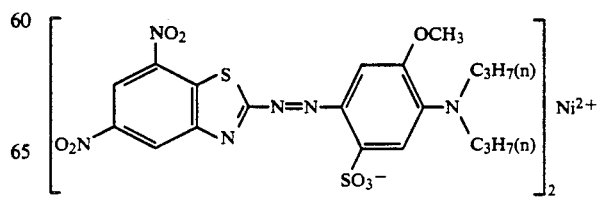

was obtained in the same manner as described in Example 12 and an optical recording medium was prepared similarly. The maximum absorption wavelength of the coated layer was 723 nm.

(b) Evaluation of recording properties

The recording and evaluation were conducted in the same manner as described in Example 12 to obtain properties of the recording sensitivity of 6.0 mW and the degree of modulation of 72%.

Light resistance test was conducted similarly, and the retaining ratio of the initial property after 40 hours was as extremely good as 97.6%.

EXAMPLE 19

(a) Preparation

A nickel chelate compound of the following structural formula:

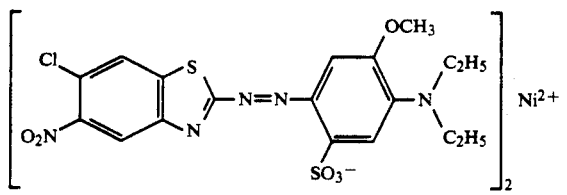

was obtained in the same manner as described in Example 12, and an optical recording medium was prepared similarly. The maximum absorption wavelength of the coated layer was 731 nm.

(b) Evaluation of recording properties

Recording and evaluation were conducted in the same manner as described in Example 12 to obtain properties of the recording sensitivity of 7.0 mW and the degree of modulation of 65%.

Light fastness test was conducted similarly, whereby the retaining ratio of the initial property after 40 hours was as extremely good as 98.8%

EXAMPLE 20

(a) Preparation of a compound 7.27 g of p-aminobenzaldehyde was dissolved in 150 ml of 1,4-dioxane, and 83 ml of malononitrile, 1.50 ml of piperidine and 1.23 ml of acetic acid were added thereto at room temperature. After stirring for 5 hours, 100 ml of methanol was added, and the solution was left to stand over one night. After filtering to remove insolubles, the solvent of the filtrate was removed, followed by filtering with toluene to obtain 10.89 g of yellow crystals of a compound of the following structural formula (1):

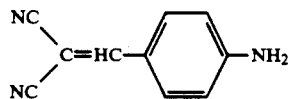

(1)

8.46 g of the obtained compound (1) and 9.52 g of ammonium thiocyanate were dissolved in 237.5 g of acetic acid and 12.5 of water, and a solution of 10 g of bromine dissolved in 25 g of acetic acid was dropwise added thereto at 10° C. After stirring for 2 hours, the solution was left to stand over one night. The reacted solution was heated to 70° C. and poured to 500 ml of hot water followed by filtering in the hot condition. To the filtrate, sodium carbonate was added to adjust the solution to pH 5, and the precipitated crystals were filtered and washed with water and toluene, followed by drying to obtain 7.21 g of a compound as yellow crystals of the following structural formula (2). Measured value of the molecular weight: 226.

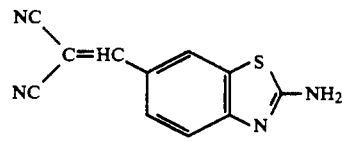

(2)

3.39 g of the obtained compound (2) was dissolved in 13.4 g of phosphoric acid and 0.745 g of sulfuric acid, and 4.73 ml of acetic acid and 0.638 g of sodium nitrate were added thereto. 1.82 g of sulfuric acid was added at a temperature of 0° to 10° C., and diazotization was conducted with 5.09 g of 45% nitrosylsulfuric acid at −2° to −5° C. The obtained diazo solution was dropwise added at a temperature of 0° to 5° C. to a solution of 22.5 g of sodium 3-dibutylaminobenzenesulfonate dissolved in 100 ml of methanol, and the solution was neutralized with an alkali compound such as sodium acetate or aqueous ammonia solution. The obtained crystal was filtered and dried to obtain 2.88 g of an azo compound as blackish violet crystals of the following structural formula (3):

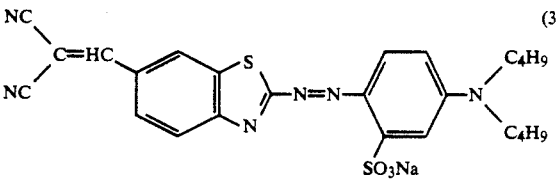

(3)

Figure 11:
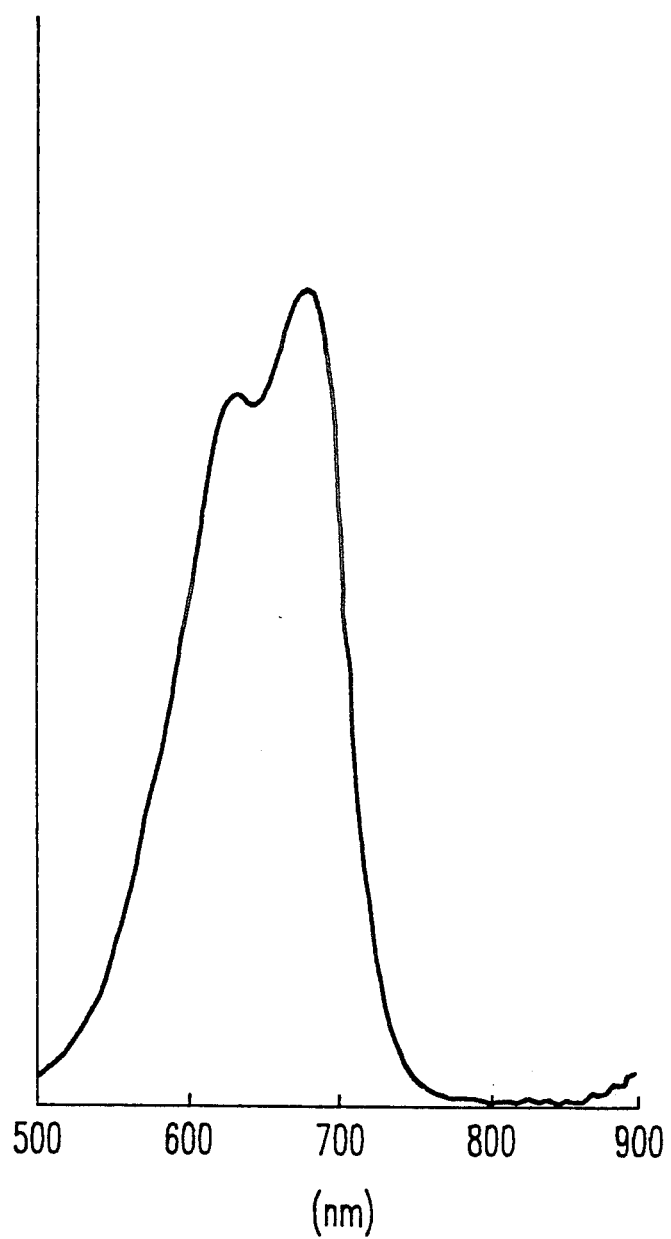
FIG. 11 is a graph showing the visible region absorption spectrum of the metal chelate compound of Example 20 in a chloroform solution.

0.50 g of the obtained azo compound (3) was dissolved in 50 ml of methanol, and a solution of 0.13 g of nickel acetate dissolved in 10 ml of methanol was added thereto, followed by stirring at room temperature for 6 hours. The precipitated crystals were filtered, washed with methanol and dried to obtain 0.168 g of a nickel chelate compound as blackish purple crystals. The $\lambda_{max}$ of this compound (in chloroform) was 681 nm ($\epsilon = 1.48 \times 10^5$) (FIG. 11) and the melting point was not less than 250° C.

Figure 12:
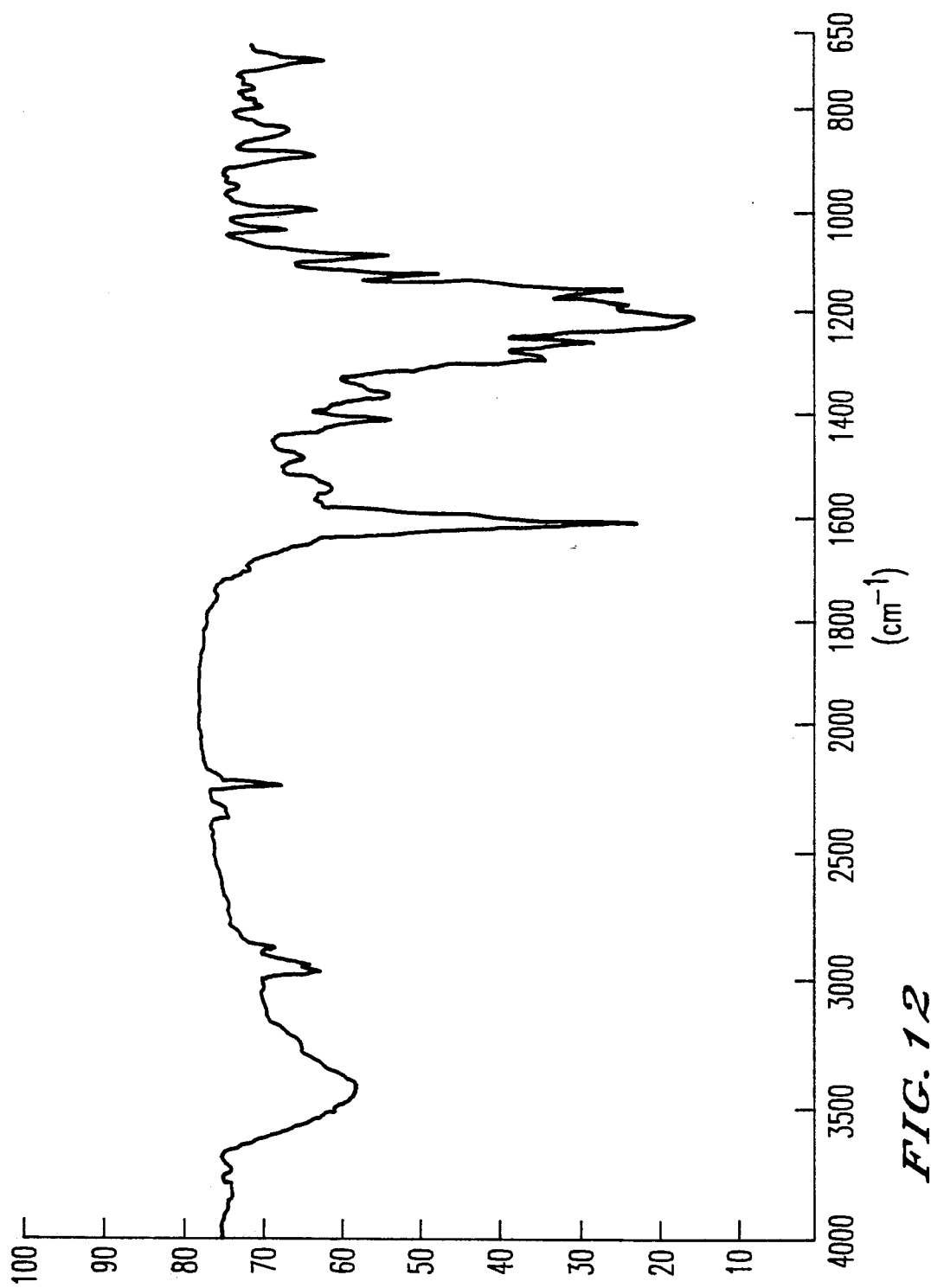
FIG. 12 is a graph showing the infrared absorption spectrum of the metal chelate compound in Example 20.

The infrared absorption spectrum of this compound is shown in FIG. 12.

(b) Preparation of an optical recording medium 0.15 g of the nickel chelate compound of the azo type compound obtained in the above preparation step (a) was dissolved in 7.5 g of octafluoropentanol, and it was filtered with a filter of 0.22 μm to obtain a solution. 5 μm of this solution was dropped on an injection molded polycarbonate resin substrate (5 inches in diameter) having grooves with a depth of 700Å and a width of 0.7 μm, and coated thereon by a spinner method at a rotational rate of 500 rpm. After coating, it was dried at 60° C. for 10 minutes. The maximum absorption wavelength of the coated layer was 707 nm and 643 nm.

Figure 13:
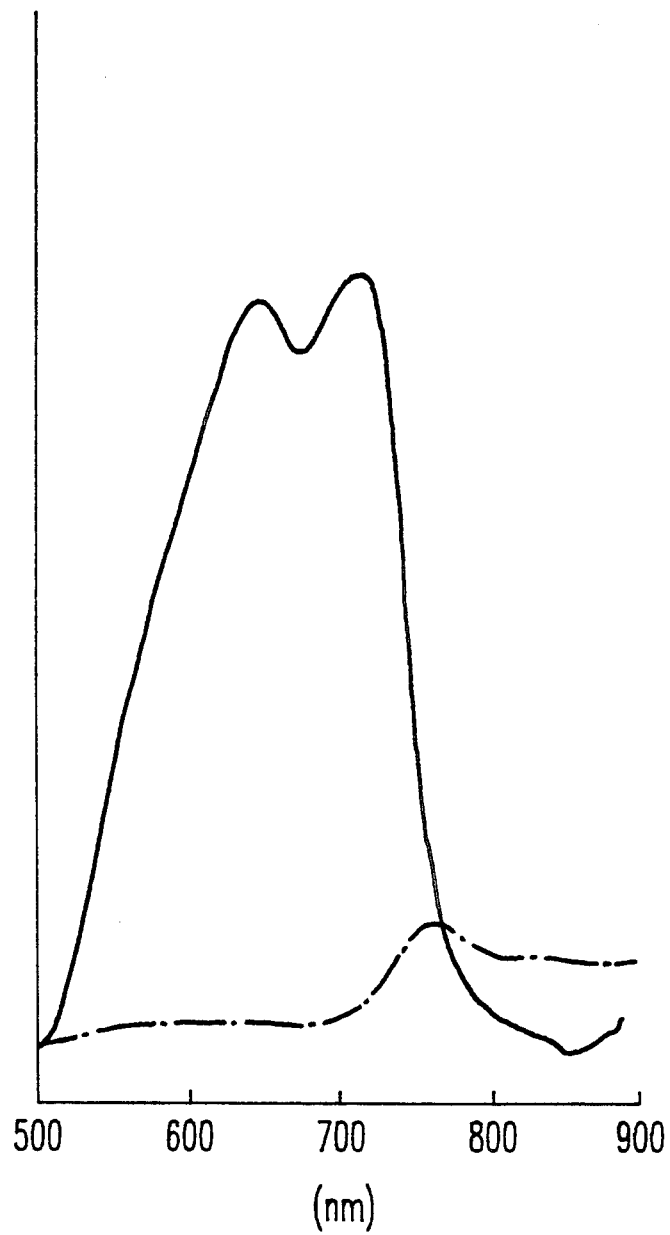
FIG. 13 is a graph showing a visible region absorption spectrum of the coated layer of the metal chelate compound of Example 20.

The absorption spectrum of the coated layer is shown in FIG. 13.

Then, on this coated layer, a gold layer having a layer thickness of 2000Å was formed by a spattering method to form a reflecting layer. Further, on this reflecting layer, an ultraviolet curable resin was spin-coated, followed by irradiation with ultraviolet rays for curing to form a protecting layer having a thickness of 10 μm.

(c) Optical recording

While rotating the above recording medium at a rotational speed of 1.2 m/s, a semiconductor laser beam having a central wavelength of 780 nm was irradiated with a recording power of 7.0 mW to record EFM signals. Then, this recording portion was reproduced by a CD player having a semiconductor laser with a central wavelength of 780 nm, whereby excellent reproduction signals were obtained.

Further, tests for light resistance (Xenone Fade Meter Acceralated Test: 60 hours) and for storage stability (70° C., 85% RH: 500 hours) were conducted, whereby no deterioration in the sensitivity and the reproduced signals was observed as compared with the initial values, thus indicating that the medium was excellent as an optical recording medium.

EXAMPLE 21

(a) Preparation of a compound 3.39 g of the compound (2) obtained in Example 20 was dissolved in 13.4 g of phosphoric acid and 0.745 g of sulfuric acid, and 4.73 ml of acetic acid and 0.638 g of sodium nitrate were added thereto. 1.82 g of sulfuric acid was added to the solution at 0° to 10° C., and diazotization was conducted with 5.09 g of 45% nitrosylsulfuric acid at a temperature of −2° to −5° C. The obtained diazo solution was dropwise added at a temperature of 0° to 5° C. to a solution of 33.3 g of sodium 2-dibutylaminoanisol-4-sulfonate dissolved in 100 ml of methanol, and neutralized with an alkali compound such as sodium acetate or an aqueous ammonia solution. The obtained crystal was filtered and dried to obtain 2.24 g of an azo compound (4) as blackish violet crystals of the following structural formula:

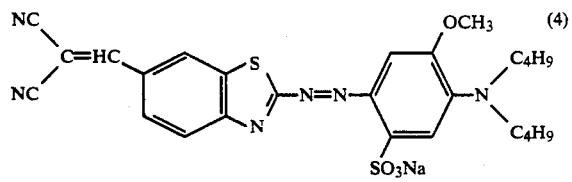

0.50 g of the obtained azo compound (4) was dissolved in 50 ml of methanol, and a solution of 0.13 g of nickel acetate dissolved in 10 ml of methanol was added thereto, followed by stirring at room temperature for 6 hours. The precipitated crystals were filtered, washed with methanol, and dried to obtain 0.201 g of a nickel chelate compound as blackish violet crystals.

The $\lambda_{max}$ of this compound (in chloroform) was 706 nm ($\epsilon = 5.9 \times 10^4$) and the melting point was not less than 250° C.

(b) Preparation of an optical recording medium

A coated layer was formed in the same manner as in Example 20 except that 0.15 g of the nickel chelate compound obtained in the above preparation step (a) was employed. The maximum absorption wavelength of the coated layer were 728 nm and 662 nm.

Then, on this coated layer, a reflecting layer and a protecting layer were formed in the same manner as in Example 1 to prepare an optical recording medium.

(c) Optical recording

On the above recording medium, EFM signals were recorded in the same manner as in Example 20. Then the signals were reproduced, whereby excellent reproduction signals were obtained.

Further, tests for light fastness and for storage stability were conducted in the manner as in Example 1, whereby no deterioration in the sensitivity and the reproduced signals was observed as compared with the initial values, thus indicating that the medium was excellent as an optical recording medium.

EXAMPLE 22

(a) Preparation of a compound 3.25 g of 2-amino-4-chloro-5-formylthiazole of the following structural formula:

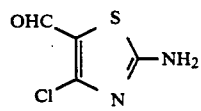

was dissolved in 20 ml of sulfuric acid and 10 ml of acetic acid, and diazotization was conducted with 6.78 g of 45% nitrosylsulfuric acid at a temperature of 0° to −5° C. The obtained diazo solution was dropwise added at a temperature of 0° to 5° C. to a solution of 9.22 g of sodium 3-dibutylaminobenzenesulfonate dissolved in 350 ml of water, and neutralized with an alkali compound such as sodium acetate or an aqueous ammonia solution. The obtained crystal was filtered and dried to obtain 5.48 g of an azo compound as blackish violet crystals of the following structural formula (5):

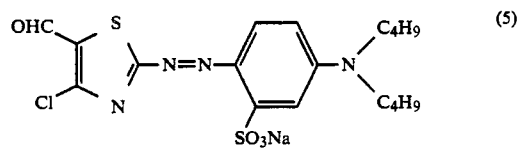

2.0 g of the obtained azo compound (5) was dissolved in 100 ml of 1,4-dioxane, and 0.75 ml of malononitrile, 0.16 ml of piperidine and 0.13 ml of acetic acid were added thereto at room temperature. After stirring for 4 hours, the solvent was removed, followed by filtering with a silica gel column to obtain 0.16 g of an azo compound as blackish violet crystals of the following structural formula (6):

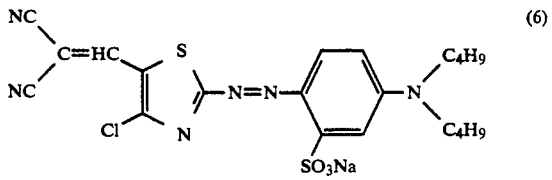

0.16 g of the obtained azo compound (6) was dissolved in 20 ml of methanol, and a solution of 0.045 g of nickel acetate dissolved in 5 ml of methanol was added thereto, followed by stirring at a room temperature for 5 hours. The precipitated crystals were filtered, washed with methanol and dried to obtain 0.021 g of a nickel chelate compound as blackish violet crystals.

The $\lambda_{max}$ of this compound (in chloroform) was 722 nm ($\epsilon=5.4\times10^4$) and the melting point was not less than 250° C.

(b) Preparation of an optical recording medium

A coated layer was formed in the same manner as in Example 20 except that 0.15 g of the nickel chelate compound obtained in the above preparation step (a). The maximum absorption wavelength of the coated layer were 754 nm and 587 nm.

Then, on this coated layer, a reflecting layer and a protecting layer were formed in the same manner as in Example 1 to prepare an optical recording medium.

(c) Optical recording

On the above recording medium, EFM signals were recorded in the same manner as in Example 20 and then reproduced, whereby excellent reproduced signals were obtained.

Further, tests for light fastness and for storage stability were conducted in the same manner as in Example 20, whereby no deterioration in the sensitivity and the reproduced signals was observed as compared with the initial values, thus indicating the medium was excellent as an optical recording medium.

EXAMPLE 23

(a) Preparation of a compound 2.0 g of the azo compound (5) obtained in Example 20 was dissolved in 100 ml of 1,4-dioxane, and 0.97 ml of ethylcyanoacetate, 0.16 ml of piperidine and 0.13 ml of acetic acid were added thereto at room temperature. After stirring for 4 hours, the solvent was removed, followed by filtering with a silica gel column to obtain 0.51 g of an azo compound (7) as blackish violet crystals of the following structural formula:

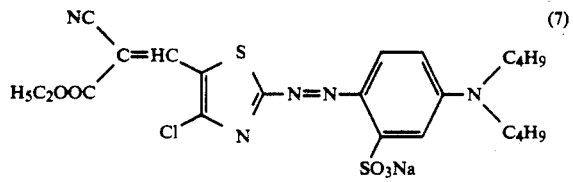

0.15 g of the obtained azo compound (7) was dissolved in 50 ml of methanol, and a solution of 0.132 g of nickel acetate dissolved in 10 ml of methanol was added thereto, followed by stirring at room temperature for 6 hours. The precipitated crystals were filtered, washed with methanol and dried to obtain 0.016 g of a nickel chelate compound as blackish violet crystals.

The $\lambda_{max}$ of this compound (in chloroform) was 693 nm ($\epsilon=1.4\times10^5$) and the melting point was not less than 250° C.

(b) Preparation of an optical recording medium

A coated layer was formed in the same manner as in Example 1 except that 0.15 g of the nickel chelate compound of the disazo compound obtained in the above preparation step (a). The maximum absorption wavelength of the coated layer were 754 nm and 675 nm.

Then, on this coated layer, a reflecting layer and a protecting layer were formed in the same manner as in Example 20 to prepare an optical recording medium.

(c) Optical recording

On the above recording medium, EFM signals were recorded in the same manner as in Example 20 and reproduced to obtain excellent reproduced signals.

Further, tests for light fastness and for storage stability were conducted in the same manner as in Example 20, whereby no deterioration in the sensitivity and the reproduced signals was observed as compared with initial values, thus indicating that the medium was excellent as an optical recording medium.

EXAMPLE 24

13.5 g of p-aminoacetophenone and 31.70 g of ammonium thiocyanate were dispersed in a mixture of 800 ml of glacial acetic acid and 40 ml of water, and a solution of 20 g of bromine dissolved in 100 ml of glacial acetic acid was dropwise added thereto at 7° to 10° C. over about 1 hour while stirring. After stirring at 10° C. for 2 hours, the solution was heated and stirred at 70° C. for 5 hours. The reacted mixture was filtered at 50° C. or more, and the obtained filtrate was added to 1000 ml of a hot water of about 70° C. To this mixture, crystals of anhydrous sodium carbonate were added while leaving it to cool and stirring until the pH became 5. Fresh pale yellow crystals were filtered and dried to obtain 15.83 g of 2-amino-5-acetylbenzothiazole of the following structural formula:

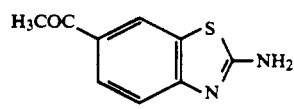

Then, 2.00 g of (0.0105 mol) of 2-amino-5-acetylbenzothiazole obtained above, 0.69 g (0.0105 mol) of malononitrile and 0.4 g of ammonium acetate were added to a mixture of 10 ml of glacial acetic acid and 5 ml of toluene, heated while stirring, and refluxed for 2 hours while evaporating toluene and water. The resulting product was left to cool, and then added to 100 ml of water. The obtained fresh yellow crystals were filtered and dried to obtain 2.47 g of 5-(2',2-dicyano-1'-methyleteno)-2-aminobenzotiazole of the following structural formula. The molecular weight of this compound was confirmed with a mass spectrum.

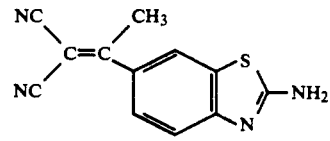

1.1 g (0.0046 mol) of 5-(2',2'-dicyano-1'-methyleteno)-2-aminobenzothiazole obtained as above was added little by little to a mixture of 8.90 g of 85% phosphoric acid and 0.5 g of 98% sulfuric acid while stirring. Further, while stirring this solution, 3.15 g of glacial acetic acid was added and then 0.43 g of sodium nitrate was added. This mixture was cooled to 0° to 5° C., and 1.22 g of 97% sulfuric acid was added, and then 1.62 g of 44% nitrosylsulfuric acid was dropwise added little by little over about 5 minutes. Further, the solution was stirred at 0° to 5° C. for 1 hour, and it was added little by little at 0° to 5° C. over about 15 minutes with 30 g of sodium acetate and about 100 g of ice to a solution of 2.29 g of an anilinesulfonate derivative of the following structural formula:

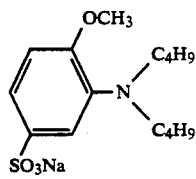

dispersed in 100 ml of methanol while stirring. The solution was further stirred at 0° to 5° C. for 3 hours, and the resulting solution was filtered to obtain 1.33 g of reddish violet crystals of the following structural formula:

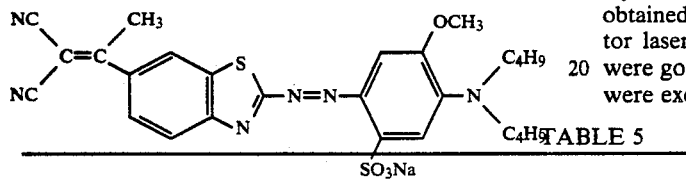

Then, 0.566 g (0.001 mol) of the azo compound obtained above was dissolved in 100 ml of methanol, and a solution of 0.16 g (0.0006 mol) of nickel acetate tetrahydrate dissolved in 100 ml of water was added thereto. After stirring at about 20° C. for 2 hours, and fresh crystals were filtered and dried to obtain 0.32 g of a nickel chelate compound as dark red crystals.

The absorption spectrum of this compound in chloroform was $\lambda_{max}$ 700 nm, and $\epsilon$ was $13.1 \times 10^4$ assuming the molecular weight as 1190.

EXAMPLE 25

Solutions obtained by employing chelate compounds of azo compounds and metals as shown in Table 5 instead of the chelate compounds of the azo compounds employed in Examples 20° to 24, were coated on substrates to obtain optical recording media each having the maximum absorption wavelength of the coated layer as shown in Table 5. On the recording media thus obtained, recording was conducted with a semiconductor laser as a light source, whereby their sensitivities were good, and their light fastness and storage stability were excellent.

TABLE 5

| No. | Azo compound | Metal compound | Maximum absorption wavelength of the coated layer (nm) |
|---|---|---|---|
| 25-1 | NC\C(CH3)=C-[benzothiazole]-N=N-[phenyl(N(C4H9)2)(SO3H)] with NC | Ni(CH3COO)2 | 695 |
| 25-2 | NC\C(CH3)=C-[benzothiazole]-N=N-[phenyl(OCH3)(N(C4H9)2)(SO3H)] with NC | Ni(CH3COO)2 | 725 |
| 25-3 | NC\C(COOC2H5)=CH-[benzothiazole]-N=N-[phenyl(N(C4H9)2)(SO3H)] | Ni(CH3COO)2 | 707 |

In addition to the compounds employed in the above Examples, specific Examples of metal chelate compounds of azo compounds preferably employed for the optical recording medium of the present invention are as indicated in Table 6.

TABLE 6

| Azo compound | Metal compound |
|---|---|
| CH3-[benzothiazole]-N=N-[phenyl(N(C2H4OC2H5)2)(SO3Na)] | NiCl2 |

TABLE 6-continued
| Azo compound | Metal compound |
|---|---|
| 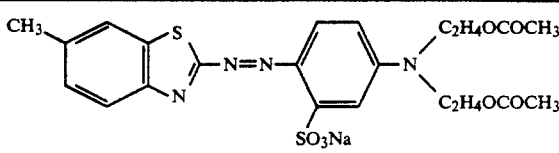 | NiCl$_2$ |
| 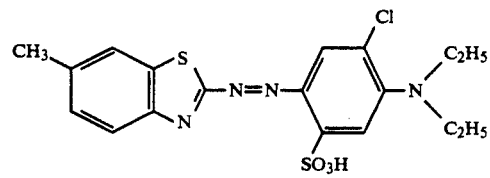 | NiCl$_2$ |
| 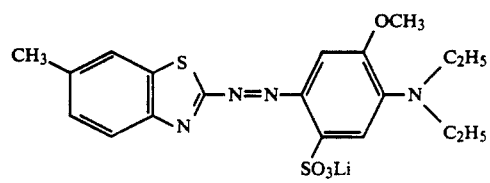 | NiCl$_2$ |
| 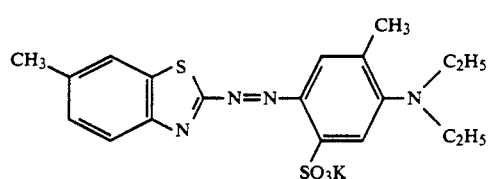 | Ni(CH$_3$COO)$_2$ |
| 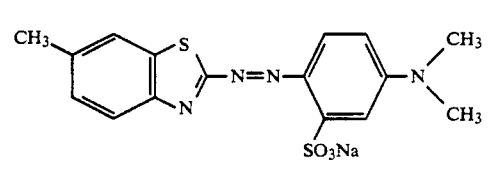 | Ni(CH$_3$COO)$_2$ |
| 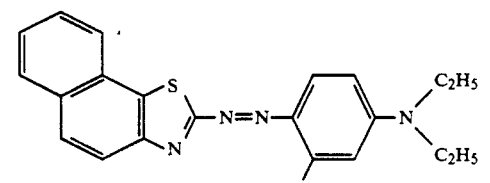 | Ni(CH$_3$COO)$_2$ |
| 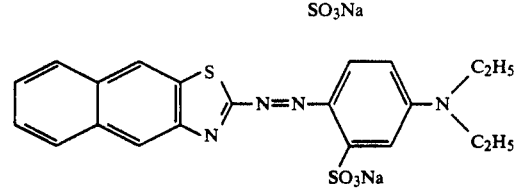 | Ni(CH$_3$COO)$_2$ |
| 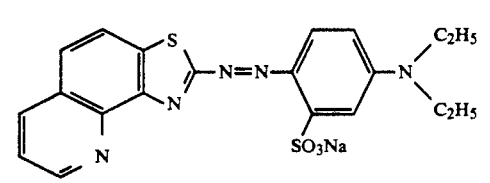 | Ni(CH$_3$COO)$_2$ |
| 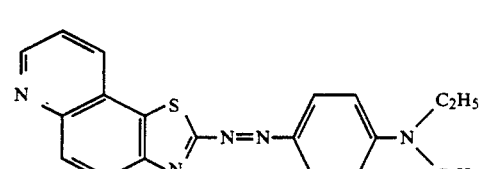 | Ni(CH$_3$COO)$_2$ |

TABLE 6-continued

| Azo compound | Metal compound |
|---|---|
| (quinoline fused thiazole)–N=N–(phenyl with N(C$_2$H$_5$)$_2$, SO$_3$Na) | Ni(CH$_3$COO)$_2$ |
| O$_2$N–(benzothiazole)–N=N–(phenyl with N(C$_2$H$_5$)$_2$, SO$_3$Na) | Ni(CH$_3$COO)$_2$ |
| NC–(benzothiazole)–N=N–(phenyl with N(C$_2$H$_5$)$_2$, SO$_3$Na) | Ni(CH$_3$COO)$_2$ |
| CH$_3$O$_2$S–(benzothiazole)–N=N–(phenyl with N(C$_2$H$_5$)$_2$, SO$_3$Na) | Ni(CH$_3$COO)$_2$ |
| H$_5$C$_2$OOC–(benzothiazole)–N=N–(phenyl with N(C$_2$H$_5$)$_2$, SO$_3$Na) | Ni(CH$_3$COO)$_2$ |
| (N-methyl carbazole fused thiazole)–N=N–(phenyl with N(C$_2$H$_5$)$_2$, SO$_3$Na) | Ni(CH$_3$COO)$_2$ |
| (fluorene fused thiazole)–N=N–(phenyl with N(C$_2$H$_5$)$_2$, SO$_3$Na) | Ni(CH$_3$COO)$_2$ |
| (anthraquinone fused thiazole)–N=N–(phenyl with N(C$_2$H$_5$)$_2$, SO$_3$Na) | Ni(CH$_3$COO)$_2$ |
| CH$_3$–(benzothiazole)–N=N–(phenyl with N(C$_4$H$_9$(n))$_2$, SO$_3$Na) | Co(BF$_4$)$_3$ |
| CH$_3$–(benzothiazole)–N=N–(phenyl with N(C$_4$H$_9$(n))$_2$, SO$_3$Na) | Cu(BF$_4$)$_2$ |

TABLE 6-continued
| Azo compound | Metal compound |
|---|---|
| 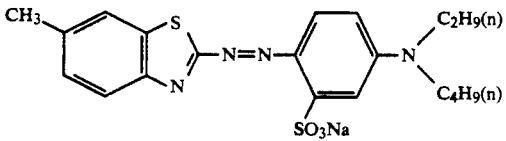 | ZnCl$_2$ |
| 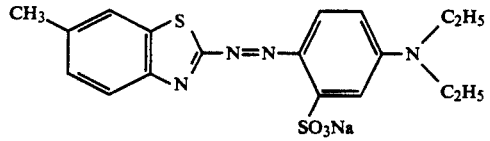 | FeCl$_3$ |
| 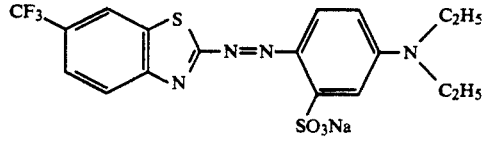 | NiCl$_3$ |
| 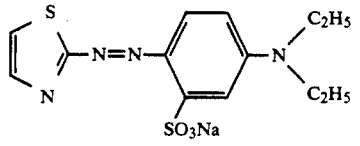 | Ni(CH$_3$COO)$_2$ |
| 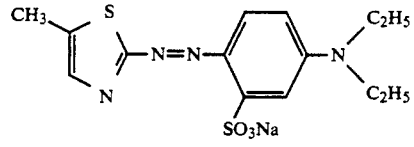 | Ni(CH$_3$COO)$_2$ |
| 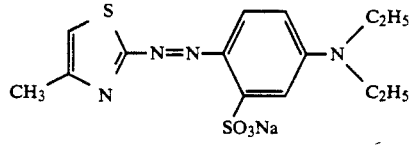 | Ni(CH$_3$COO)$_2$ |
| 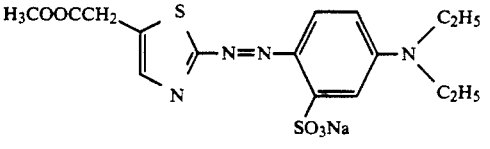 | Ni(CH$_3$COO)$_2$ |
| 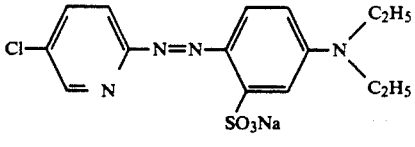 | Ni(CH$_3$COO)$_2$ |
| 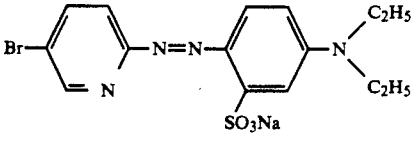 | Ni(PF$_6$)$_2$ |
| 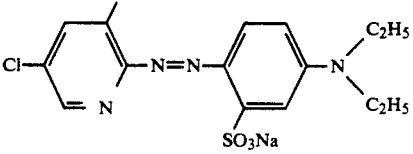 | Ni(PF$_6$)$_2$ |

TABLE 6-continued

| Azo compound | Metal compound |
|---|---|
| (3,5-dibromopyridin-2-yl azo, N,N-diethyl-sulfonated aniline) | Ni(PF$_6$)$_2$ |
| (4-methylpyridin-2-yl azo, N,N-diethyl-sulfonated aniline) | Ni(PF$_6$)$_2$ |
| (5-iodopyridin-2-yl azo, N,N-diethyl-sulfonated aniline) | Ni(PF$_6$)$_2$ |
| (5-fluoropyridin-2-yl azo, N,N-diethyl-sulfonated aniline) | NiBr$_2$ |
| (quinolin-2-yl azo, N,N-diethyl-sulfonated aniline) | NiBr$_2$ |
| (5-ethylthio-1,3,4-thiadiazol-2-yl azo, N,N-diethyl-sulfonated aniline) | NiBr$_2$ |
| (benzimidazol-2-yl azo, N,N-diethyl-sulfonated aniline) | NiBr$_2$ |

We claim:
1. A metal chelate compound comprising a monoazo compound of the following formula (II) or (II'):

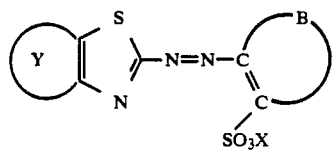
(II)

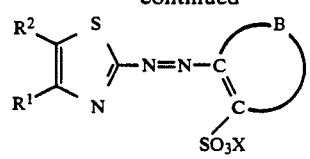
(II')

wherein each of R$^1$ and R$^2$, which are independent from one another, is a hydrogen atom, a C$_{1-6}$ alkyl sulfonyl group, a C$_{2-7}$ alkyl carbonyl group, a halogen atom, a formyl group,

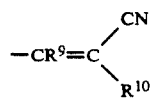

(wherein $R^9$ is a hydrogen atom or a $C_{1-6}$ alkyl group, and $R^{10}$ is a $C_{2-7}$ alkoxy carbonyl group), a nitro group,

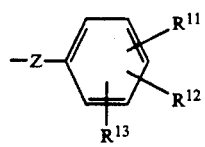

(wherein each of $R^{11}$ to $R^{13}$ which are independent from one another, is a hydrogen atom or a nitro group, Z is a single bond, —SCH$_2$— —SO$_2$— or —SO$_2$CH$_2$—), a trifluoromethyl group, a trifluoromethoxy group, a cyano group, a $C_{2-7}$ alkoxycarbonyl group, a $C_{3-7}$ alkoxycarbonylalkyl group or a $C_{1-6}$ alkylthio group, and wherein Y is a residue forming an aromatic ring or a hetero ring together with the two carbon atoms of the thiazole ring to which it is bonded, B is a residue forming an aromatic ring together with the two carbon atoms to which it is bonded, and X is a hydrogen atom or a cation), said monoazo compound having only one —SO$_3$X group, and a metal.

2. The metal chelate compound according to claim 1, wherein the residue

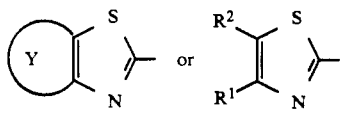

in the formula (II) or (II') is the one selected from the group consisting of residues of the following formulas:

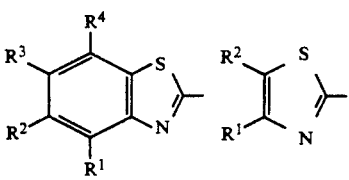

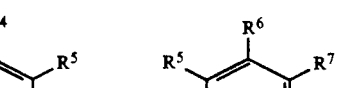

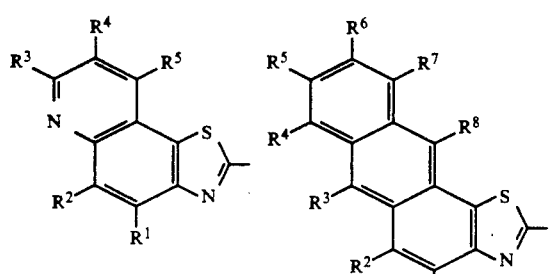

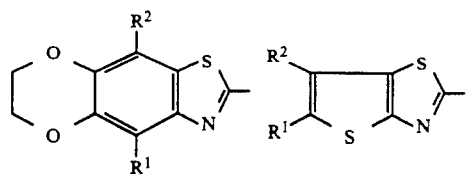

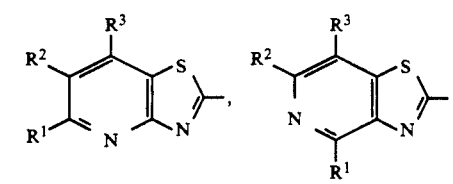

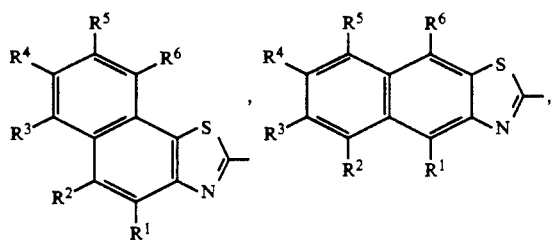

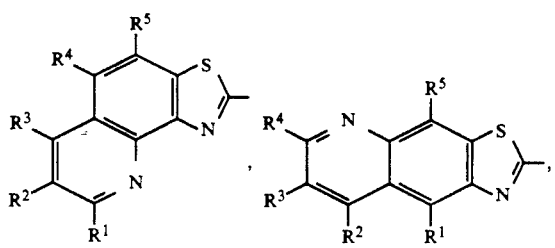

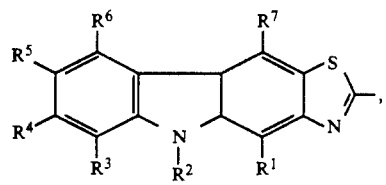

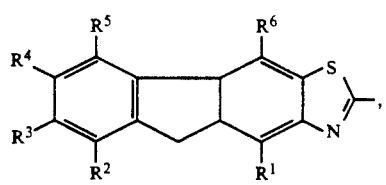

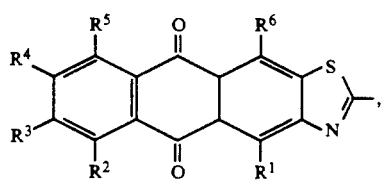

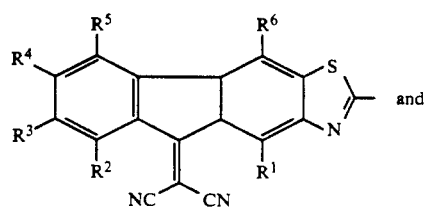

and

-continued

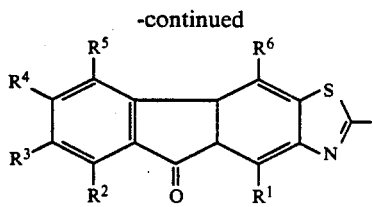

wherein each of $R^1$ and $R^8$, which are independent from one another, is a hydrogen atom, a $C_{1-6}$ alkyl group, a $C_{1-6}$ alkoxy group, a $C_{1-6}$ alkyl sulfonyl group, a $C_{2-7}$ alkyl carbonyl group, a halogen atom, a formyl group,

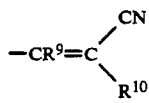

(wherein $R^9$ is a hydrogen atom or a $C_{1-6}$ alkyl group, and $R^{10}$ is a $C_{2-7}$ alkoxy carbonyl group), a nitro group,

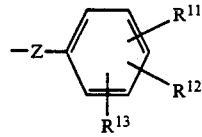

(wherein each of $R^{11}$ to $R^{13}$ which are independent from one another, is a hydrogen atom or a nitro group, Z is a single bond, —SCH$_2$— —SO$_2$— or —SO$_2$CH$_2$—), a trifluoromethyl group, a trifluoromethoxy group, a cyano group, a $C_{2-7}$ alkoxycarbonyl group, a $C_{3-7}$ alkoxycarbonylalkyl group or a $C_{1-6}$ alkylthio group}.

3. The metal chelate compound according to claims 1 or 2, wherein the residue

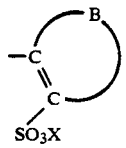

in the formula (II) or (II') is a benzene ring having at least one substituent selected from the group consisting of —NR$^{14}$R$^{15}$ (wherein each of $R^{14}$ and $R^{15}$ which are independent from each other, is a hydrogen atom, a $C_{1-20}$ alkyl group which may have a substituent, a $C_{6-12}$ aryl group which may have a substituent, a $C_{1-10}$ alkenyl group which may have a substituent, or a $C_{3-10}$ cyclocalkyl group which may have a substituent), a $C_{1-6}$ alkyl group, a $C_{1-6}$ alkoxy group, a halogen atom, a nitro group, a cyano group, a $C_{1-6}$ alkyl sulfonyl group, a $C_{2-7}$ alkoxy carbonyl group and a thiocyanate group;

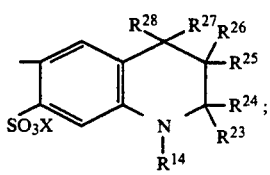

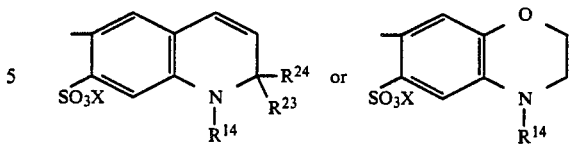

(wherein each of $R^{23}$ to $R^{28}$ which are independent from one another, is a hydrogen atom or a $C_{1-6}$ alkyl group, a $R^{14}$ is a hydrogen atom, a $C_{1-20}$ alkyl group which may have a substituent, a $C_{6-12}$ aryl group which may have a substituent, a $C_{2-10}$ alkenyl group which may have a substituent, or a $C_{3-10}$ cycloalkyl group which may have a substituent, and X is a hydrogen atom or a cation).

4. The metal chelate compound according to claim 1, wherein the monoazo compound is a monoazo compound of the following formula (II):

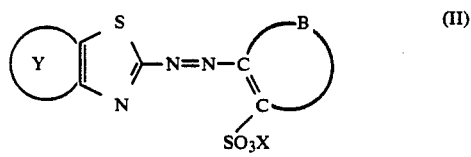

{wherein Y is an aromatic ring residue or a hetero ring residue, which may have at least one substituent selected from a $C_{1-6}$ alkyl group, a $C_{1-6}$ alkoxy group, $C_{1-6}$ alkyl sulfonyl group, a $C_{2-7}$ alkylcarbonyl group, a halogen atom, a formyl group,

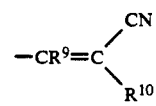

(wherein $R^9$ is a hydrogen atom or a $C_{1-6}$ alkyl group, and $R^{10}$ is a cyano group or a $C_{2-7}$ alkoxycarbonyl group), a nitro group,

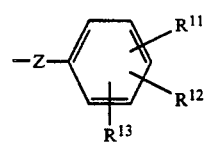

(each of $R^{11}$ to $R^{13}$ which are independent from one another, is a hydrogen atom or a nitro group, and Z is a single bond, —SCH$_2$—, —SO$_2$— or —SO$_2$CH$_2$—), a trifluoromethyl group, a trifluoromethoxy group, a cyano group, a $C_{2-7}$ alkoxycarbonyl group, a $C_{3-7}$ alkoxycarbonyl alkyl group and a $C_{1-6}$ alkylthio group, B is a benzene ring having at least one substituent selected from —NR$^{14}$R$^{15}$ (wherein each of $R^{14}$ and $R^{15}$ which are independent from each other, is a hydrogen atom, a $C_{1-20}$ alkyl group which may have a substituent, a $C_{6-12}$ aryl group which may have a substituent, a $C_{2-10}$ alkenyl group which may have a substituent, or a $C_{3-10}$ cycloalkyl group which may have a substituent), a $C_{1-6}$ alkyl group, a $C_{1-6}$ alkoxy group, a halogen atom, a nitro group, a cyano group, a $C_{1-6}$ alkylsulfonyl group, a $C_{2-7}$ alkoxycarbonyl group and a thiocyanate group;

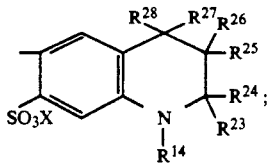

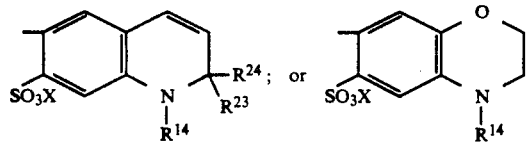

(wherein each of $R^{23}$ to $R^{28}$ which are independent form one another, is a hydrogen atom or a $C_{1-6}$ alkyl group, $R^{14}$ is a hydrogen atom, a $C_{1-20}$ alkyl group which may have a substituent, a $C_{6-12}$ aryl group which may have a substituent, a $C_{2-10}$ alkenyl group which may have a substituent, or a $C_{3-10}$ cycloalkyl group which may have a substituent), and X is a hydrogen atom or a cation}.

5. The metal chelate compound according to claim 4, wherein the monoazo compound is a monoazo compound of the following formula (III):

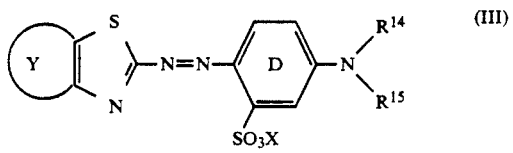

(wherein D may have at least one substituent selected from a $C_{1-6}$ alkyl group, a $C_{1-6}$ alkoxy group, a halogen atom, a nitro group, a cyano group, a $C_{1-6}$ alkylsulfonyl group, a $C_{2-7}$ alkoxycarbonyl group and a thiocyanate group, Y is an aromatic ring residue or a hetero ring residue, which may have at least one substituent selected from a $C_{1-6}$ alkyl group, a $C_{1-6}$ alkoxy group, a $C_{1-6}$ alkylsulfonyl group, a $C_{2-7}$ alkylcarbonyl group, a halogen atom, a formyl group,

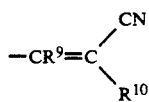

(wherein $R^9$ is a hydrogen atom or a $C_{1-6}$ alkyl group, and $R^{10}$ is a cyano group or a $C_{2-7}$ alkoxycarbonyl group), a nitro group,

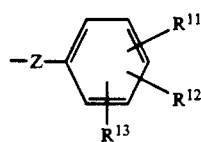

wherein each of $R^{11}$ to $R^{13}$ which are independent from one another, is a hydrogen atom or a nitro group, and Z is a single bond, —SCH$_2$—, —SO$_2$— or SO$_2$CH$_2$—), a trifluoromethyl group, a trifluoromethoxy group, a cyano group, a $C_{2-7}$ alkoxycarbonyl group, a $C_{3-7}$ alkoxycarbonylalkyl group, and a $C_{1-6}$ alkylthio group, each of $R^{14}$ and $R^{15}$ which are independent from each other, is a hydrogen atom, a $C_{1-20}$ alkyl group which may have a substituent, a $C_{6-12}$ aryl group which may have a substituent, a $C_{2-10}$ alkenyl group which may have a substituent, or a $C_{3-10}$ cycloalkyl group which may have a substituent, and X is a hydrogen atom or a cation).

6. The metal chelate compound according to claim 5, wherein the monoazo compound is a monoazo compound of the following formula (IV):

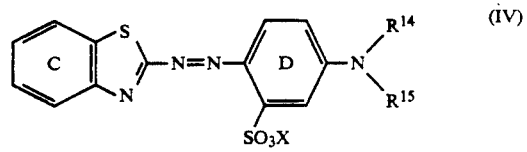

(wherein ring C may have at least one substituent selected from a $C_{1-6}$ alkyl group, a $C_{1-6}$ alkoxy group, a $C_{1-6}$ alkylsulfonyl group, a $C_{2-7}$ alkylcarbonyl group, a halogen atom, a formyl group,

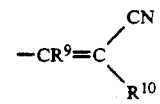

(wherein $R^9$ is a hydrogen atom or a $C_{1-6}$ alkyl group, and $R^{10}$ is a cyano group or a $C_{2-7}$ alkoxycarbonyl group), a nitro group,

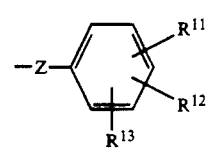

(wherein each of $R^{11}$ to $R^{13}$ which are independent from one another, is a hydrogen atom or a nitro group, and Z is a single bond, —SCH$_2$—, —SO$_2$— or —SO$_2$CH$_2$—), a trifluoromethyl group, a trifluoromethoxy group, a cyano group, a $C_{2-7}$ alkoxycarbonyl group, a $C_{3-7}$ alkoxycarbonylalkyl group and a $C_{1-6}$ alkylthio group, D may have at least one substituent selected from a $C_{1-6}$ alkyl group, a $C_{1-6}$ alkoxy group, a halogen atom, nitro group, a cyano group, a $C_{1-6}$ alkylsulfonyl group, a $C_{2-7}$ alkoxylcarbonyl group and a thiocyanate group, each of $R^{14}$ and $R^{15}$ which are independent from each other, is a hydrogen atom, a $C_{1-20}$ alkyl group which may have a substituent, a $C_{6-12}$ aryl group which may have a substituent, a $C_{2-10}$ alkenyl group which may have a substituent, or a $C_{3-10}$ cycloalkyl group which may have a substituent, and X is a hydrogen atom or a cation}.

7. The metal chelate compound according to claim 6, wherein the monoazo compound is a monoazo compound of the following formula (V):

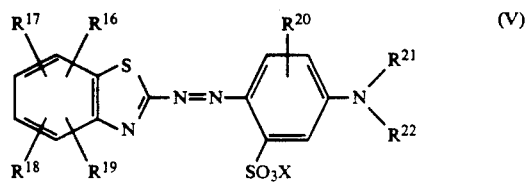

{wherein each of $R^{16}$ to $R^{19}$ which are independent from one another, is a hydrogen atom, a $C_{1-6}$ alkyl group, a $C_{1-6}$ alkoxy group, a $C_{1-6}$ alkylsulfonyl group, a $C_{2-7}$ alkylcarbonyl group, a halogen atom, a formyl group, group, and $R^{10}$ is a cyano group or a $C_{2-7}$ alkoxycarbonyl group), a nitro group,

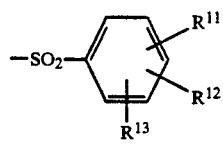

(wherein each of $R^{11}$ to $R^{13}$ which are independent from one another, is a hydrogen atom or a nitro group), a trifluoromethyl group, a trifluoromethoxy group or a cyano group, $R^{20}$ is a hydrogen atom, a $C_{1-6}$ alkyl group, a $C_{1-6}$ alkoxy group, a halogen atom or a nitro group, each of $R^{21}$ and $R^{22}$ which are independent from each other, is a $C_{1-6}$ alkyl group or a $C_{2-6}$ alkoxyalkyl group, and X is a hydrogen atom or a cation).

8. The metal chelate compound according to claim 7, wherein each of $R^{16}$ and $R^{17}$ is a hydrogen atom, each of $R^{18}$ and $R^{19}$ which are independent from each other, is a hydrogen atom, $C_{1-6}$ alkyl group,

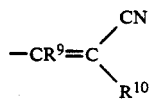

(wherein $R^9$ is a hydrogen atom or a $C_{1-6}$ alkyl group, and $R^{10}$ is a cyano group or a $C_{2-7}$ alkoxycarbonyl group), a trifluoromethyl group or a cyano group, $R^{20}$ is a hydrogen atom or a $C_{1-6}$ alkoxy group, each of $R^{21}$ and $R^{22}$ which are independent from each other, is a $C_{1-6}$ alkyl group, and X is a hydrogen atom or a cation.

9. The metal chelate compound according to claim 7, wherein each of $R^{16}$ and $R^{17}$ is a hydrogen atom, each of $R^{18}$ to $R^{20}$ which are independent from one another, is a hydrogen atom, a $C_{1-6}$ alkyl group or a halogen atom.

10. The metal chelate compound according to claim 7, wherein the monoazo compound is a monoazo compound of the following formula (VI):

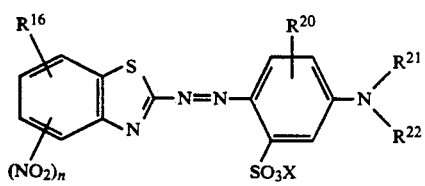

(wherein each of $R^{16}$ and $R^{20}$ which are independent from each other, is a hydrogen atom, a $C_{1-6}$ alkyl group, or a halogen atom, n is an integer of from 1 to 3, each of $R^{21}$ and $R^{22}$ which are independent from each other, is a $C_{1-6}$ alkyl group, and X is a hydrogen atom or a cation).

11. The metal chelate compound according to claim 7, wherein the monoazo compound is a monoazo compound of the following formula (VII):

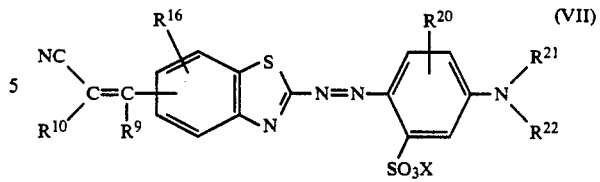

(wherein $R^9$ is a hydrogen atom or a $C_{1-6}$ alkyl group, $R^{10}$ is a cyano group or a $C_{2-7}$ alkoxycarbonyl group, each of $R^{21}$ and $R^{22}$ which are independent from each other, is a $C_{1-6}$ alkyl group or a $C_{2-6}$ alkoxyalkyl group, each of $R^{16}$ and $R^{20}$ which are independent from each other, is a hydrogen atom, a $C_{1-6}$ alkyl group, a $C_{1-6}$ alkoxy group, or a halogen atom, and X is a hydrogen atom or a cation).

12. The metal chelate compound according to claim 4, wherein the monoazo compound is a monoazo compound of the following formula (VIII):

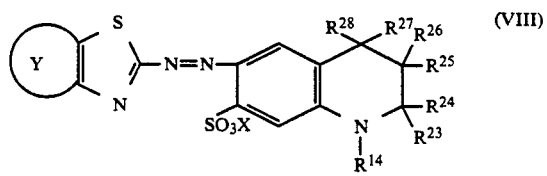

(wherein each of $R^{23}$ to $R^{28}$ which are independent from one another, is a hydrogen atom or a $C_{1-6}$ alkyl group, $R^{14}$ is a hydrogen atom, a $C_{1-20}$ alkyl group which may have substituent, a $C_{6-12}$ aryl group which may have a substituent, a $C_{2-10}$ alkenyl group which may have a substituent, or a $C_{3-10}$ cycloalkyl group which may have a substituent, Y is an aromatic ring residue or a hetero ring residue, which may have at least one substituent selected from a $C_{1-6}$ alkyl group, a $C_{1-6}$ alkoxy group, a $C_{1-6}$ alkylsulfonyl group, a $C_{2-7}$ alkylcarbonyl group, a halogen atom, a formyl group,

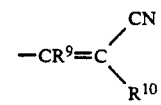

(wherein $R^9$ is a hydrogen atom or a $C_{1-6}$ alkyl group, and $R^{10}$ is a cyano group or a $C_{2-7}$ alkoxycarbonyl group), a nitro group,

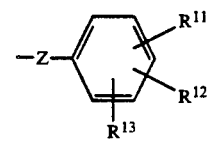

(wherein each of $R^{11}$ to $R^{13}$ which are independent from one another, is a hydrogen atom or a nitro group, and Z is a single bond, $-SCH_2-$, $-SO_2-$ or $-SO_2CH_2-$), a trifluoromethyl group, a trifluoromethoxy group, a cyano group, a $C_{2-7}$ alkoxycarbonyl group, a $C_{3-7}$ alkoxycarbonylalkyl group or a $C_{1-6}$ alkylthio group, and X is a hydrogen atom or a cation).

13. The metal chelate compound according to claim 4, wherein the monoazo compound is a monoazo compound of the

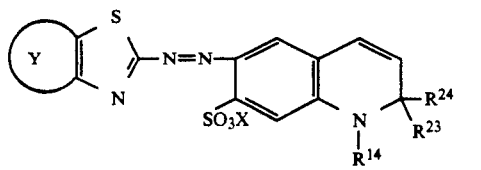

(IX)

(wherein $R^{14}$ is a hydrogen atom, a $C_{1-20}$ alkyl group which may have a substituent, a $C_{6-12}$ aryl group which may have a substituent, a $C_{2-10}$ alkenyl group which may have a substituent, or a $C_{3-10}$ cycloalkyl group which may have a substituent, each of $R^{23}$ and $R^{24}$ which are independent from each other, is a hydrogen atom or a $C_{1-6}$ alkyl group, Y is an aromatic ring residue or a hetero ring residue, which may have at least one substituent selected from a $C_{1-6}$ alkyl group, a $C_{1-6}$ alkoxy group, a $C_{1-6}$ alkylsulfonyl group, a $C_{2-7}$ alkylcarbonyl group, a halogen atom, a formyl group

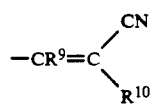

(wherein $R^9$ is a hydrogen atom or a $C_{1-6}$ alkyl group, and $R^{10}$ is a cyano group or a $C_{2-7}$ alkoxycarbonyl group), a nitro group,

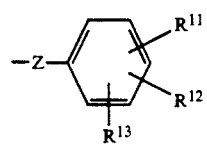

(wherein each of $R^{11}$ to $R^{13}$ which are independent from one another, is a hydrogen atom or a nitro group, and Z is a single bond, —SCH$_2$—, —SO$_2$— or —SO$_2$CH$_2$—), a trifluoromethyl group, a trifluoromethoxy group, a cyano group, a $C_{2-7}$ alkoxycarbonyl group, a $C_{3-7}$ alkoxycarbonylalkyl group and a $C_{1-6}$ alkylthio group, and X is a hydrogen atom or a cation).

14. The metal chelate compound according to claim 4, wherein the monoazo compound is a monoazo compound of the following formula (X):

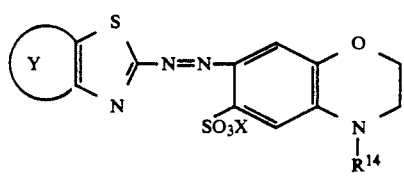

(X)

(wherein $R^{14}$ is a hydrogen atom, a $C_{1-20}$ alkyl group which may have a substituent, a $C_{6-12}$ aryl group which may have a substituent, a $C_{2-10}$ alkenyl group which may have a substituent, or a $C_{3-10}$ cycloalkyl group which may have a substituent, Y is an aromatic ring residue or a hetero ring residue, which may have at least one substituent selected from a $C_{1-6}$ alkyl group, a $C_{1-6}$ alkoxy group, a $C_{1-6}$ alkylsulfonyl group, a $C_{2-7}$ alkylcarbonyl group, a halogen atom, a formyl group,

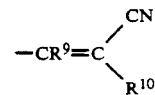

wherein $R^9$ is a hydrogen atom or a $C_{1-6}$ alkyl group, and $R^{10}$ is a cyano group or a $C_{2-7}$ alkoxycarbonyl group), a nitro group,

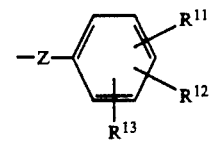

(wherein each of $R^{11}$ to $R^{13}$ which are independent from one another, is a hydrogen atom or a nitro group, and Z is a single bond, —SCH$_2$—, SO$_2$— or —SO$_2$CH$_2$—), a trifluoromethyl group, a trifluoromethoxy group, a cyano group, a $C_{2-7}$ alkoxycarbonyl group, a $C_{3-7}$ alkoxycarbonylalkyl group and a $C_{1-6}$ alkylthio group, and X is a hydrogen atom or a cation).

15. The metal chelate compound according to claim 1, wherein the monoazo compound is a monoazo compound of the following formula (IX):

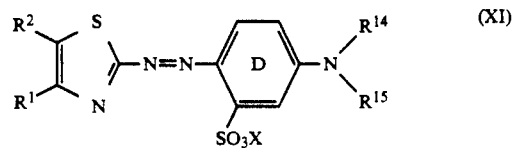

(XI)

wherein each of $R^1$ and $R^2$ which are independent from each other, is a hydrogen atom, a $C_{1-6}$ alkyl group, a $C_{1-6}$ alkoxy group, a $C_{1-6}$ alkylsulfonyl group, a $C_{2-7}$ alkylcarbonyl group, a halogen atom, a formyl group,

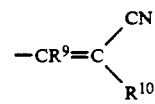

(wherein $R^9$ is a hydrogen atom or a $C_{1-6}$ alkyl group, and $R^{10}$ is a cyano group or a $C_{2-7}$ alkoxycarbonyl group), a nitro group,

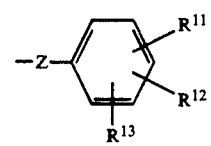

(wherein each of $R^{11}$ to $R^{13}$ which are independent from one another, is a hydrogen atom or a nitro group, and Z is a single bond, —SCH$_2$—, —SO$_2$— or —SO$_2$CH$_2$-), a trifluoromethyl group, a trifluoromethoxy group, a cyano group, a $C_{2-7}$ alkoxycarbonyl group, a $C_{3-7}$ alkoxycarbonylalkyl group, or a $C_{1-6}$ alkylthio group, ring D may be substituted by at least one substituent selected from a $C_{1-6}$ alkyl group, a $C_{1-6}$ alkoxy group, a halogen atom, a nitro group, a cyano group, a $C_{1-6}$ alkylsulfonyl group, a $C_{2-7}$ alkoxylcarbonyl group and a thiocyanate group, each of $R^{14}$ and $R^{15}$ which are independent from each other, is a hydrogen atom, a $C_{1-20}$ alkyl group which may have a substituent, a $C_{6-12}$ aryl group which may have a substituent, a $C_{2-10}$ alkenyl group which may have a substituent, a $C_{3-10}$ cycloalkyl group which may have a substituent, and X is a hydrogen atom or a cation}.

16. The metal chelate compound according to claim 15, wherein the monoazo compound is a monoazo compound of the following formula (XII):

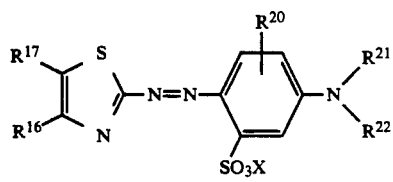

wherein each of $R^{16}$ and $R^{17}$ which are independent from each other, is a hydrogen atom, a $C_{1-6}$ alkyl group, a $C_{1-6}$ alkoxy group, a $C_{1-6}$ alkylsulfonyl group, a $C_{2-7}$ alkylcarbonyl group, a halogen atom, a formyl group,

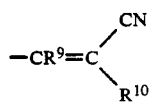

(wherein $R^9$ is a hydrogen atom or a $C_{1-6}$ alkyl group, and $R^9$ is a cyano group or a $C_{2-7}$ alkoxycarbonyl group), a nitro group,

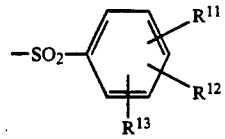

(wherein each of $R^{11}$ to $R^{13}$ which are independent from one another, is a hydrogen atom or a nitro group), a trifluoromethyl group, a trifluoromethoxy group or a cyano group, $R^{20}$ is a hydrogen atom, a $C_{1-6}$ alkyl group, a $C_{1-6}$ alkoxy group, a halogen atom or a nitro group, each of $R^{21}$ and $R^{22}$ which are independent from each other, is a $C_{1-6}$ alkyl group or a $C_{2-6}$ alkoxyalkyl group, and X is a hydrogen atom or a cation}.

17. An optical recording medium comprising a substrate and a recording layer formed thereon for information to be written in and/or to be read out, wherein said recording layer contains a chelate compound comprising a monoazo compound and a metal, as defined in any one of claim 2 to 16.

18. The optical recording medium according to claim 17, wherein the metal is a transition element.

19. The optical recording medium according to claim 18, wherein the metal is cobalt or nickel.

20. The optical recording medium according to claim 17, wherein a metal reflecting layer and a protecting layer are provided on the recording layer.

* * * * *

UNITED STATES PATENT AND TRADEMARK OFFICE
CERTIFICATE OF CORRECTION

PATENT NO. : 5,298,608
DATED : March 29, 1994
INVENTOR(S) : Tetsuo Murayama, et al It is certified that error appears in the above-indentified patent and that said Letters Patent is hereby corrected as shown below:

Column 86, line 25, "Claim 2 to 16" should read --Claims 1 to 16 --.

Signed and Sealed this

Tenth Day of January, 1995

Attest:

BRUCE LEHMAN

*Attesting Officer*     *Commissioner of Patents and Trademarks*